Figure 1:
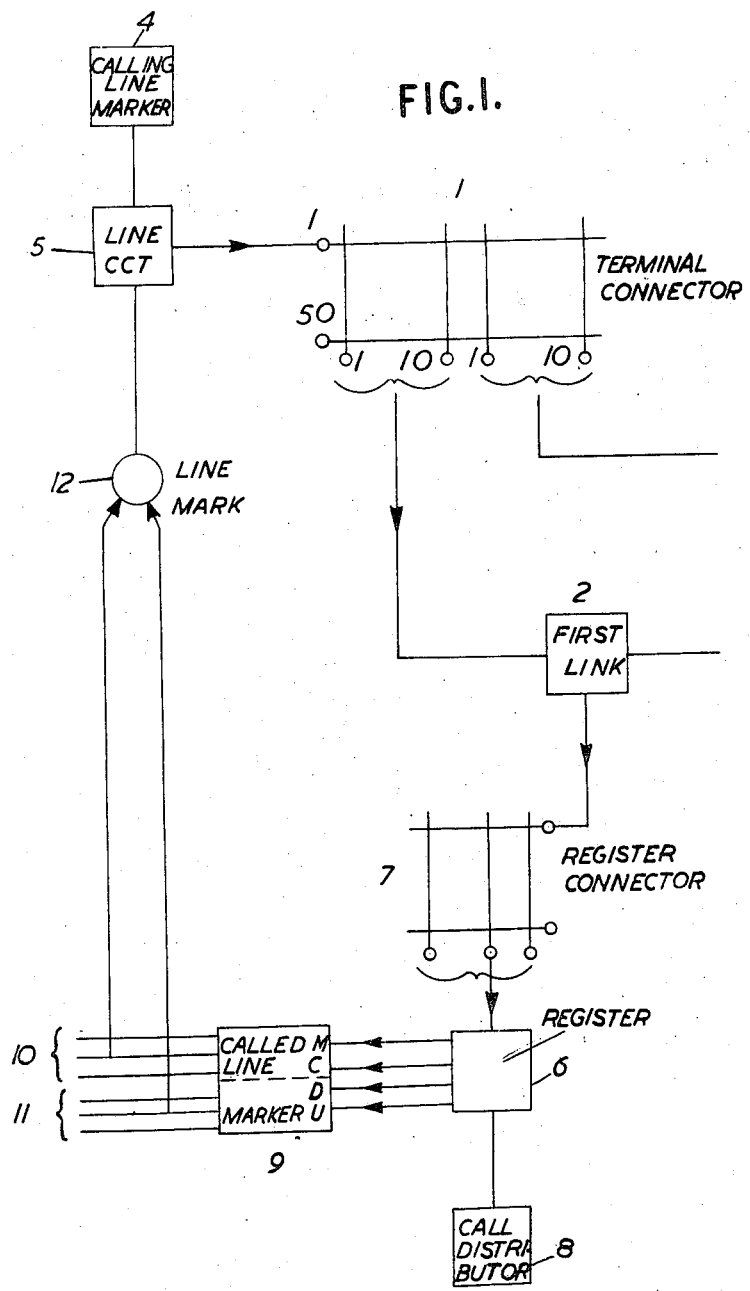

Feb. 3, 1959
F. H. BRAY ET AL
2,872,527
AUTOMATIC TELECOMMUNICATION EXCHANGES
Filed Sept. 27, 1955
41 Sheets-Sheet 9
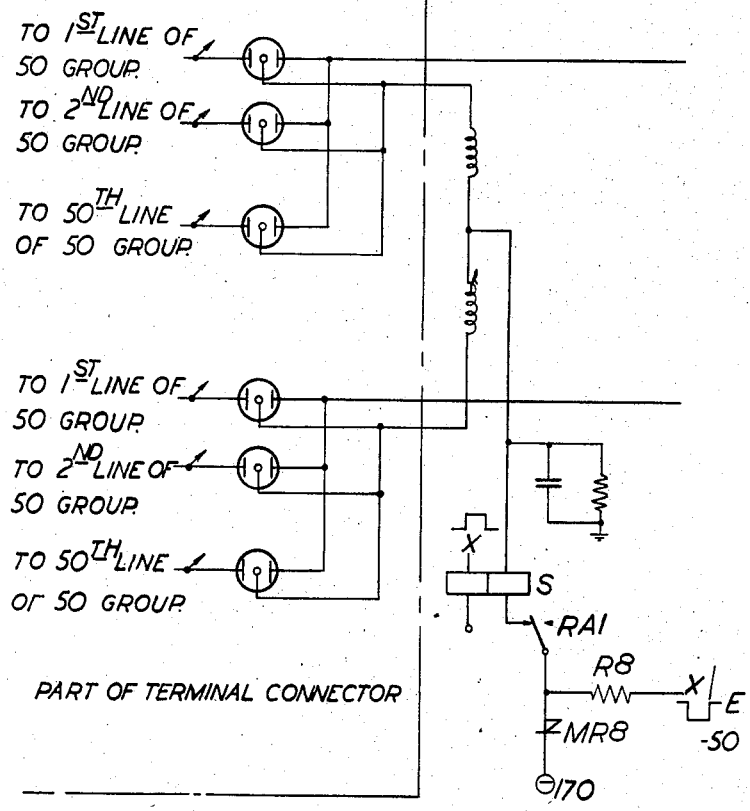
FIG. 9.
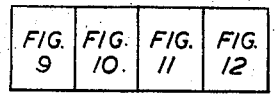
Inventors
F. H. BRAY
R. G. KNIGHT
By
Attorney Feb. 3, 1959 F. H. BRAY ET AL 2,872,527
AUTOMATIC TELECOMMUNICATION EXCHANGES
Filed Sept. 27, 1955 41 Sheets-Sheet 10

Inventors
F. H. BRAY-
R. G. KNIGHT
By Robert Harding J.
Attorney

TO ROUTE SELECTOR

Inventors
F. H. BRAY-
R. G. KNIGHT

By Robert Harding Jr.
Attorney

Feb. 3, 1959  F. H. BRAY ET AL  2,872,527
AUTOMATIC TELECOMMUNICATION EXCHANGES
Filed Sept. 27, 1955  41 Sheets—Sheet 25

Inventors
F. H. BRAY-
R. G. KNIGHT
By
Attorney

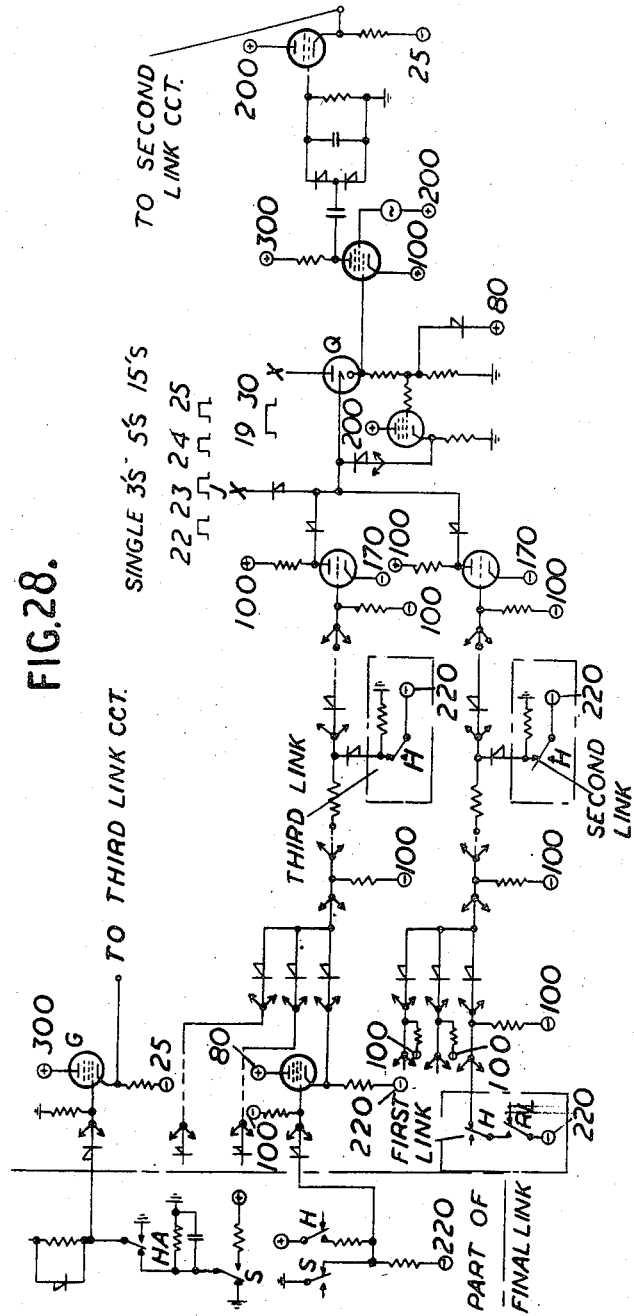

Feb. 3, 1959  F. H. BRAY ET AL  2,872,527
AUTOMATIC TELECOMMUNICATION EXCHANGES
Filed Sept. 27, 1955  41 Sheets-Sheet 30
FIG. 28B.
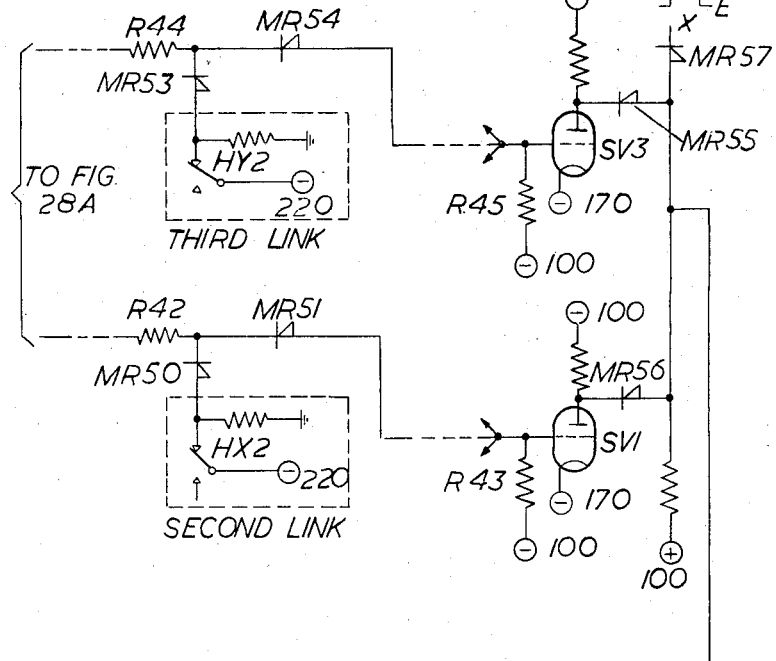
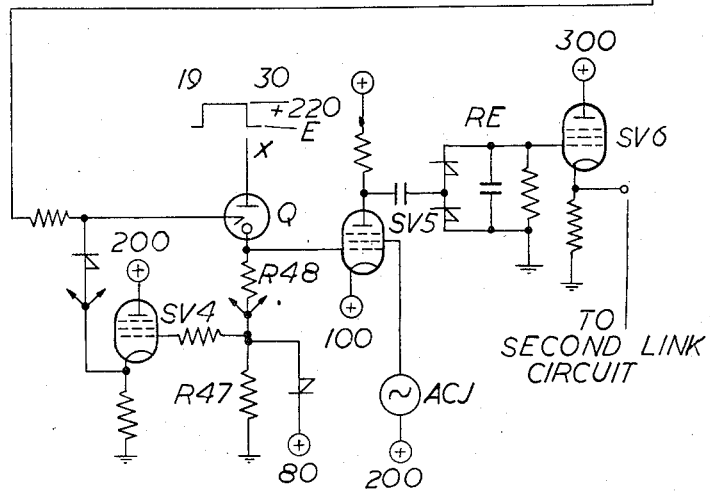
*Inventors*
F. H. BRAY -
R. G. KNIGHT
*Attorney*

Feb. 3, 1959    F. H. BRAY ET AL    2,872,527
AUTOMATIC TELECOMMUNICATION EXCHANGES
Filed Sept. 27, 1955    41 Sheets-Sheet 31

*Inventors*
F. H. BRAY-
R. G. KNIGHT

*Attorney*

Feb. 3, 1959 F. H. BRAY ET AL 2,872,527
AUTOMATIC TELECOMMUNICATION EXCHANGES
Filed Sept. 27, 1955 41 Sheets-Sheet 35

*Inventors*
F. H. BRAY-
R. G. KNIGHT

*By*

*Attorney*

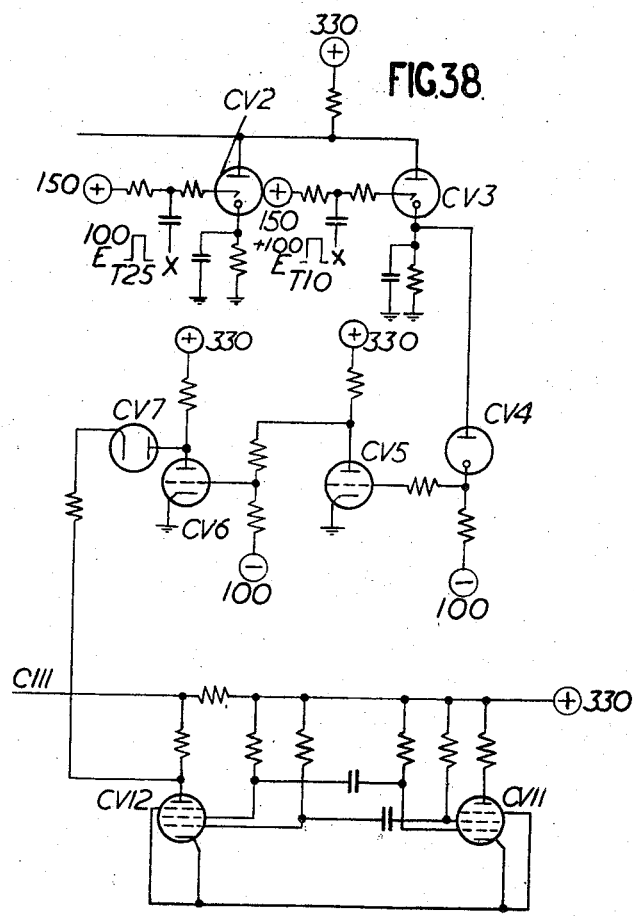

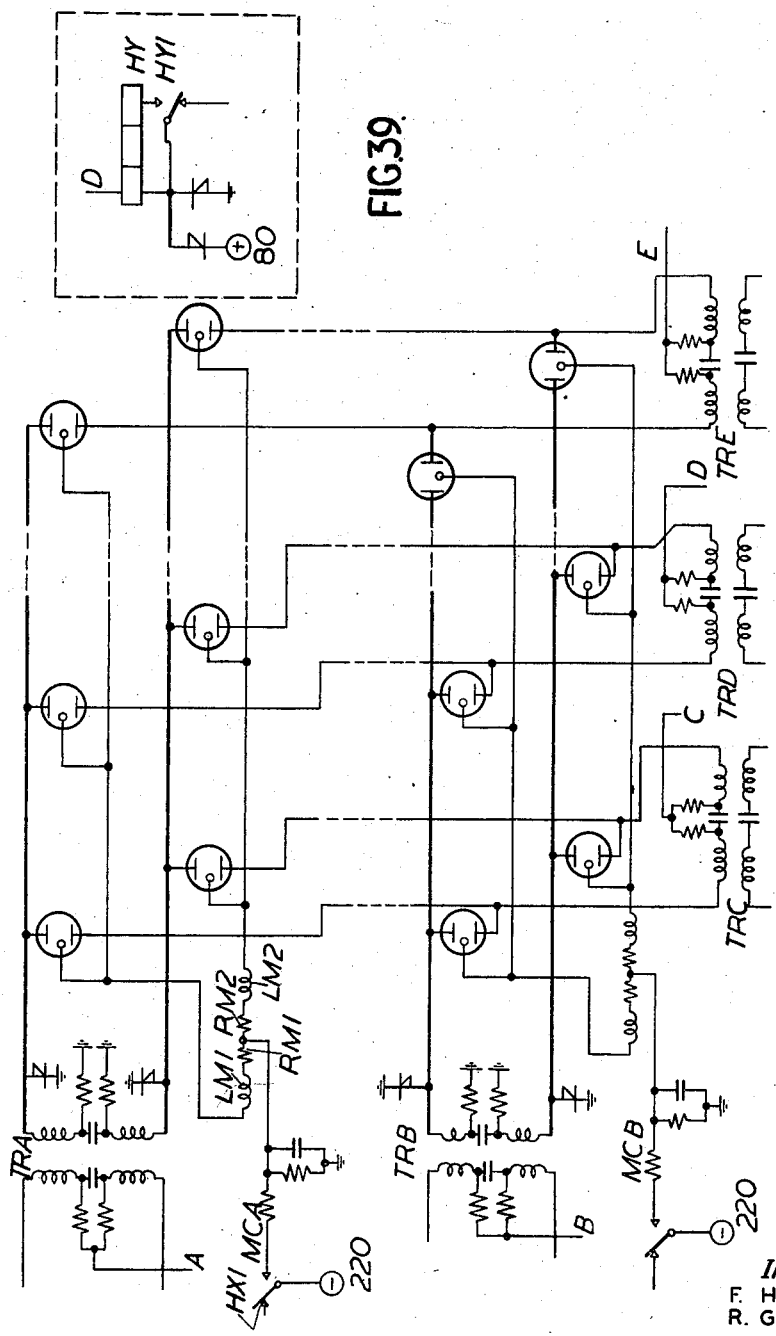

United States Patent Office 2,872,527
Patented Feb. 3, 1959

2,872,527

AUTOMATIC TELECOMMUNICATION EXCHANGES

Frederick Harry Bray and Ronald George Knight, London, England, assignors to International Standard Electric Corporation, New York, N. Y.

Application September 27, 1955, Serial No. 536,963

Claims priority, application Great Britain October 5, 1954

35 Claims. (Cl. 179—22)

The present invention relates to automatic telecommunication exchanges.

According to the present invention there is provided an automatic telecommunication exchange which comprises subscribers' individual switches for extending connections from subscribers' lines both for outgoing and for incoming calls, a plurality of intermediate switching stages for interconnecting the outlets of said subscribers' individual switches for outgoing calls and the outlets of said subscribers' individual switches for incoming calls, registers accessible via the subscribers' individual switches for outgoing calls, marking means for marking wanted subscribers' lines one at a time under control of said registers in order to initiate the operation of a wanted subscriber's individual switch for incoming calls to seize an outlet therefrom, and control equipment independent of said registers for selecting paths one at a time through said plurality of intermediate switching stages, each said path interconnecting an outlet from a calling subscriber's individual switch for outgoing calls to one end of said intermediate switching stages and an outlet from the called subscriber's individual switch for incoming calls to the other end of said intermediate switching stages.

According to the present invention there is also provided an automatic telecommunication exchange which comprises subscribers' individual switches for extending connections from subscribers' lines both for outgoing and for incoming calls, a plurality of intermediate switching stages for interconnecting the outlets of said subscribers' individual switches for outgoing calls and the outlets of said subscribers' individual switches for incoming calls, means responsive to the initiation of a call by a subscriber to initiate the operation of that subscriber's individual switch for outgoing calls to seize a free outlet therefrom to one end of said intermediate switching stages, registers accessible via the individual switches for outgoing calls one of which is seized in response to the seizure of an outlet from the calling subscriber's individual switch for outgoing calls, whereafter said seized register receives from the calling subscriber's line the designation of a wanted subscriber, marking means for marking a wanted subscriber's line under control of the designation received by the seized register in order to initiate the operation of that wanted subscriber's individual switch for incoming calls to seize a free outlet therefrom to the other end of the intermediate switching stages, and control equipment independent of said registers for selecting a path through said plurality of intermediate switching stages between the seized outlet from the calling subscriber's individual switch for outgoing calls and the seized outlet from the called subscriber's individual switch for incoming calls.

According to the present invention there is further provided an automatic telecommunication exchange which comprises a plurality of non-numerical switching stages, a number of subscribers' individual switches each of which is capable of connecting a calling subscriber to one of a number of inlets to the first of said non-numerical switching stages, a number of subscribers' individual switches each of which is capable of connecting a called subscriber's line to one of a number of outlets from the last of said non-numerical switching stages, means responsive to the initiation of a call by a subscriber to cause the calling subscriber's line to be connected to a free inlet to the first of said non-numerical switching stages via that subscriber's individual switch, means responsive to the reception from a calling subscriber of the designation of a wanted subscriber to cause the wanted subscriber's individual switch to connect that wanted subscriber's line to an outlet from the last of said non-numerical switching stages, and control equipment for causing said non-numerical switching stages to interconnect said inlet to the first of said non-numerical switching stages and said outlet from the last of said non-numerical switching stages, whereby a connection is established between said calling subscriber's line and the wanted subscriber's line.

According to the present invention there is still further provided automatic telecommunication exchange in which the subscribers' lines served include lines forming at least one P. B. X group of subscribers' lines, and in which the individual lines of a P. B. X group can be distributed anywhere throughout the exchange without restriction as to numbering.

Figure 2:
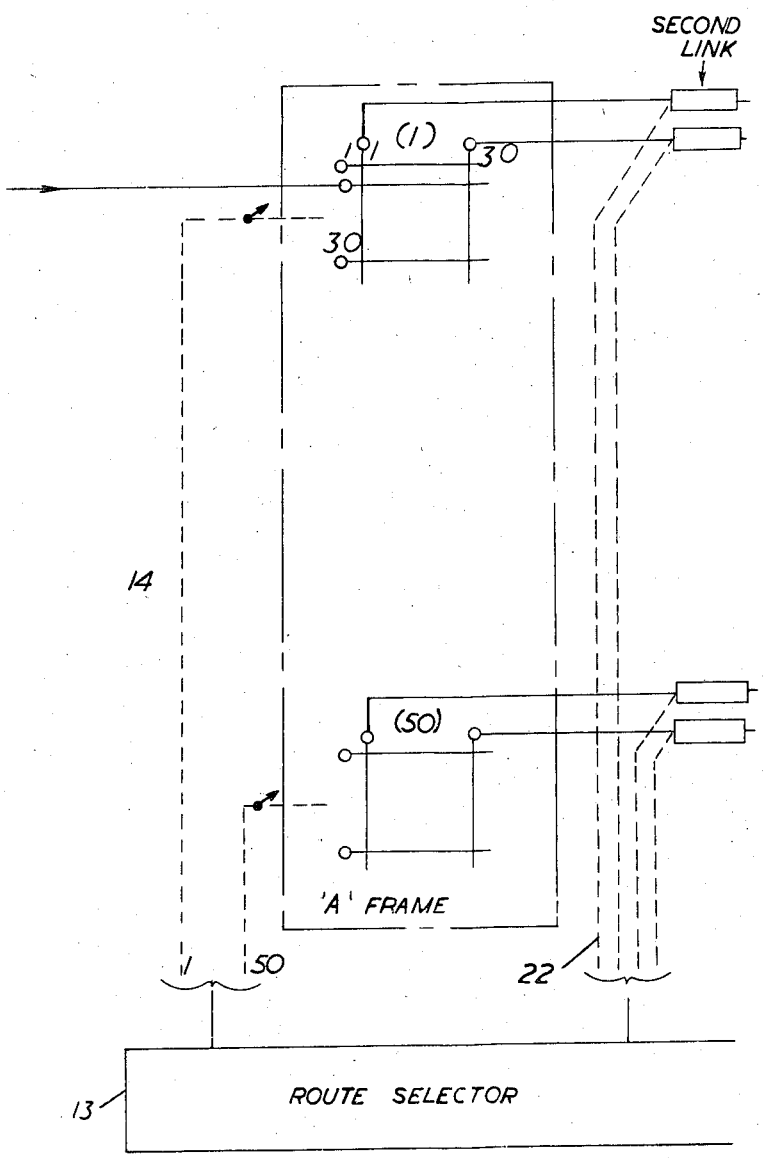
Figure 3:
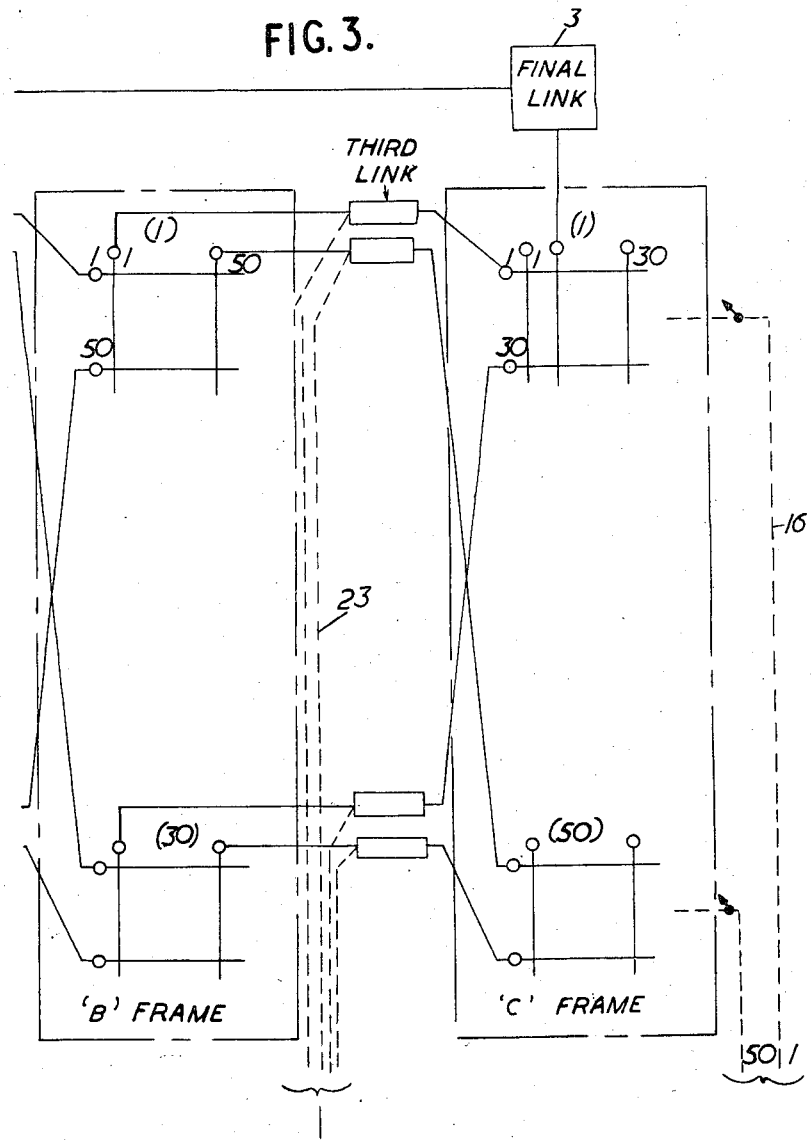

The invention will now be described with reference to the accompanying drawings, in which:

Figs. 1, 2 and 3, of which Fig. 2 should be placed to the right of Fig. 1, and Fig. 3 should be placed to the right of Fig. 2, showing a trunking diagram of a telecommunication exchange system embodying the present invention.

Figure 4:
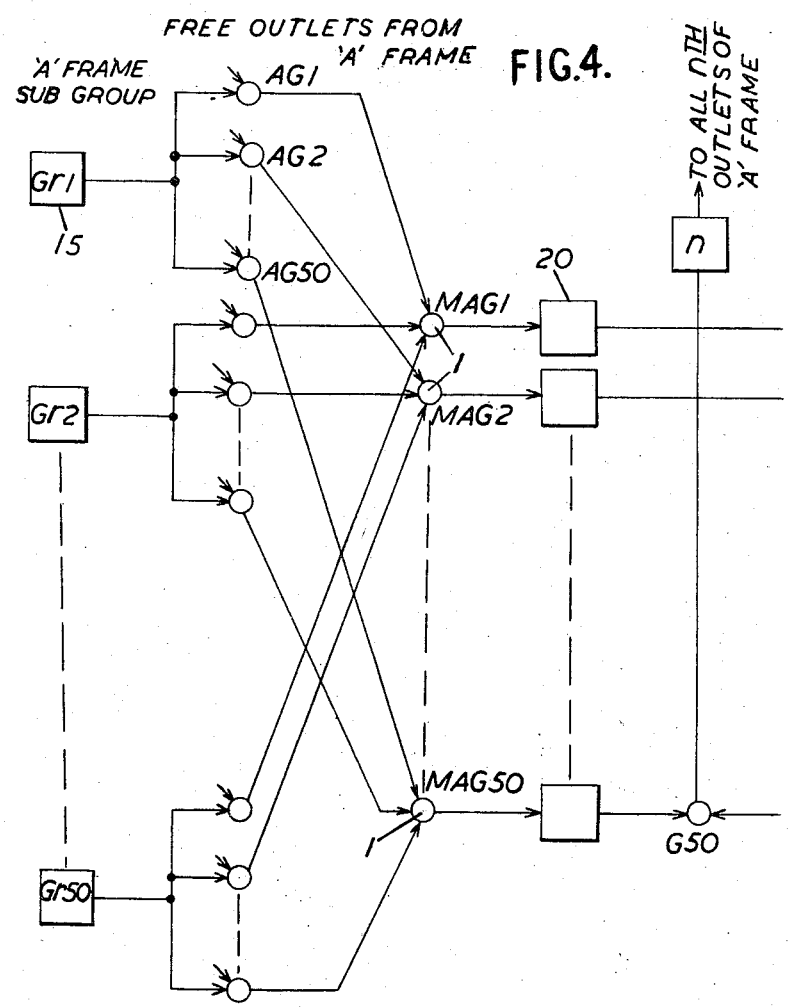
Figure 5:
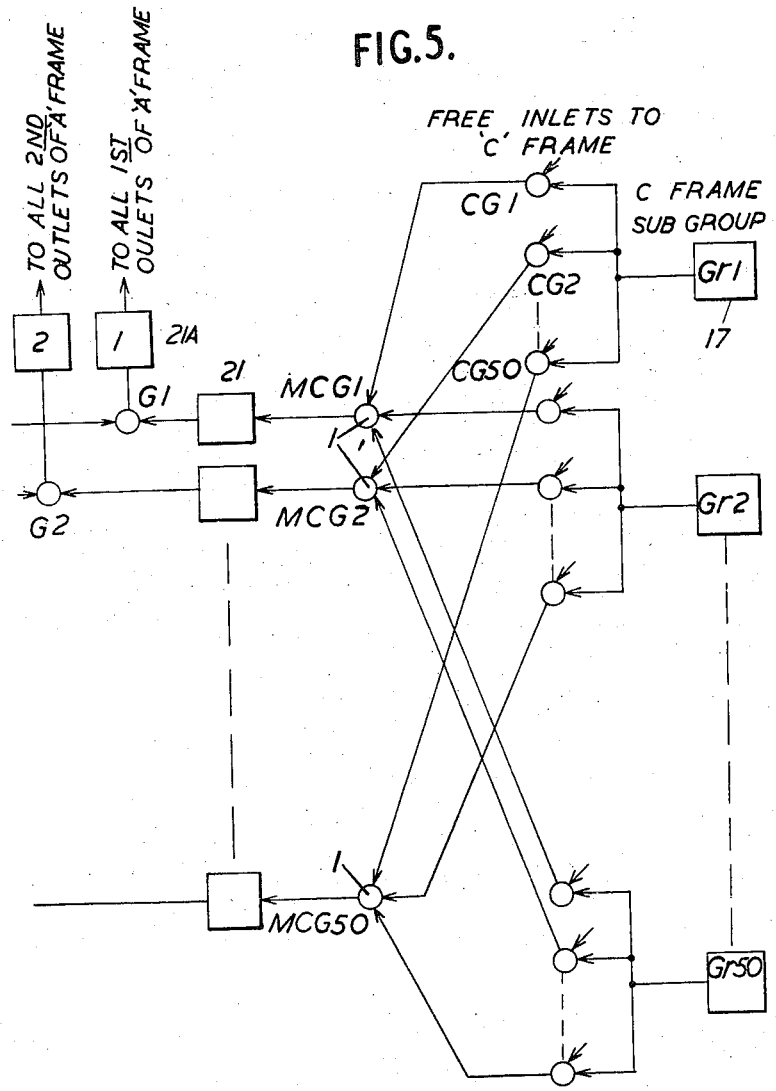

Figs. 4 and 5, of which Fig. 5 should be placed to the right of Fig. 4, is a functional schematic diagram of the route selector included in Figs. 2 and 3.

Figure 6:
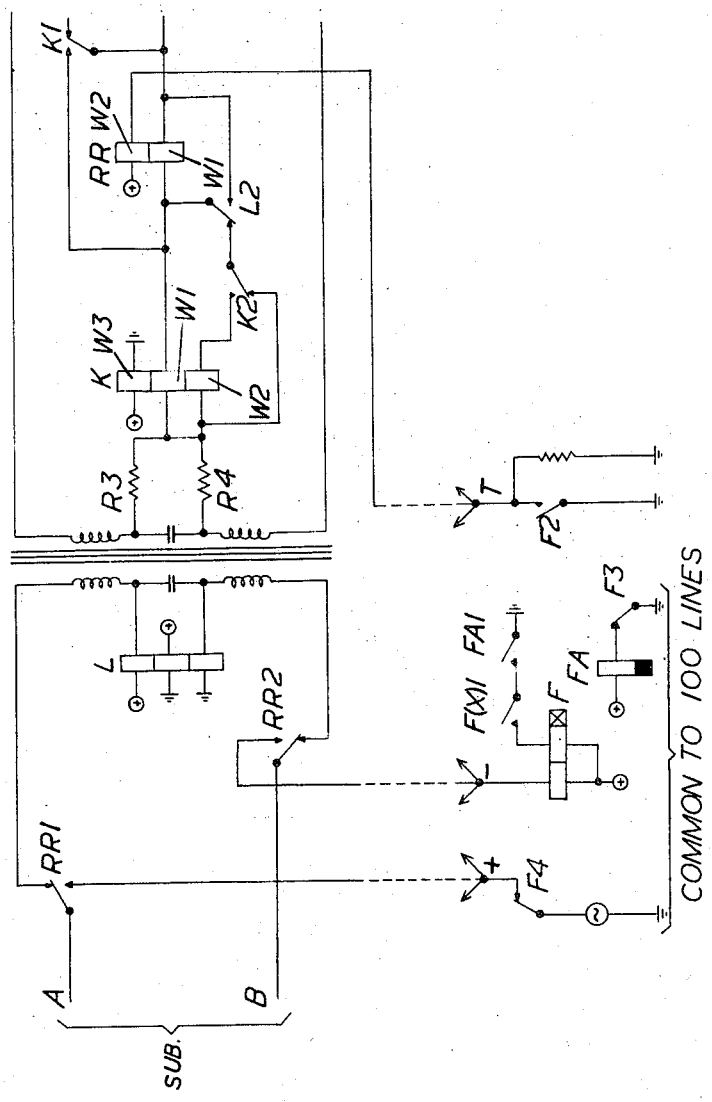
Figure 7:
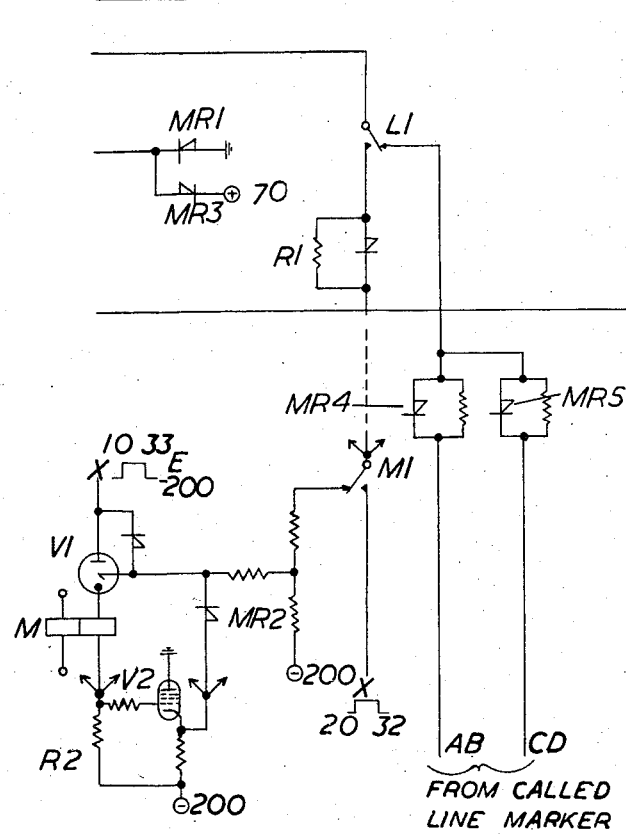

Figs. 6 and 7, of which Fig. 7 should be placed to the right of Fig. 6, show such of a subscriber's line circuit as is inside the exchange.

Figure 8:
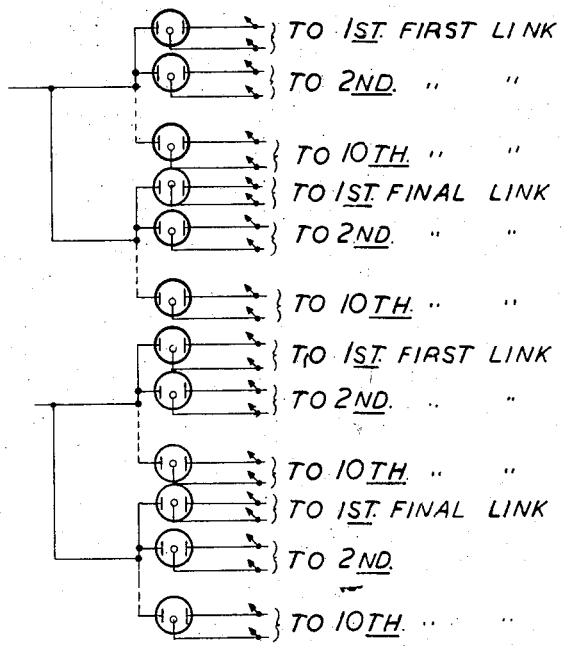

Fig. 8, which should be placed to the right of Fig. 7, shows part of the terminal connector, or incoming and outgoing line switches.

Figs. 9 to 12, which should be arranged as shown in the inset of Fig. 9, show a first link circuit. Fig. 9 should be placed to the right of the terminal connector in Fig. 8.

Figure 13:
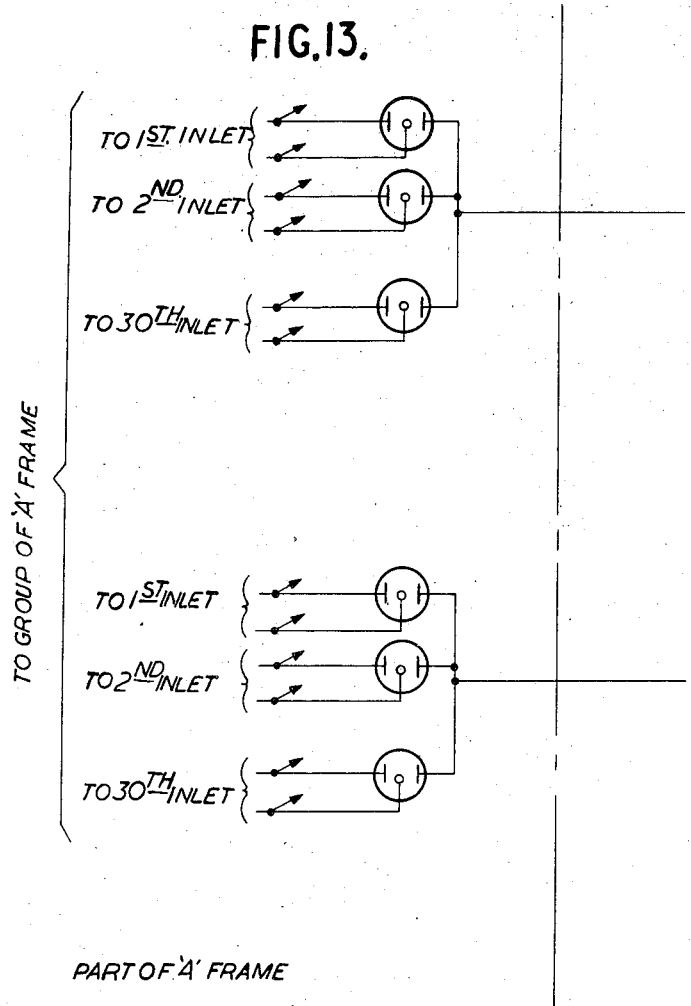
Figure 14:
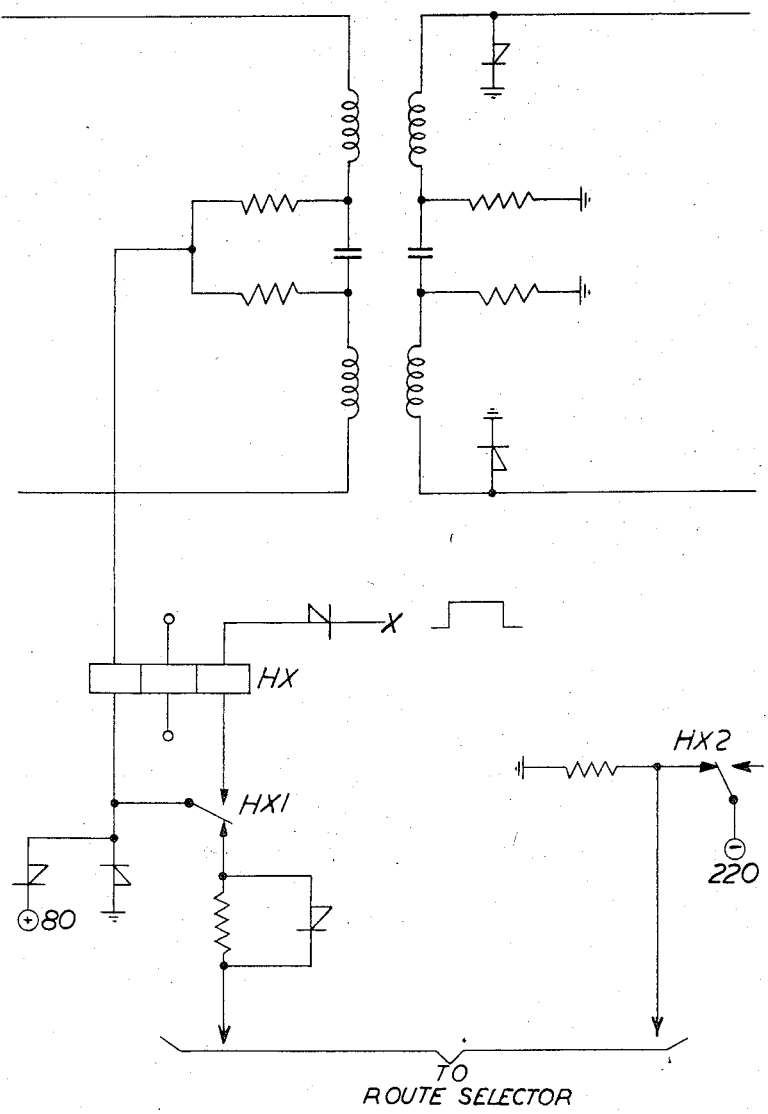
Figure 15:
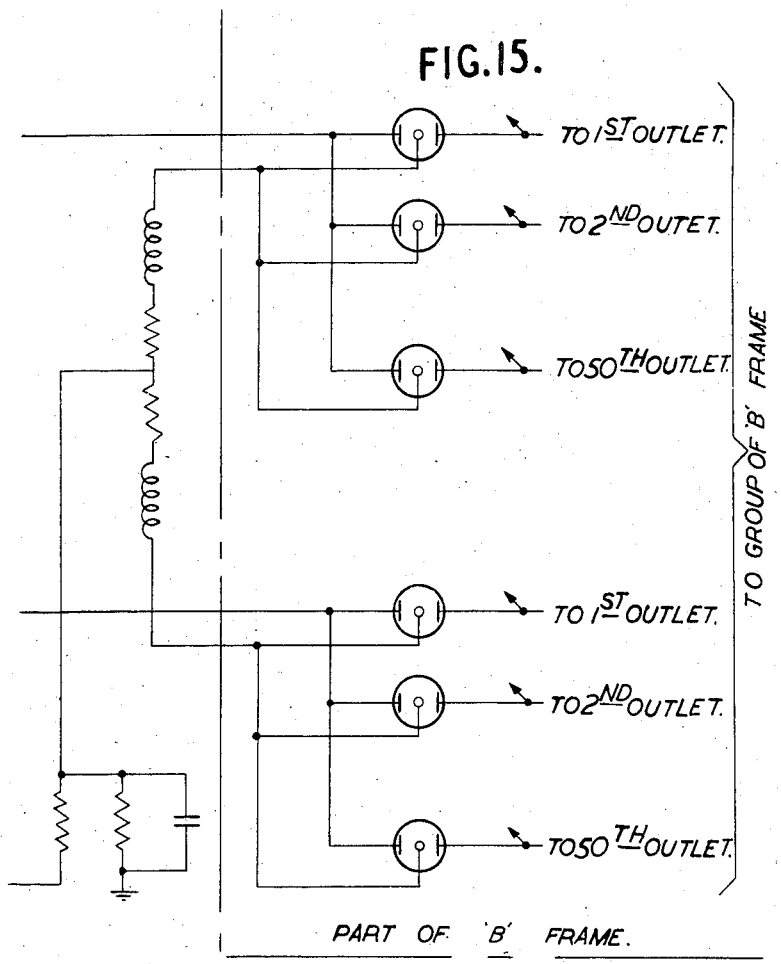

Figs. 13, 14 and 15, of which Fig. 14 should be placed to the right of Fig. 13 and Fig. 15 should be placed to the right of Fig. 14, together show an intermediate link circuit functioning as a second link. Fig. 13 should be placed to the right of Fig. 12.

Figure 16:
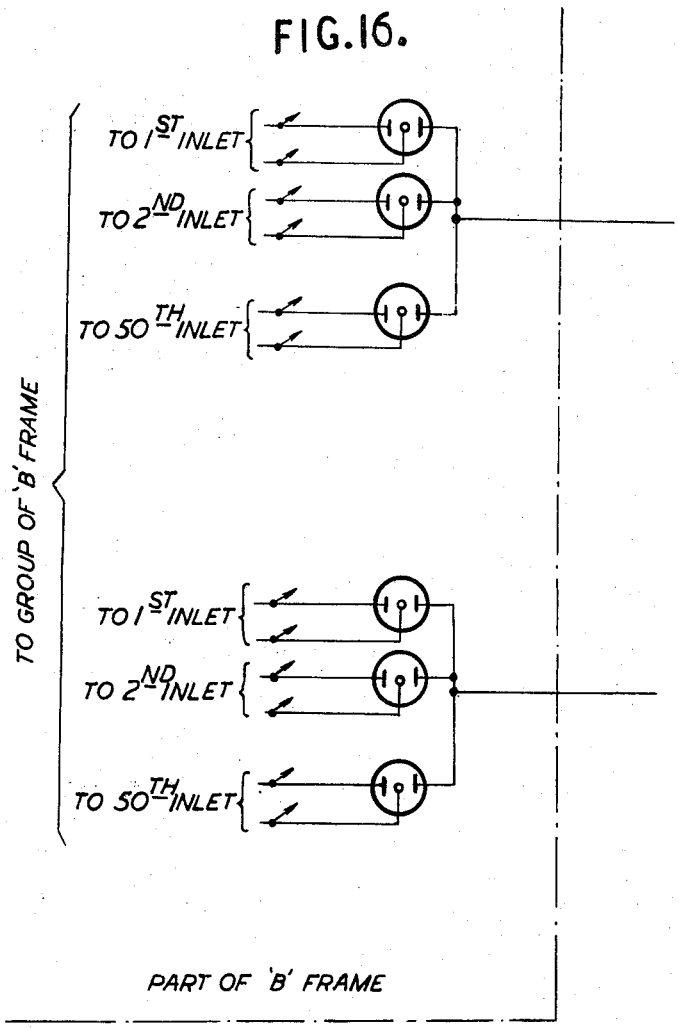
Figure 17:
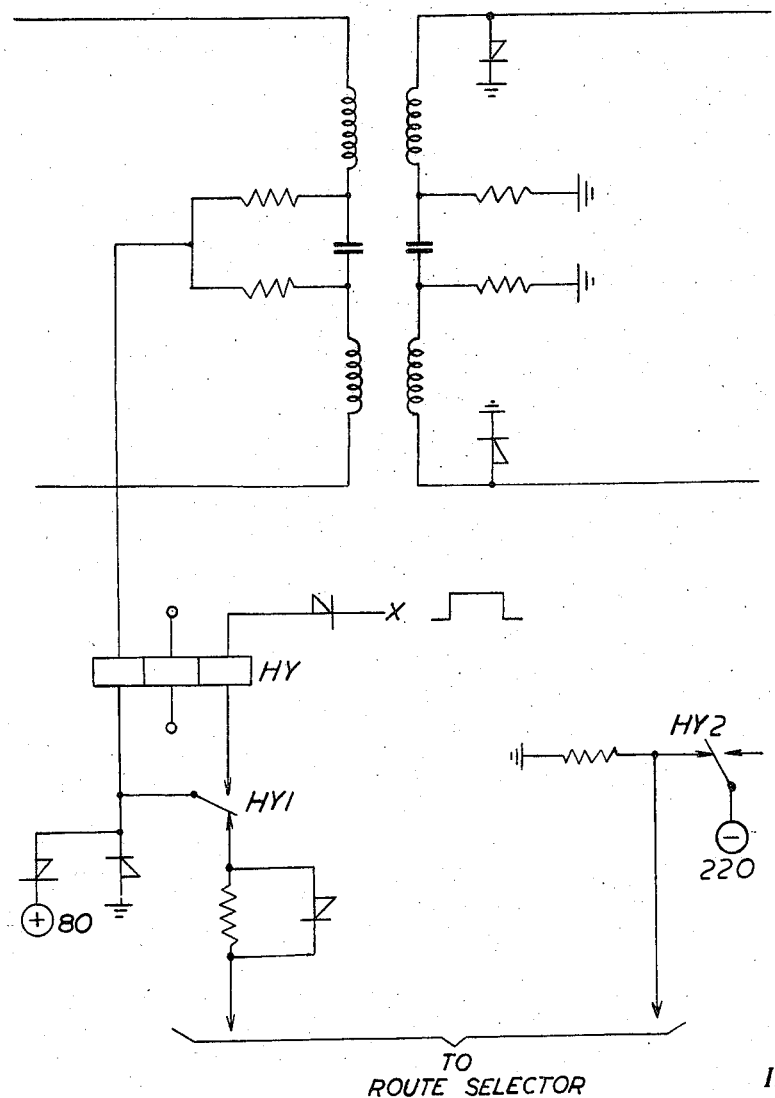
Figure 18:
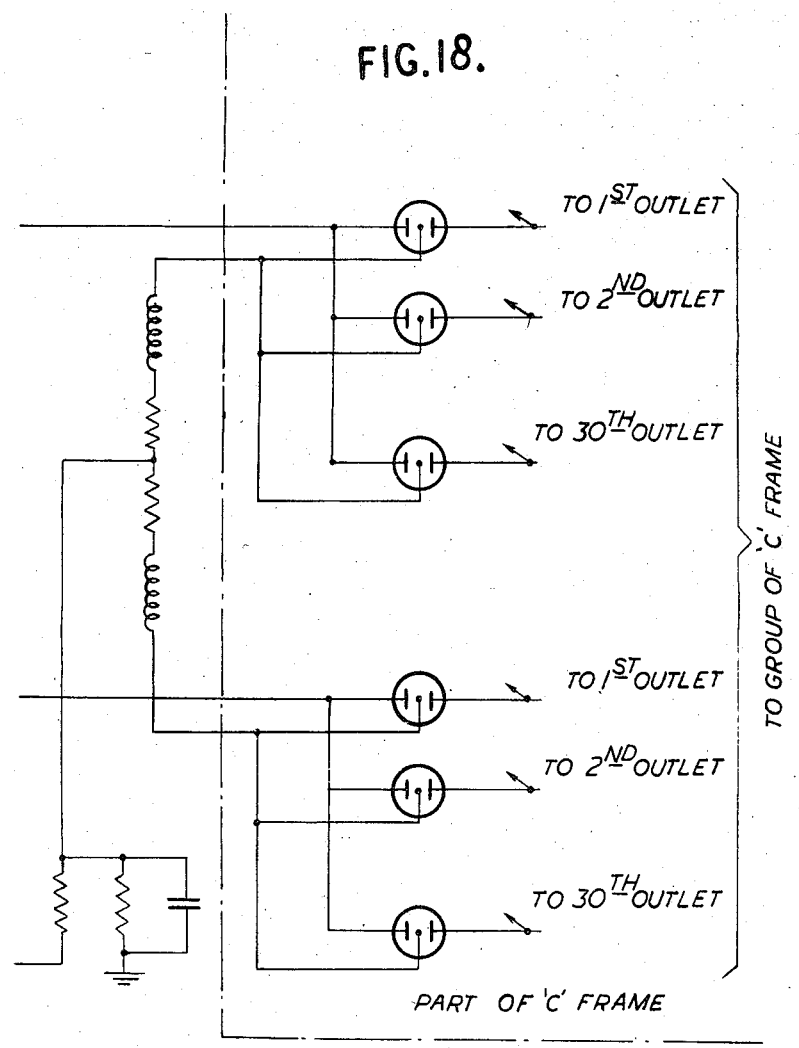

Figs. 16, 17 and 18, of which Fig. 17 should be placed to the right of Fig. 16 and Fig. 18 should be placed to the right of Fig. 17, together show an intermediate link functioning as a third link. Fig. 16 should be placed to the right of Fig. 15.

Figure 19:
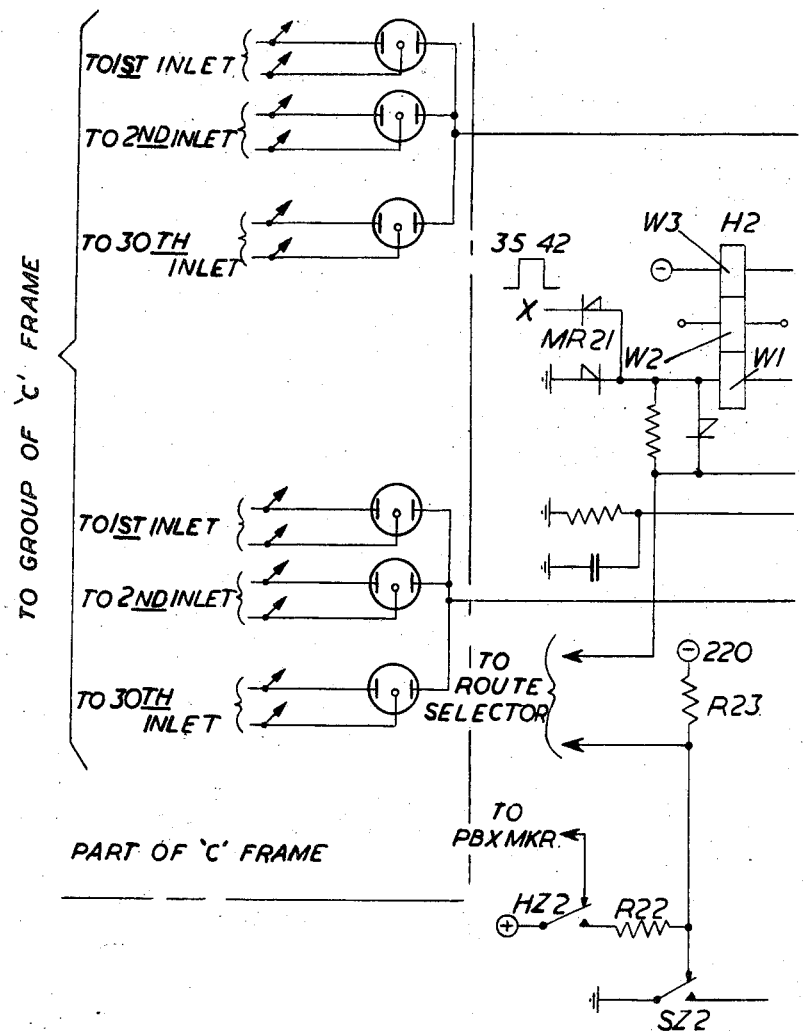
Figure 20:
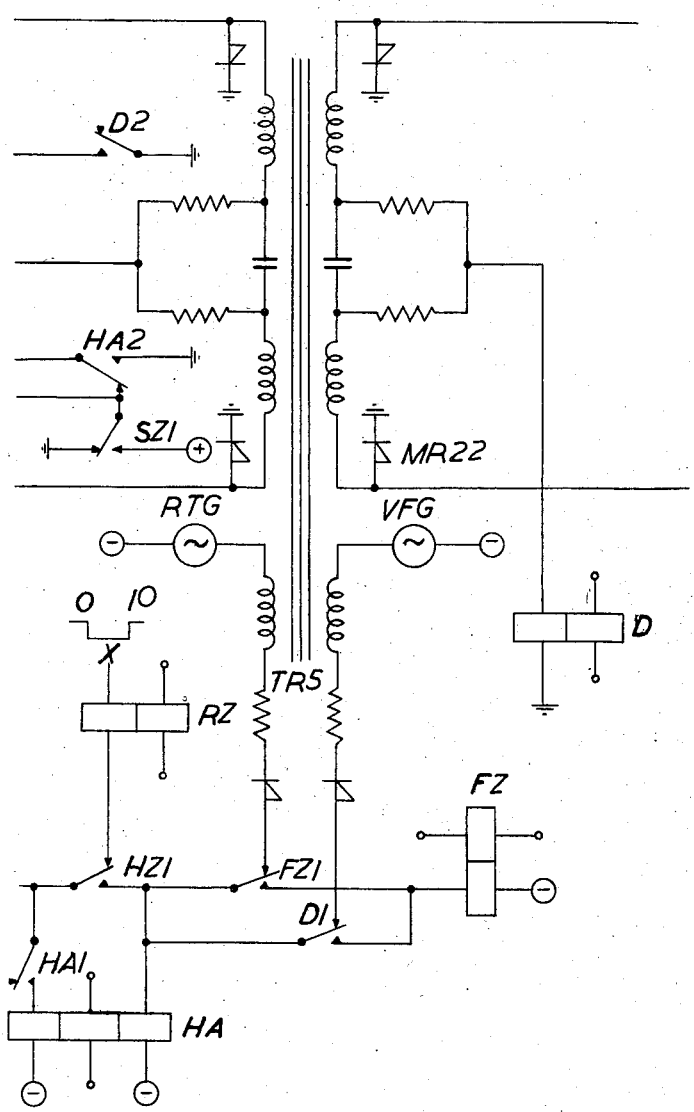
Figure 21:
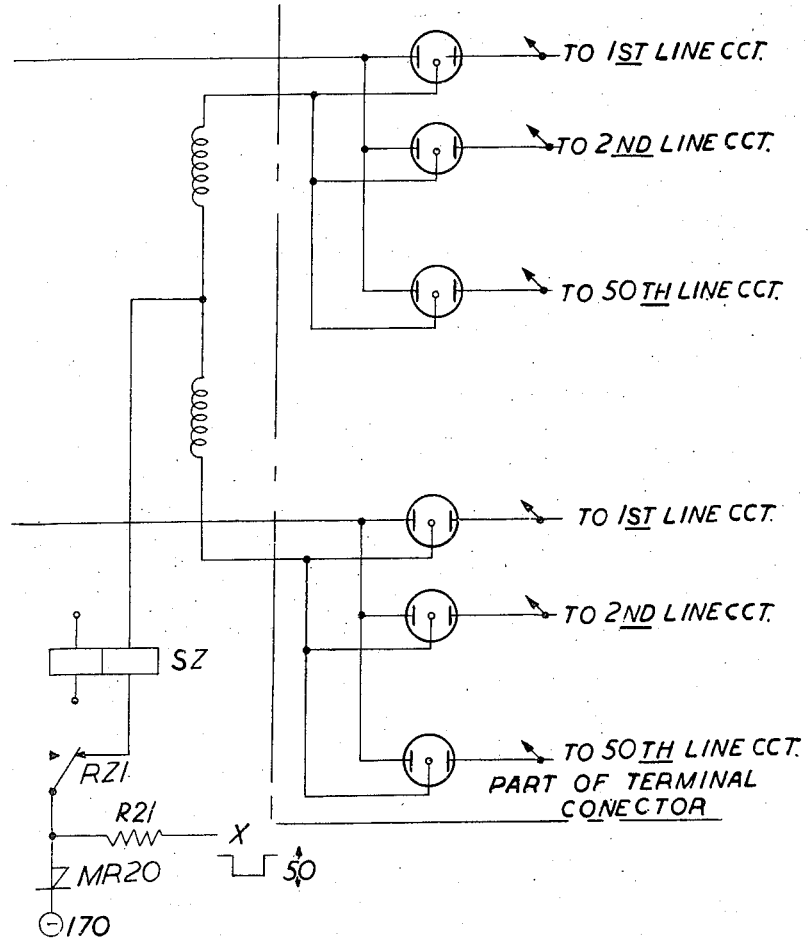

Figs. 19, 20 and 21, of which Fig. 20 should be placed to the right of Fig. 19 and Fig. 21 should be placed to the right of Fig. 20, together show a final link circuit. Fig. 19 should be placed to the right of Fig. 18.

Figure 22:
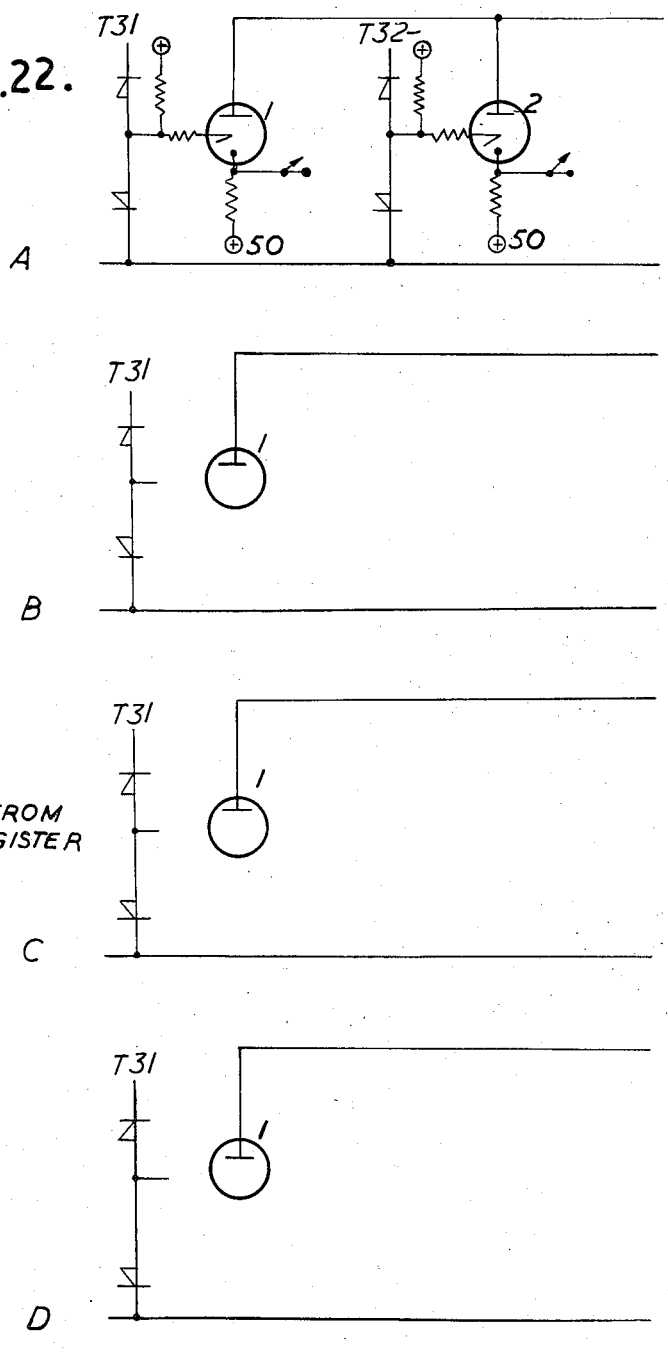
Figure 23:
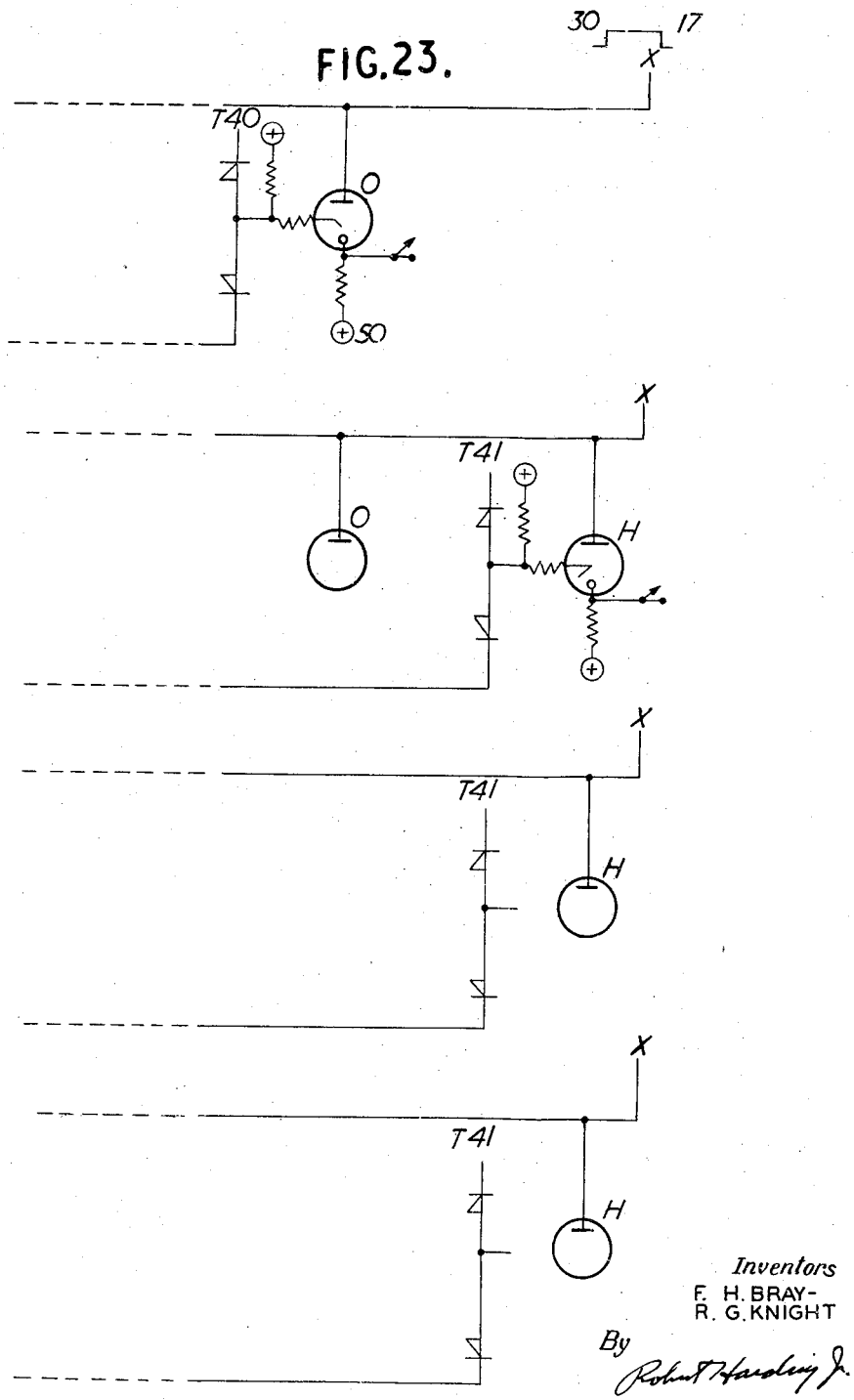
Figure 24:
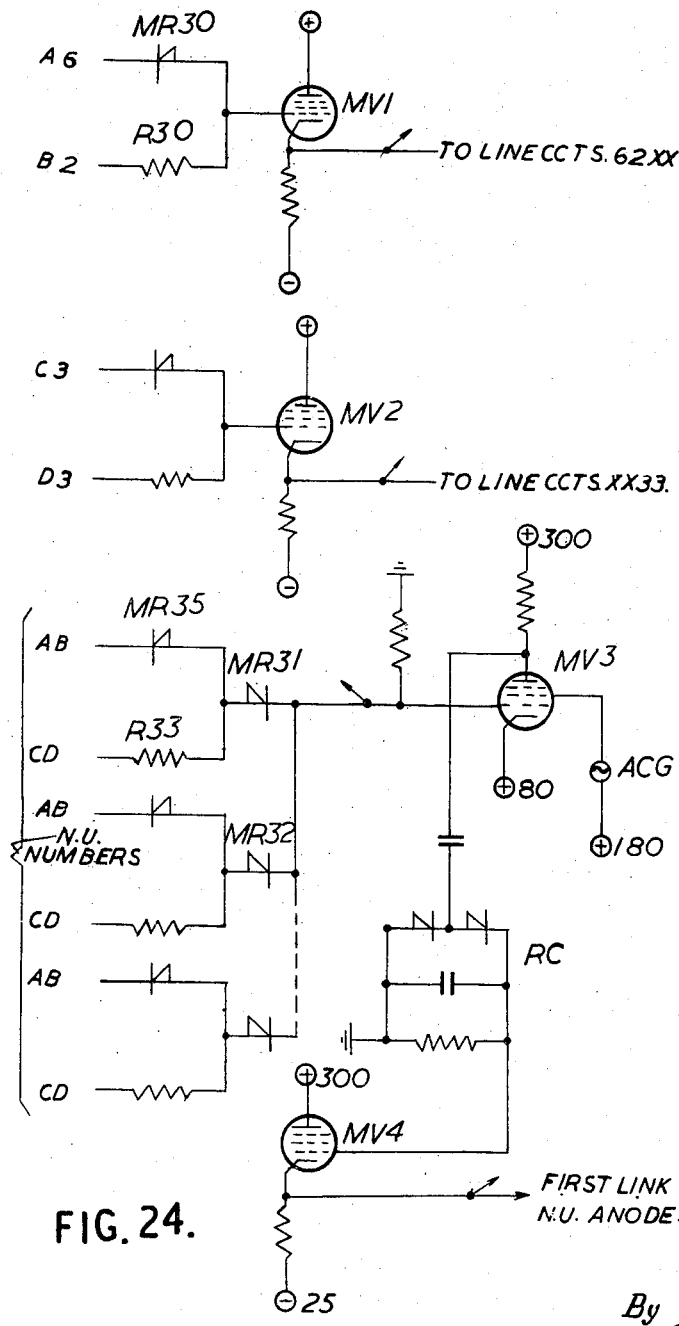

Figs. 22, 23 and 24, of which Fig. 23 should be placed to the right of Fig. 22 and Fig. 24 should be placed to the right of Fig. 23, together show the so-called line marker circuits.

Figure 25:
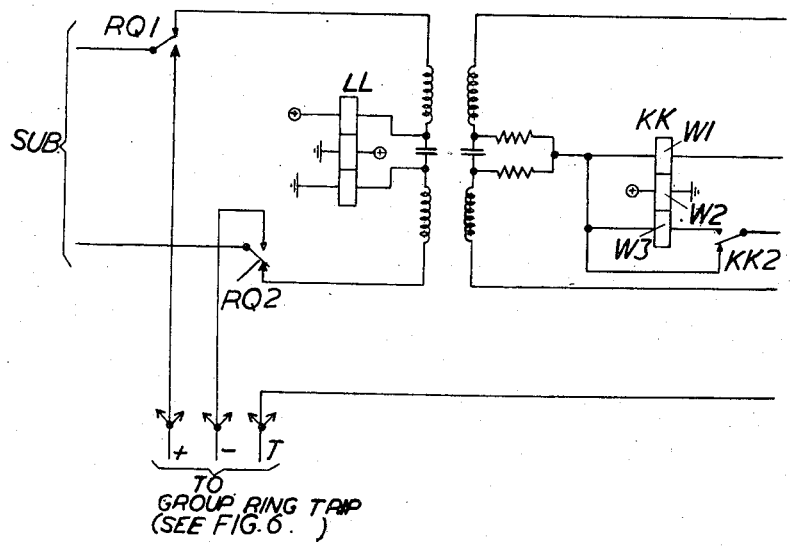
Figure 26:
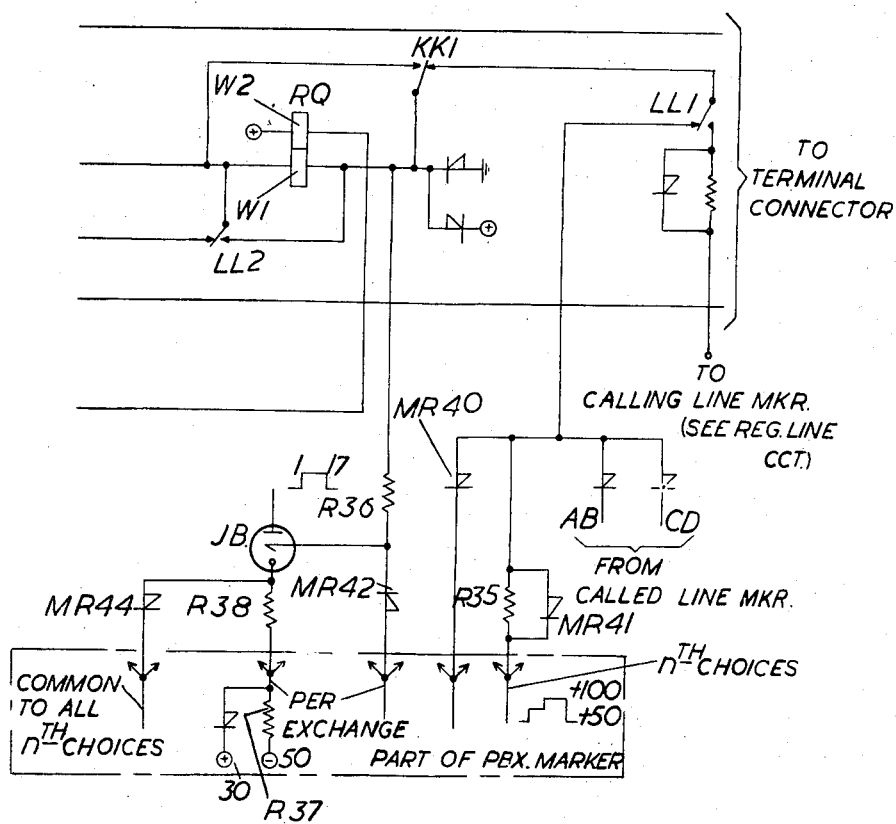

Figs. 25 and 26, of which Fig. 26 should be placed to the right of Fig. 25, together show a P. B. X line circuit.

Figure 27:
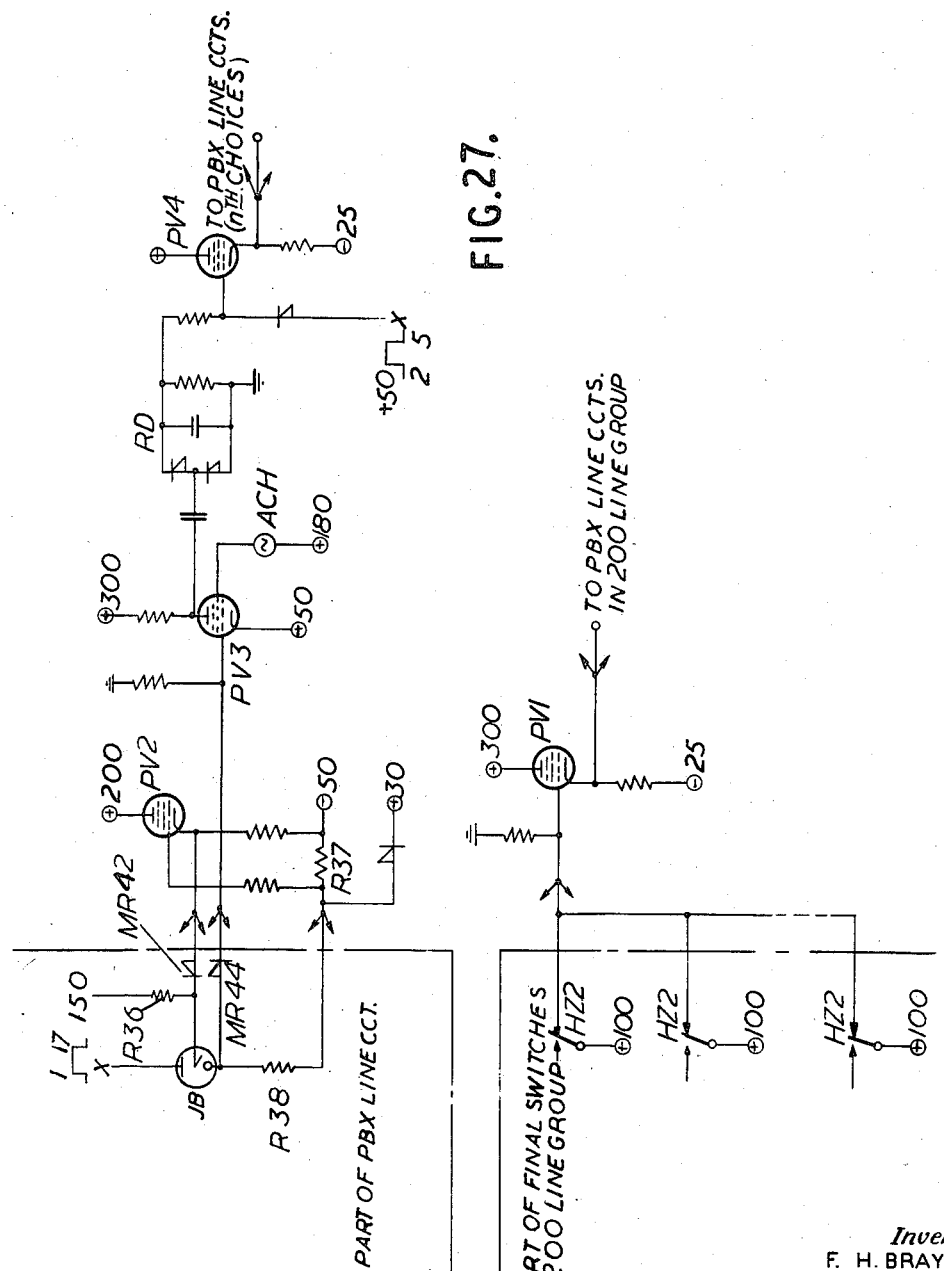

Fig. 27 shows a P. B. X marker circuit.

Figure 28A:
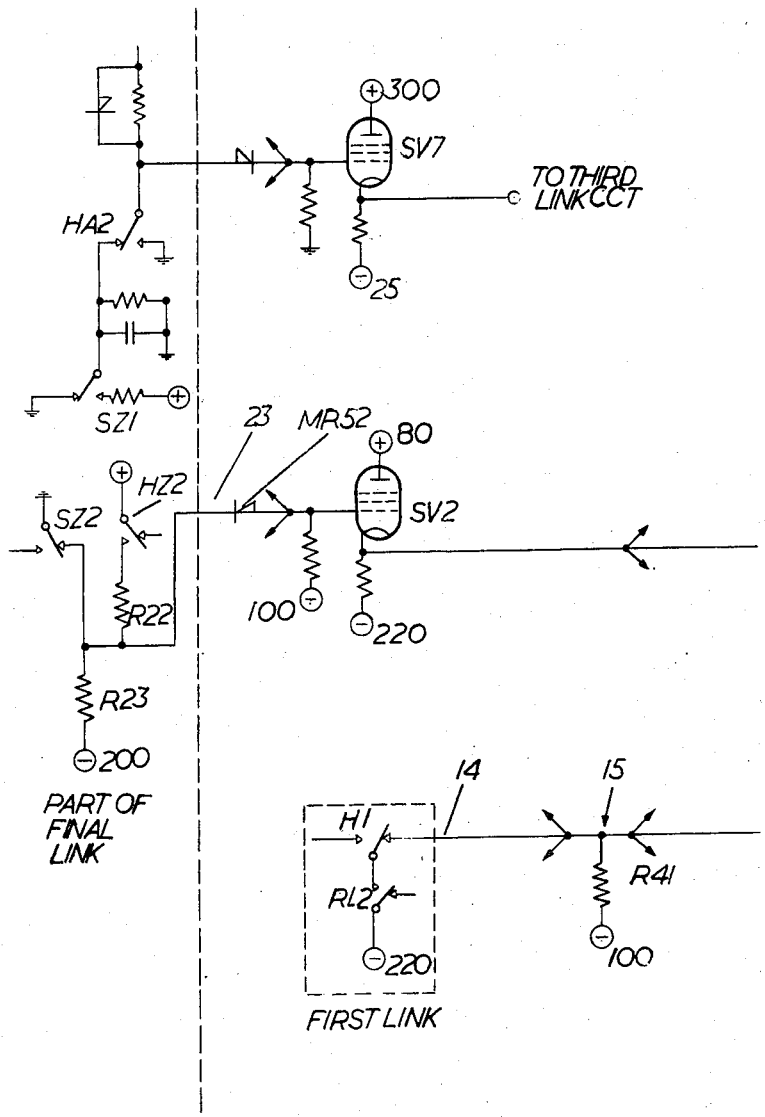
Figure 29:
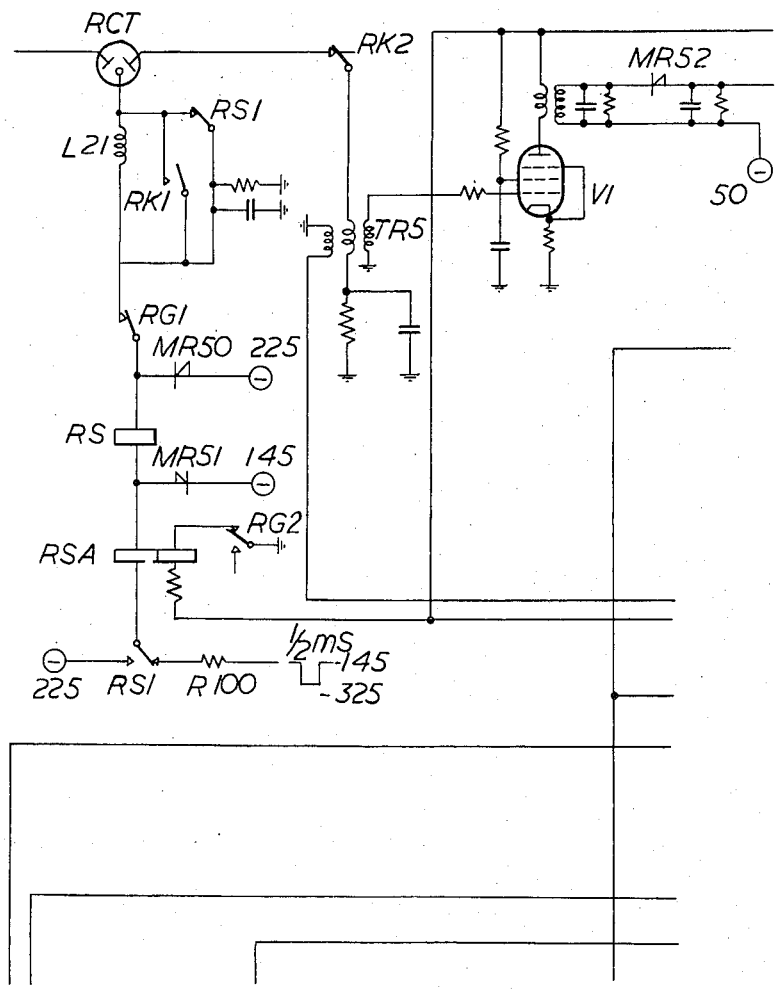
Figure 30:
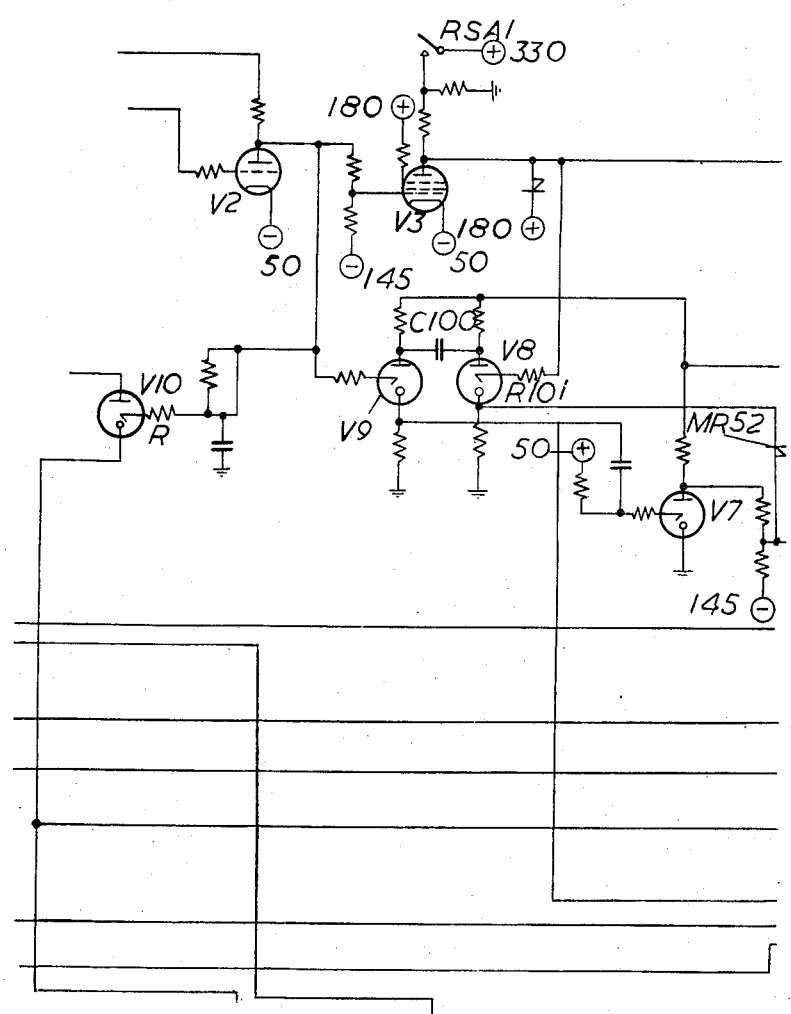

Fig. 28A and 28B of which Fig. 28B should be placed to the right of Fig. 28A show the route selector. This should be placed below Figs. 9 to 18.

Figure 31:
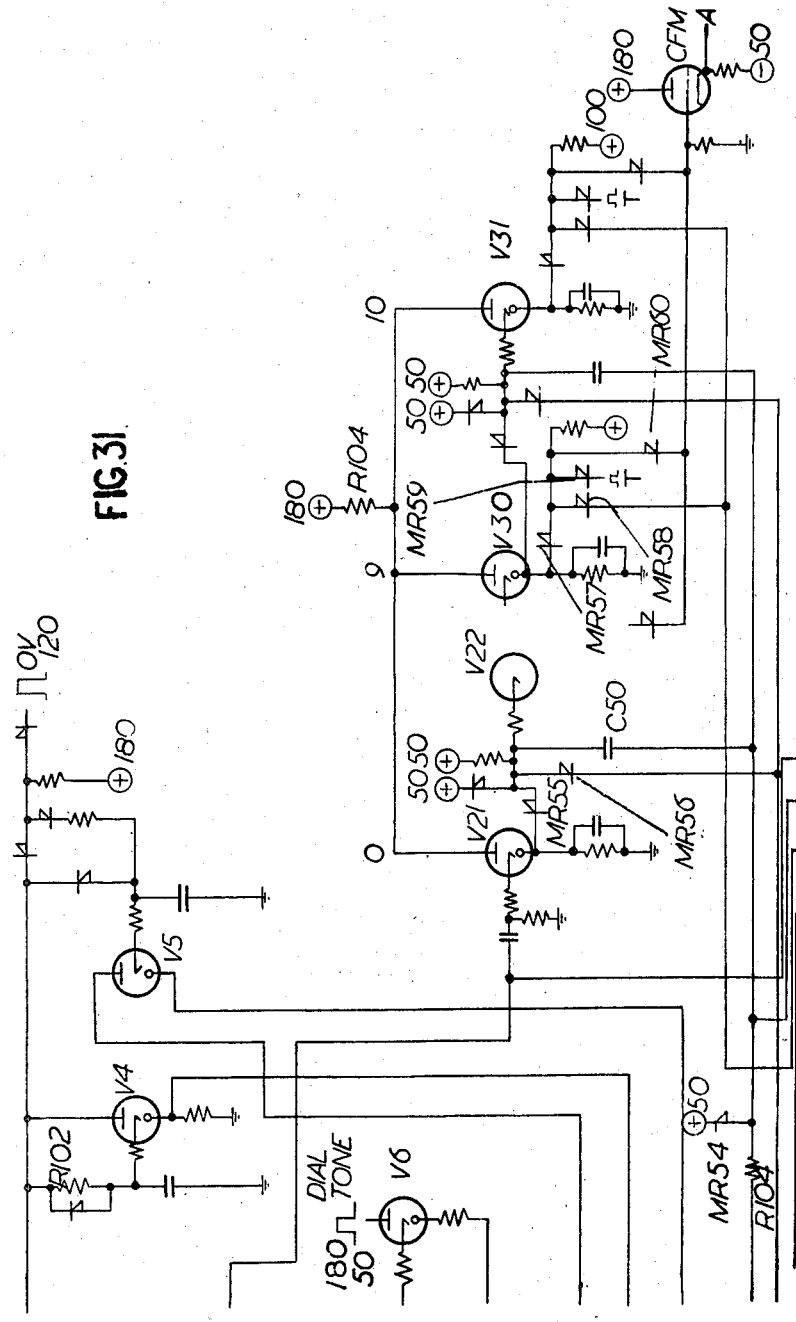
Figure 32:
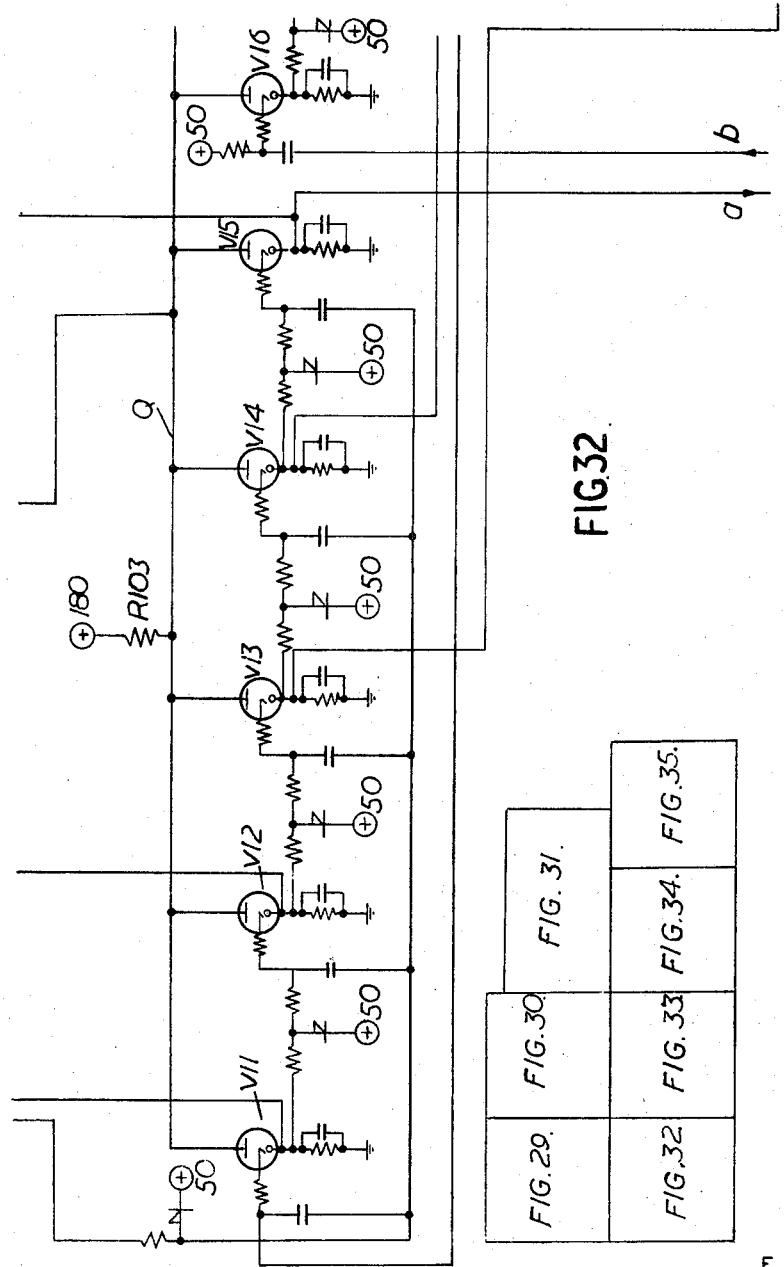

Figs. 29 to 35, which should be arranged as shown in the inset to Fig. 32, together show a register.

Figure 36:
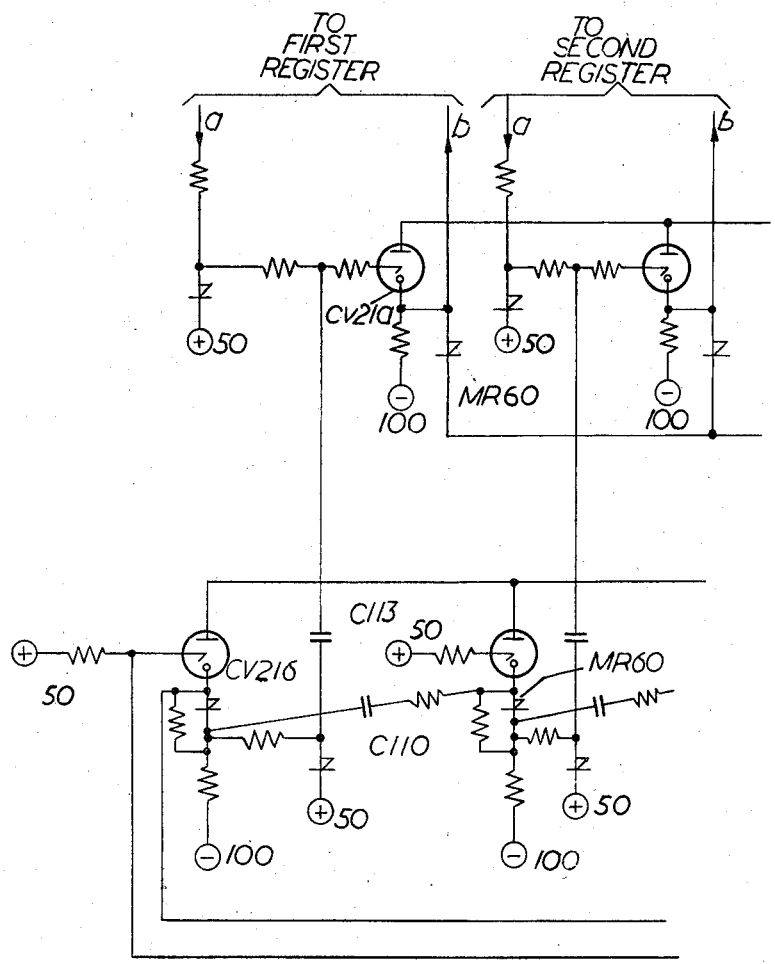
Figure 37:
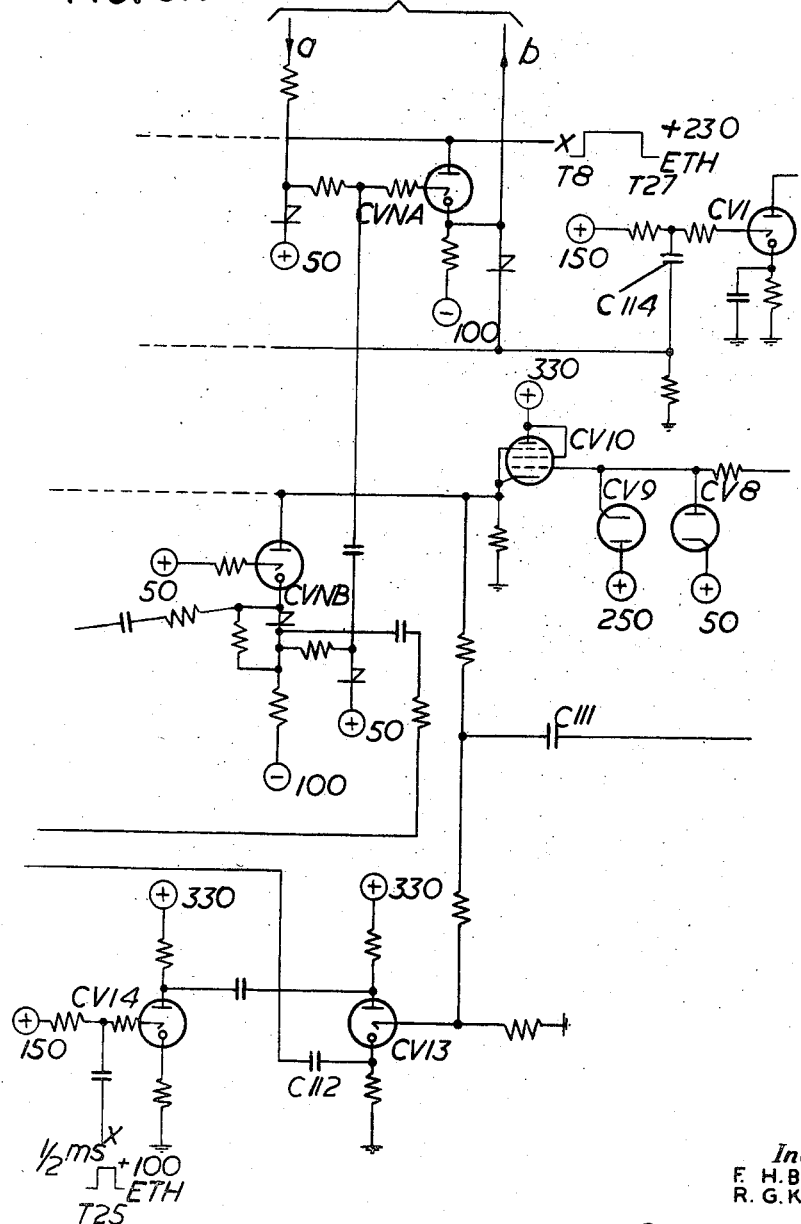

Figs. 36 to 38, which should be arranged as shown in the inset to Fig. 36, together show a call distributor.

Fig. 39 shows a gas tube co-ordinate multiswitch, being one of the B frame multi-switches.

In the above brief description of the drawings there will be noted statements specifying how the various circuits fit together. To render it more convenient to understand these drawings, there is a certain amount of overlap between some of the drawings which are indicated as being adjacent to each other.

*Introductory note*

In U. S. Patent Application Ser. No. 458,934, filed Sept. 28, 1954, a telecommunication exchange system is described, in which calls are set up stage by stage, one call only being established in one stage at a time, this call being controlled by a marker common to that stage. Registered controllers are provided common to all selection stages and these registers co-operate with the stage markers for controlling the selection stage by stage. Thus a number of calls can be in the process of being set up subject to the limitation that only one call can be set up at once at any one stage. The selectors through which connections are established are static electrical switches comprising cold cathode gas-filled discharge tubes which are constructed in the manner described and claimed in U. S. Patent No. 2,775,722 granted Dec. 25, 1956. Such tubes are interconnected as described in U. S. Patent Application Ser. No. 458,934, filed Sept. 28, 1954, to constitute a static electrical switch, said switch being controlled by a coincidence of conditions as has been described in U. S. Patent No. 2,774,820, granted Dec. 18, 1956.

The system to be described employs such switches with the same method of control but differing from that described in U. S. patent application, Ser. No. 458,934, filed Sept. 28, 1954, in the method of establishing the connection, as will now be described with reference to the attached drawings. In the diagram shown in Figs. 1 to 3 of these drawings, the switches are shown in a simplified form as though the connections are set up over a single-wire. However, the system is, as can be seen from the detailed circuits, e. g. Figs. 6 and 7, a two-wire system so that each connection between an inlet to a switch and an outlet therefrom is established via two tubes one in each of these wires.

Each of these tubes has a single cathode and two anodes, a wire of an inlet being connected to one anode and a wire of an outlet being connected to the other anode. When discharges occur between the anodes and the cathode a low impedance path is set up between the anodes, which path is substantially noise free. The characteristics of these tubes are such that, under the conditions in which they work in the circuits shown, the cathode current of the tube is substantially constant when there are discharges between the cathode and its two anodes. Hence an increase in the current flowing in one anode circuit causes a similar decrease in the current flowing in the other anode circuit, and vice versa. Therefore a substantially noise-free anode-to-anode path is, in effect, set up.

The switches at certain of the stages are each constructed as co-ordinate switching assemblies, there being a tube for each wire at each crossing point between an inlet and an oulet. For each wire, the tube at a crossing point has one anode connected to an inlet wire and the other anode connected to an outlet wire. The cathode is connected to a priming circuit associated with the inlet. When an inlet to the switch is seized, the cathodes of all of the tubes associated with that inlet are primed. The outlets from the switch are then sequentially primed by pulses applied to the outlet anodes, anodes for different outlets being successively primed under the control of electrical pulses. When a tube at a crossing point has its cathode and its outlet anode both primed it fires. Both tubes for the same crossing point fire together, and the inlet and outlet interconnected thereby are both busied. This is in principle similar to the system described in U. S. Patent 2,774,820, granted December 8, 1956.

At certain other stages the testing is by pulsing the tubes, cathodes, as will be seen when the terminal connectors are described.

Although the speech path is over two wires, it will be noted that the trunking diagram only shows a single line for each connection. Thus each of the co-ordinate switch assemblies, which can be regarded as an unitary assembly of single switches, is shown diagrammatically as a number of horizontals, one per switch of the unitary assembly, crossed by a number of verticals. This method of representation is well known in showing, for instance, a crossbar type multi-switch. In the present case the "horizontal" connects together one anode of the individual gas tubes corresponding to the same inlet. The other anodes of the tubes are each connected to one outlet, so that the other anodes are also commoned together "vertical fashion.". Ionisation of any of these gas discharge tubes will provide a path between a horizontal and a vertical connection (i. e. between an inlet and an outlet) and furthermore when ionised the tube will busy the horizontal (i. e. the inlet) to any other vertical connection and also busy the vertical connection (i. e. the seized outlet) to any other horizontal connection. For descriptive purposes we have designated the horizontals as inlets and the verticals as outlets so that the ionisation of a tube connects an inlet to an outlet and as described in U. S. Patent 2,774,820, granted Dec. 18, 1956, the combination of inlet and outlet is busied to any other connection. One of the co-ordinate multi-switches is shown in Fig. 39.

*General description*

Subscribers are arranged in groups, for instance groups of 50, each subscriber being connected to an inlet to a terminal connector such as 1 (Fig. 1), the outlets of which are divided into 2 groups, the left hand group in Fig. 1 being connected to "first links" such as 2 (Fig. 1) for carrying traffic originated by the subscribers, the right hand group being connected to "final links" such as 3 (Fig. 3) for carrying terminating traffic to the group of subscribers. The terminal connectors therefore form subscribers' individual switches for extending connections from the lines for outgoing calls and for incoming calls. In the present case each individual switch has 10 outlets for incoming and 10 for outgoing calls, although separate switches for these purposes can be provided. In fact, in the present arrangement, each individual switch when used functions as an incoming switch or an outgoing switch.

Calling line markers such as 4 (Fig. 1) are provided such that 50 lines having the same tens and units digits are connected to one marker. Thus for a 10,000 line exchange there with be 200 such markers and it can be so arranged that any line which is calling will seize its marker, the seizure of any one marker preventing others from being seized. Thus when a subscriber such as 5 (Fig. 1) lifts his receiver a condition is applied to the marker 4 which in turn will mark the inlet of the terminal connector 1 connected to the calling line; in fact the marking will be applied to the inlets of all terminal connectors for those subscribers (having the same tens and units digits) which are associated with that marker and which are calling. Outlets of terminal connectors connected to first links are scanned by pulses which are applied in turn to the outlets in accordance with a repetitive cycle of time position, in the manner described in U. S. Patent 2,774,820, granted Dec. 18, 1956. When a free outlet is found the coincidence of the inlet being marked and the pulse appearing at a free outlet will cause the gas discharge tubes to ionise and the subscriber is connected to a free 1st link circuit such as 2.

This link circuit then automatically associates itself with a free register such as 6 via a register connector such as 7 as for instance described in U. S. patent application Ser. No. 458,934, filed Sept. 28, 1954. Dialling by the subscriber is detected in the first link circuit and the dialled impulses are repeated via the register connector 7 to the register 6 where they are stored in a manner similar to that used in U. S. patent application Ser. No. 458,934, filed Sept. 28, 1954. That application also describes how a call distributor such as 8 co-operates with a register which has received its complement of digits and signals this register and this register only to proceed to establish the call.

In this system, when the register receives a signal to proceed from the call distributor 8 it passes the dialled information into a called line marker 9 over four leads M, C, D, U. In the called line marker 9, the 1000's, 100's, 10's, and units digits are stored by firing a gas discharge gap in each of 4 groups of gaps. Such an arrangement for transmitting dialled information from the register to such marker circuits is again similar to that described in the above-mentioned U. S. patent application, Ser. No. 458,934, filed Sept. 28, 1954. The outputs of tubes in the 1000's and 100's groups are mixed to give 100 discrete points or bus-bars such as 10 one of which will have a potential derived from the fired tube in the 1000's group and the final tube in the 100's groups.

Similarly one of another 100 discrete points or bus-bars 11 will have a potential applied to it from the 10's and units tubes which are fired. The potentials at these 2 points on the bus-bars together determine the identity of the called subscriber. Each subscriber's line circuit such as 5 has a gate 12 known as the line mark gate connected to one terminal in each of the 2 groups of 100 terminals or bus-bars. Thus if the called number is 4467 the gate will be connected to terminals "44" and "67." The output from this gate 12 applies a marking condition to the inlet of the terminal connector of the called subscriber.

One register only can control the establishment of a connection at a time and it is arranged that a predetermined time period hereinafter designated "T" is allotted for this purpose. During this time period a certain interval is allocated for connecting the calling subscribers to a first link circuit and another interval for connecting a called subscriber with a final link. This ensures that when the inlet of a terminal connector is marked, outlets to first or final links are scanned under control of the timed pulses depending on whether the line is calling or being called. Thus there is no chance of any conflict between incoming and outgoing calls. The inlet of the terminal connector connected to the called subscriber is marked as described, and the outlets connected to final links are scanned during the period allocated for this function within the time period "T." This scanning finds a free link which constitutes an outlet from the "C" frame to the terminal connector. While the register was passing the called subscriber's number to the called line marker it also passed a condition to the first link via the register connector 7. The first link circuit constitutes an inlet to the "A" frame so that an inlet to the "A" frame, and an outlet of the "C" frame are now marked and means are now provided for establishing a free path between these 2 points.

The trunking diagram shows three frames designated A, B and C it is convenient to assume these frames divided into groups. In the present case the "A" frame is divided into 50 groups each group having inlets connected to "first links." The links forming the inlets to one of the groups in the A frame are connected to the outlets of the terminal connectors for 4 groups of 50 subscribers, there being sufficient links to carry traffic originated by those 200 subscribers and these links are "graded" over the terminal connector outlets. Assuming there are "X" outlets from each group in the "A" frame, then there will be "X" groups in the "B" frame each group having 50 inlets. Thus outlet 1 from the first "A" group is connected to inlet 1 of the first "B" group and outlet "X" to inlet 1 of the "X" B group. Similarly outlet 1 from the 50th "A" group is connected to inlet 50 of the first "B" group and outlet X to inlet 50 of the "X"th B group. Outlets from each of the "A" groups therefore have access to an inlet of each of the "B" groups.

The "C" frame is similar to the "A" frame comprising 50 groups each group having access to a number of final links serving 200 subscribers. Outlet 1 of the first "B" group is connected to inlet 1 of the first "C" group and outlet 50 of this "B" group is connected to inlet 1 of the 50th "C" group. Similarly outlet 1 of the "X"th B group is connected to "X" inlet of the first "C" group and the 50th outlet of this group is connected to the "X" or last inlet of the 50th C group. Thus each outlet from the "A" frame has, via the "B" frame, access to each group of the "C" frame and hence access to each group of 200 lines.

As previously described, the identity of the called subscriber has been determined and the terminal connector of this subscriber has been associated with a free final link which in turn is connected to an outlet of a group in the "O" frame. Also the first link associated with the calling subscriber and constituting an inlet to a group of the "A" frame has via the register marked this inlet.

A route selector 13 (Figs. 2 and 3) common to the exchange now selects a free path to connect the marked inlet in the "A" frame to the marked outlet of the "C" frame as will be described with reference to the schematic diagram of this route selector, Figs. 4 and 5.

The first link circuit 2 when it is marked as an inlet to the "A" frame applies a condition via a lead 14 (Fig. 2) to a circuit common to all inlets of that group in the "A" frame. This circuit does not appear in Fig. 2, but is represented by the block 15 in Fig. 4.

There are similar circuits for each group, each being controlled over a separate lead such as 14. The circuit 15 (Fig. 4) in turn applies a condition to gates AG1, AG2, . . . each of which is individual to one of the outlets from that group of the A frame. As can be seen from Fig. 4, there is a similar set of gates for the outlets of each group. Each of these A. G. gates has a control which is only energized if the outlet to which it corresponds is free, and so the gate will only open if, in combination with the condition due to a marked inlet, the outlet is free. Thus gates corresponding to free outlets from the group of the "A" frame on which the marked inlet occurs will open.

Similarly when the final link 3 (Fig. 3) was seized and was marked as an outlet from the "C" frame it applied a condition over a lead such as 16 (Fig. 3) to a circuit such as 17 (see Fig. 5) common to all outlets of that group of the "C" frame. As in the case of the inlets there is a similar circuit per group of the C frame, each being controlled over a separate lead such as 16. This circuit 17 in turn applies a condition to gates CG1, CG2, . . . which are individual to all inlets to this "C" frame group and these gates will only open if the inlets associated therewith are free. Thus a number of gates are opened denoting free outlets from the "A" frame and a number are opened denoting free inlets to the "C" frame.

The outputs from these gates are taken respectively to master gates MAG1, 2 . . . and MCG1, 2 . . . and these gates in turn will denote free outlets and free inlets from and to the "A" and "C" frames respectively, and devices such as 20, 21 connected to the outputs of these gates will be operative when the gates are opened. These devices in turn each apply a condition to one of the gates G1, G2, . . . so that if, for instance, outlet 1 from the "A" frame and inlet 1 to the "C" frame is free then the gate G1 will open and will actuate a control device 21A which will apply a condition to outlets 1 from all groups of the "A" frame. This occurs via a lead such as 22, Fig. 3. If inlet 1 to the "C" frame was busy then this gate would be inoperative.

The devices which are shown as connected to outlets "I" to "N" from the "A" frame are therefore only operative if a free condition exists between correspondingly-numbered outlets and inlets of the A and C frames. If a number of the devices whose outputs are shown as being connected to outlets from the "A" frames are operative via their gates, it is arranged that one and one only will operate. This can be achieved in a variety of ways as for instance, using the well-known lock-out principle where one device on operating prevents others from operating. Therefore one device of 1 to 50 operates, and a condition is fed to all the correspondingly numbered outlets from the A frame. In the present case, it is assumed that device No. 1 of the devices 21A operates, so the operating conditions are fed to the No. 1 outlets from all groups in the "A" frame, but since one only one inlet to the A frame is marked then that inlet is connected to the No. 1 outlet from its own group of the A frame due to the ionisation of a gas discharge tube forming a part of the "A" frame selector. The outlet of the "A" frame when seized will automatically mark an inlet to the "B" frame since it is directly connected thereto. The route selector applies a condition via leads such as 23 to all outlets of the "B" frame having access to the required group of the "C" frame so that when the inlet to the "B" frame is marked as just described a connection will again be established through the "B" frame and since the outlet from this frame is connected to an inlet of the required "C" frame group then this inlet will be marked, and a connection established to the outlet marked by the final link. A path has now been established connecting together the first and final links and hence connecting the calling and called subscribers. The complete operation occurs during one time cycle "T" at the end of which another register can perform its functions together with the called line marker and route selector for setting up another connection.

Having now described the principles of operation of the system in general terms, the various portions thereof will now be described separately, each being described with reference to the appropriate ones of the detailed circuit diagrams.

*Regular line circuit (Figs. 6–7)*

The term regular line circuit means that the line circuit being discussed is of the type used for most subscribers. The easiest way to describe it is to describe the operations which are involved in the line circuit for an outgoing call, for an incoming call, and for release.

*(a) Outgoing call*

When the subscriber whose line circuit is shown in Fig. 6–7 lifts his receiver to initiate a call, the line is looped in the usual way. This operates the line relay L over the contacts RR1, the loop and RR2. Since the relay L is operated, earth is applied via the rectifier MR1 (Fig. 7), the back contact of changeover contact K1 (Fig. 6), the front contact of changeover L1, a resistor R1 in parallel with a further rectifier and the back contact of changeover M1 to a calling line marker, which is common to the group of subscribers including the caller. This circuit is therefore common to 50 subscribers having the same tens and units digits. As there are 100 subscribers in a 10,000 line exchange who have the same tens and units digits, each of these common circuits is allocated to all subscribers with the same tens and units digits and either an odd or an even hundreds digit. Thus there are 200 of these circuits.

It will be seen that the 50 lines served by a calling line marker all appear in different numerical groups of subscribers. This ensures that when one calling line marker is seized, it cannot mark more than one calling line in any one numerical group. This could happen if this measure were omitted.

This earth, which reaches the common circuit including tube V1 (Fig. 6), is applied to the upper end of a potential divider whose lower end is connected to −200 volts. This raises the potential of the trigger electrode of tube V1 from −200 volts to about −100 volts, and so when the anode of the tube goes positive the tube fires. As is indicated in Fig. 7, this happens at the commencement of the tenth time position of the time cycle. As has already been indicated, the operation of the system which is described herein occurs under control of a repetitive cycle of time positions and this time cycle consists of 42 time positions, and since each time position is equal to 1 millisecond, the full cycle is 42 ms.

To return to the operation of Figs. 6–7, when the anode of V1 goes positive, i. e. rises in potential from −200 volts to earth, at T10, tube V1 fires and continues to discharge until T33, at which time the anode of V1 returns to −200 volts and V1 is extinguished. When V1 is fired at T10, the relay M which is connected in the cathode circuit of the tube is operated by the current which flows through its right-hand winding.

Included in the cathode circuit of tube V1 is a lock-out resistor R2, which is common to the cathode circuits of all 200 of the tubes such as V1. As is usual with such resistors, the voltage drop thereacross maintains the voltage on the commoned point in the cathode circuit at a value which is such as to prevent any other of the tubes V1 from firing. To avoid spurious breakdowns between the trigger and cathode of unfired tubes due to the common lock-out resistor R2, the upper-most end thereof is connected to the control grid of a cathode follower tube V2. The output from the cathode of V2 is connected via rectifier such as MR2 to the triggers of all of the tubes such as V. Hence when any one of the V1 tubes fires the potential on the triggers of all of the other gas tubes will be raised to about the same potential as are the commoned cathodes. This ensures that no spurious firing can occur.

The next stage in the proceedings occurs at T20, when a positive marking condition lasting for 12 ms., i. e. until T32, is applied over front contact M1 to all 50 line circuits with which the operated M relay is associated. Since the line circuit of the calling subscriber now has its own L relay and its associated M relay operated, this marking condition is applied via M1 and L1 front contacts, H1 back contact, L2 front contact, the winding W1 of relay K, resistors R3 and R4, the windings of the repeater coil and the talking wires to one anode on each pair of gas gap tubes forming an inlet to the terminal connector. These tubes are shown in Fig. 8. Therefore one inlet to the terminal connector is marked as a result of the initiation of the call. The potential actually applied to these anodes is "caught" at +70 volts by rectifier MR3 (Fig. 7) to ensure that there is no premature firing of any of these tubes. As will be remembered, this seizure primes a number of these pairs of tubes, and access is possible via the terminal connector to a number of outlets, each via a different pair of the tubes.

The potential which is actually applied to these tubes via M1 and L1, etc., is actually greater than +70 volts, but it is caught at that voltage. This ensures that the rise time of this pulse is small in spite of the circuit and wiring capacitance.

The ten first link circuits such as 2 (Fig. 1) which are accessible from the calling subscribers inlet to a terminal connector are each connected to one anode of a pair of gas gap tubes, the other anodes of the pair being connected to the caller's line circuit. Therefore it is necessary to scan these outlets in search of a free outlet, and this is done, as will be described in more detail later, by applying pulses to the cathodes of the tubes to which the calling subscriber's line circuit is connected. These pulses are negative-going from −170 to −220 volts, last for ½ ms. and are spaced by ½ ms. They start at T21, and since there are 10 of these they continue to occur until T30. These pulses are applied to the gas gap tubes' cathodes sequentially. When a tube corresponding to a busy outlet is pulsed, this pulse is disabled as will be described later, it being dissipated across a resistor. Assuming that the first first link circuit is busy, then when the outlet from the terminal connector corresponding thereto is scanned, the pulse applied thereto is disabled. When a pair of tubes corresponding to a free outlet (free first link) have their cathodes pulsed they fire, because the anodes of the 10 pairs of tubes common to the caller are at +70 volts. Hence a pair of tubes which correspond to a calling line and to a free first link circuit are fired to interconnect these circuits.

When a pair of tubes are fired as just described, the current flows in rectifier MR1, winding W1 of relay K and relay S in the first link circuit (see below). The positive marking potential is dropped across the resistor R1. Due to the current flowing, the two relays K and S (Fig. 9) operate, and as will be clear from Figs. 9 and 10, current also flows from the "outlet" anodes of the fired tubes in the winding of relay A. When relay K operates its changes over its contact K1 (Fig. 6), disconnecting the positive marking lead via which the firing of the tubes was initiated. This also short-circuits relay RR, which is therefore unable to operate. As will be seen later this relay is used when the line circuit is operating for an incoming call. These conditions are balanced in so far as the tubes are concerned, and each anode of a tube passes 10 ma. Hence 20 ma. flows in the A relay (Fig. 10), which thereupon operates. As a result of this, as will be described later, a free register is seized, and this register sends dial tone to the calling subscriber. This tone is passed from the register via the register-connector and via the fired tubes in the terminal connector to the caller.

When the calling subscriber hears the dial tone he dials the wanted subscriber's number. As usual, the dialled impulses are breaks, and on each impulse relay L (Fig. 6) releases. With the L relay released, winding W2 of relay K is connected via L2 back and K2 up in parallel with winding W1 thereof. It will be remembered that when the tubes fired, K operated. The fact that windings W1 and W2 are in parallel increases the current flowing to the "inlet" anodes of the fired tubes which, as already mentioned and as fully described in U. S. Patent 2,775,722, granted Dec. 25, 1956, causes a decrease in the current flowing to the "outlet" anodes of the same pair of tubes. Therefore relay A releases, and, as will be described later, causes the application of a pulse of V. F. to the seized register. When the relay L re-operates on the end of the impulse, the paralleling of the windings of relay K ends, and the balance is restored, so that relay A in the line circuit (Fig. 10) re-operates. Typical current values for balance and unbalance conditions are:

|  | Line Circuit | | First Link Circuit | |
| --- | --- | --- | --- | --- |
|  | Total, ma. | Per tube, ma. | Total, ma. | Per tube, ma. |
| Balance | 20 | 10 | 20 | 10 |
| Unbalance | 40 | 20 | 7 | 3.5 |

It will be noted that with the relatively large charges of current involved in a dialled impulse, the relation between these currents is not linear. However, the relation is substantially linear throughout normal speech transmission.

Each dialled digit's impulses are repeated via the system to the seized register, and when dialling is completed, the line circuit of the called subscriber is marked and the speech path set up as will be described later.

Release of the line circuit will be described later.

*(b) Incoming call*

It will be remembered from the general description that when the impulse trains representing the number of a wanted subscriber have been stored in a register this number is transferred to a called line marker wherefrom a marking is applied to the line circuit of the called line. This is effected by energising the two leads feeding the gate 12 in Fig. 1 of which there is one per line circuit. This gate is formed by the two rectifiers MR4 and MR5 (Fig. 7), each of which has a resistor connected in parallel with itself. When the leads AB and CD of a line circuit both receive a positive marking from the thousands and hundreds digit combination, and the tens and units digit combination for the line circuit shown in Fig. 7, a positive potential is applied over back contacts L1 and K1, winding W1 of relay RR, back contacts L2 and K2, resistors R3 and R4, the repeater coils and the talking wires to the anodes of the pairs of tubes in the terminal connector for the called line. The potential which is so applied is "caught" at +70 volts at the junction between contacts K1 and the winding W1 of relay RR by the rectifier MR3 in the manner already described above. If only one of the leads AB or CD is energized, then this positive potential is not applied to the anodes of the tubes.

It will be seen from the part of the terminal connector shown in Fig. 8 that this positive marking condition is applied to the tubes of the terminal connector via which outgoing calls are set up and to the tubes thereof via which incoming calls are set up. That is, the portions of the terminal connector forming both incoming and outgoing line switches are "primed." However, there is no possibility of an inlet to the A frame (see below) being seized for a call incoming to the line circuit. The reason for this is that when the call being dealt with is an outgoing call, the "seizure" pulse which is applied to the anodes of the tubes in the terminal connector to which a line circuit is connected extends from T20 to T32, and the first link scanning pulses occur from T21 to T30. Now, as will be seen when the called line marking arrangements are described, the called line marking condition extends from T0 to T17. Actually the "called line mark" condition is from T30 (via T0) to T17, but, as will be seen later, part of this period prior to T0 is used for operating the called line marker from the register. The final links are scanned from T5 to T14 by negative ½ ms. pulses which are similar to those used for scanning the first links. Thus it will be seen that the operations for setting an outgoing call via the outgoing line switch portion of the terminal connector and for setting the incoming line switch portion of the terminal connector occur at different times within the operating cycle.

To return to the description of the establishment of a connection to the line circuit of Figs. 6–7, the cathodes of the tubes forming the incoming line switch portion of the terminal connector are scanned by the negative pulses starting, as just indicated, at T5. When the cathodes of a pair of tubes giving access to the first free final link via which the called line is accessible are pulsed, the cathodes of all of the gas tube pairs common to that final link are lowered to −220 volts. The pair of tubes whose anodes are at +70 volts due to the called line marking condition therefore fires.

When the pair of tubes fires, current flows through the winding W1 of relay RR in Fig. 6, which therefore operates, and through the relay SZ (Fig. 21) in the final leak circuit. Since the winding W1 of relay RR is a low resistance winding, unbalance conditions are set up as between the anodes of the tubes, giving 40 ma. (20 ma. per anode) in the line circuit and 7 ma. (3.5 ma. per anode) in the final link circuit which has been seized. This current is insufficient to operate relay D (Fig. 20) of the seized final link circuit.

At its contact RR1, relay RR applies ringing current over contact F4 to the positive lead to the called subscriber, where there is an earthed bell. Ringing tone is also sent to the calling party as will be described with reference to the final link circuit. When the called subscriber answers, the lines are looped and relay F is operated thereby over contact RR2, and locks to earth via its contact F(X)1 and contact FA1. This circuit is completed because relay FA is normally operated over contact F3. F opens its contact F4 to terminate the supply of ringing current to the called subscriber. The closure of contact F2 of relay F increases the current flowing through the bias winding W2 of relay RR to a value which is such that this relay releases, the winding W2 opposing W1. The opening of contact F3 at the same time causes relay FA to release slowly.

The release of relay RR changes over contacts RR1 and RR2 so that the called subscriber's loop is now connected to relay L, which therefore operates and at its contact L2 short-circuits winding W1 of relay RR, which relay is therefore unable to re-operate on the release of F. This change-over also removes the short-circuit on winding W1 of relay K so that the current in the tubes' anodes flows in this winding instead of winding W1 of RR. Since W1 of relay K has a higher resistance than W1 of relay RR, the current in the line circuit falls to 20 ma. (10 ma. per anode) so that in the final link rises to 20 ma. (10 ma. per anode). Thus balance conditions are established, and this current is adequate to operate relay D (Fig. 20). Therefore relay D operates. The functions of these relays D and SZ will be described when the final link circuit is being described.

When relay FA finally releases, relay F is open-circuited and releases. The ring trip circuit consisting of the two relays F and FA is common to a number, assumed to be not more than 100, of line circuits. It will therefore be seen that if more than one called subscriber in the group served by a single ring trip circuit are being rung, all of their RR relays will be biassed off when one of those subscribers answers. However, this has no unfortunate consequence because when the relay F is released (after the slow release of relay FA) all of the RR relays except that of the line circuit whose subscriber has replied re-operates, so that ringing is re-applied to their line. The operation of the ring-trip circuit takes a relatively short time so that this interruption of ringing will normally be imperceptible.

(c) Release

The line circuits are released by the disconnection of the common cathode circuits of the gas gap tubes from the negative supply in the first (Fig. 9) or final (Fig. 21) link circuits.

For a calling line circuit, when the subscriber hangs up, the opening of the loop releases relay L (Fig. 6), which causes relay A (Fig. 10) to release in the same way as this relay released on each dialled impulse. This, since contact A2 falls back, allows relay RA to release after a time delay, as will be described later, and to disconnect the supply from the gas gap.

For a called line circuit, the release of relay HZ (Fig. 19) from the preceding circuits, as will be described later, causes relay RZ (Fig. 20) to be operated, and that, at contact RZ1, disconnects the supply voltage from the cathodes of the gas gap tubes in the terminal connector.

First link circuit (Figs. 9–12)

Each first link circuit forms an outlet from a number of the terminal connectors, and is connected to a number of inlets to the A frame. This can be seen from the portion of the terminal connector which appears in Fig. 9 and from the portion of the A frame which appears in Fig. 12.

As has already been indicated in the description of the subscriber's line circuit, a series of pulses extending from −170 volts to −220 volts and starting at T21 of the timing cycle are applied in turn to the ten first link circuits associated with any group of calling subscribers. Actually, of course, these pulses are always applied to the link circuits but they can only be effective on a link which can be connected to a calling subscriber. These negative pulses cannot alone cause discharge in a gas gap tube, so unless such a tube has its anode potential raised in the line circuit it is unable to fire. If a first link circuit is busy when it is pulsed, the pulse will be dissipated across resistor R8 (Fig. 9) as this has a high resistance compared with the forward resistance of rectifier MR8. The forward resistance of this rectifier is effective because of the current flowing therethrough. Hence when a busy first link circuit is pulsed, this pulsing has no effect.

When the first free first link circuit of a group of such circuits is pulsed, the cathodes of the 50 pairs of gas gap tubes connected to that link circuit in the terminal connectors will be lowered in potential to −220 volts. The anodes of the tubes of the 10 pairs of gas tubes common to the calling subscriber are at +70 volts due to the calling line marking condition mentioned above. Therefore the pair of tubes whose anodes are at +70 volts and whose cathodes are at −220 volts fire, so the relays S and A (Figs. 9 and 10) operate to the current flowing in these tubes. Contact S1 (Fig. 11) changes over and in so doing disconnects earth from resistor R9, so that the anodes of the gas gap tubes forming the register connector are raised to +80 volts. The associated registers are now pulsed in turn, these pulses being applied to the cathodes of the gas gap tubes of the register connectors, and when a free register to which the seized link circuit has access is pulsed, the gas gap tube interconnecting the link circuit and that register is fired. The register is so arranged that a relatively high current flows in the gap including the "register" anode of the fired gas gap tube so that a low current flows in the "first link circuit" anode thereof which operates relay SR (Fig. 10) but not relay R1. At the same time the register supplies dial tone, which reaches the caller via the fired register connector tube, transformer TR2 (Fig. 10), transformer TR1, the fired terminal connector tubes and the loop to the calling subscriber.

The subscriber now dials the required number, and relay A (Fig. 10) responds to the dialled impulses in the manner which has already been described under section (a) of the description of the subscriber's line circuit. On each occasion on which relay A is released, the closure of contact A1 causes a burst of voice frequency from the generator VF to be applied via transformer TR2 to the register connector, and hence to the register. The impulses are counted and the respective digits stored in the register. The latter then determines from the dialled digits whether the call is a local call or an outgoing call to a different exchange, as has been described in U. S. Patent Application, Ser. No. 458,934, filed Sept. 28, 1954.

In the present case it will be assumed that the call is a local call. The register therefore sends the information representing the called party number to the called line maker, as will be described later. Then the register decreases the current flowing in its anode of the fired register connector tube, so that the current in the link circuit anode is increased. This condition is timed by a pulse extending from T5 to T15 of the timing cycle, and the increased current flowing through SR and R1 causes relay RL to operate. The register is then released, the relays SR and RL holding through their held windings via front contact RL1 and back contact RA2.

At contact SR2 (Fig. 11) of relay SR, the lower end of R9 (Fig. 10) is earthed via rectifier MR10. This, of course, occurred when SR operated on seizure of the register, and reduced the anode voltage of the register connector tube. However, it did not bring this voltage to below the maintaining voltage. After the tube has been extinguished on the release of the register, however, the potential on the register connector anodes is such that seizure of a register cannot occur. This prevents multiple seizure of registers for the same call.

When relay RL operates just before the register releases, as described above, its contact RL2 closes and applies −220 volts via the relay H (Fig. 11) to the cathodes of 30 pairs of tubes in the A frame. As can be seen from the drawings, Figs. 9–12, the anodes of the A frame tubes are connected to earth potential. The potential of −220 volts mentioned above is also applied via contact H1 to the route selector. When a pair of tubes in the A frame are fired to connect the seized link to an outlet therefrom, as will be described later, the H relay in Fig. 11 operates, and at its contact H1 removes the marking to the route selector just mentioned. The contacts RL2 and H1 over which this marking occurs are also shown schematically in Fig. 28A, which is part of the route selector circuit.

The markings from the route selector to the second link circuits are so timed that if a second link circuit is available for use by a call, the pair of tubes via which the connection reaches the second link circuit will be fired before T28 of the timing cycle. However, if a second link circuit is not marked from the route selector, that is, if there is no available second link circuit, then after the relay RL has operated, a 2 ms. positive pulse starting at T28 is applied to the left hand anodes of a pair of tubes BUA, BUB in Fig. 12. As can be seen from Fig. 12, the cathodes of these tubes are connected in common to the 30 pairs of tubes in the A frame to which the first link circuit is connected, and therefore tubes BUA and BUB both break down and conduct. They then transmit busy tone from the busy tone generator BU to the calling subscriber.

If the calling subscriber dials an unused number, the called line marker applies a positive condition over the lead NUL to the anodes of a second pair of tubes NUA—NUB, which are connected in a similar manner to the busy tone tubes BUA—BUB. These tubes therefore fire, when relay RL operates at T5–T15, and the number unobtainable tone is transmitted from the number unobtainable generator NU to the calling subscriber.

Thus in both of these cases, i. e. when a called line is found to be busy and when an unobtainable number is dialled, the appropriate signal is sent to the calling subscriber without any operation of the A, B, C frames occurring.

Figure 10:
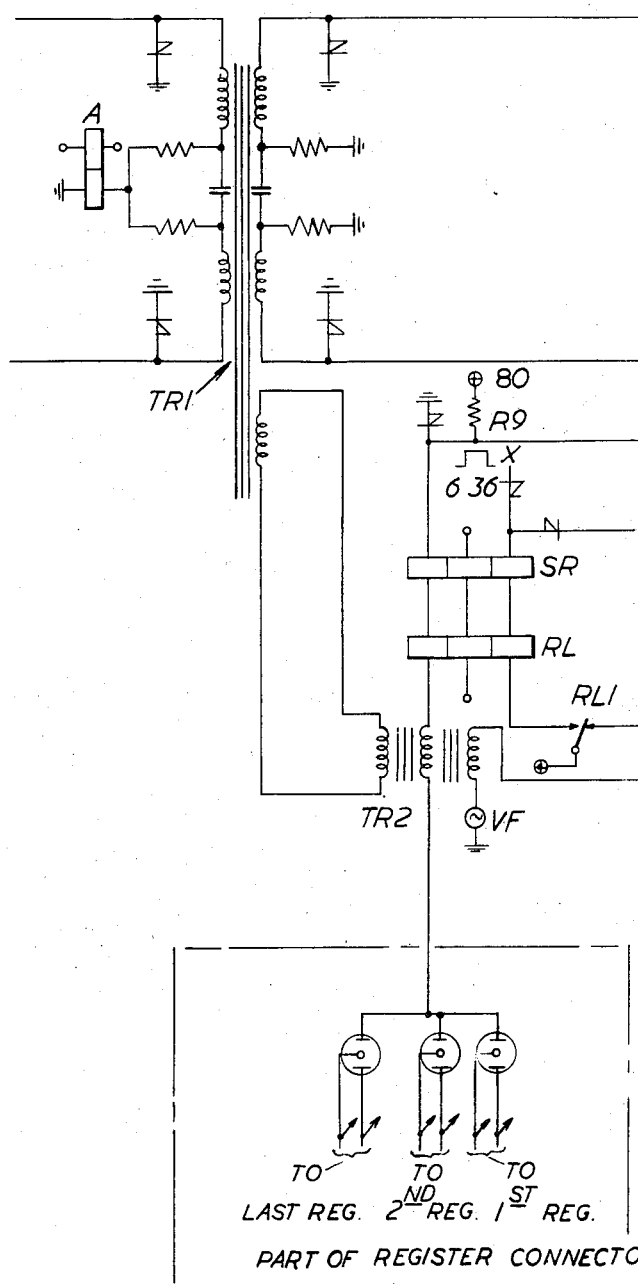
Figure 11:
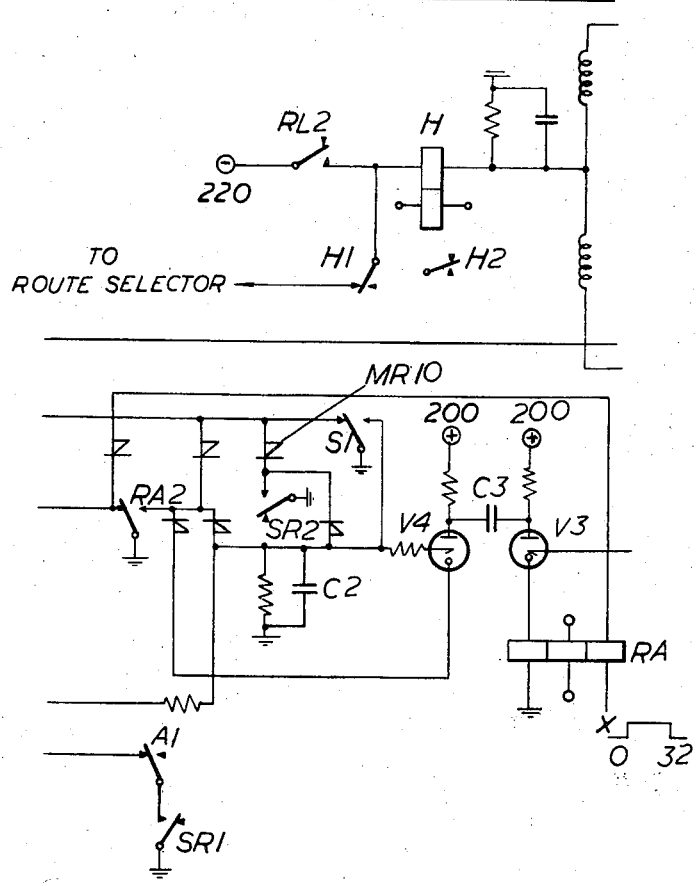
Figure 12:
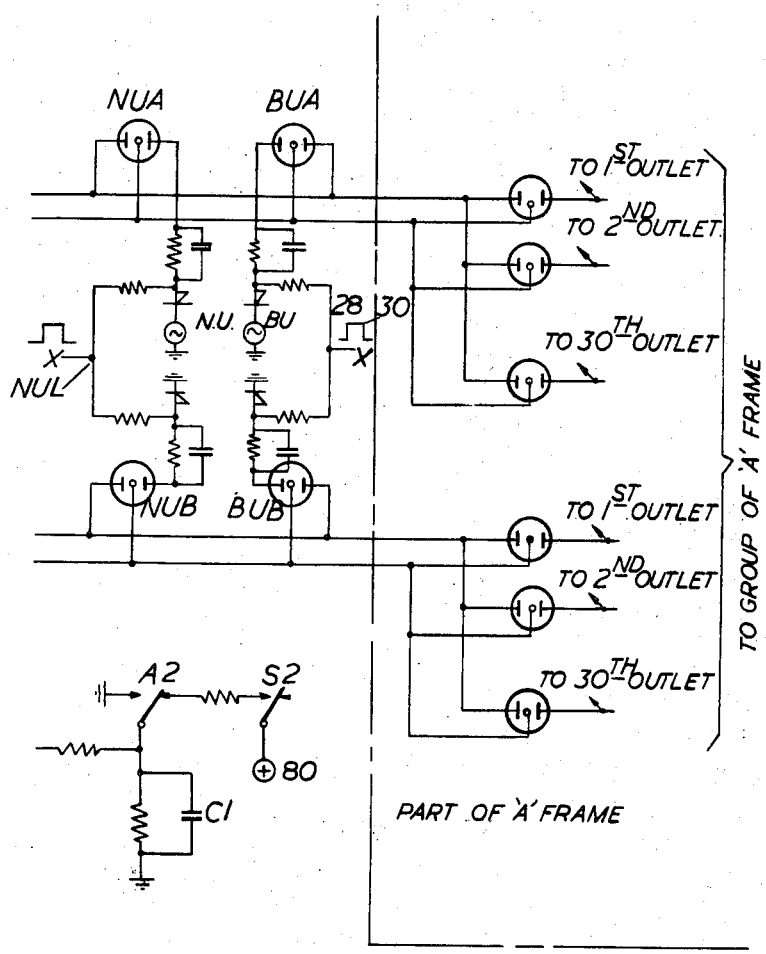

When the calling subscriber hangs up on the completion of a call, the current swing produced in the anodes of the terminal connector tubes releases relay A, Fig. 10, as already described. The combination of relay A released and relay S operated causes +80 volts to be applied via S2 front and A2 back to the trigger circuit of a gas tube V3. Capacitor C1 therefore commences to charge towards this voltage, and when the voltage of the trigger electrode has risen sufficiently, tube V3 is fired and current flows through the left hand winding of relay RA. The capacitor charging circuit just referred to is included in the input circuit to the trigger electrode of V3 to ensure that this tube cannot be fired during dialling. This could otherwise occur on each break of the loop during the dialling. To return to relay RA, this relay is biassed off from T0 to T32 by a positive potential applied to its right hand winding during this period. These two windings of the relay are thus used as opposing windings. During the period T32–T42, the relay RA operates since the biassing of pulse is then no longer in evidence.

The operation of relay RA opens contact RA1, removing the negative supply potential from the fired gas gap tubes in the terminal connector. At the same time as this occurs, relay S releases. Contact RA2 changes over and breaks the holding circuit for relays SR and RL, which both release, and also earth the cathode of tube V4, which is so connected to tube V3 that these tubes form a bistable pair. The release of relay R1 opens contact RL2, removing the negative supply voltage from the cathodes of the A frame tubes, which tubes therefore extinguish, and releases relay H. The release of the intermediate link circuits then occurs in a manner which will be described hereinafter. Since contacts S1 and SR2 are both now back, capacitor C2 (Fig. 11) charges positively via contact RL1 back (Fig. 10) until the trigger voltage of tube V4 is sufficient for that tube to fire. When V4 fires, the fall in its anode voltage is applied via capacitor C3 to the anode of tube V3, which is therefore extinguished. Relay RA then releases and at RA2 disconnects the earth potential from the cathode of tube V4, which in turn extinguishes. Contact RA1 (Fig. 9) closes and restores the supply (and pulsing) connections to the cathodes of the terminal connector tubes. The first link circuit is therefore fully restored to its rest condition, and is thus available for seizure for another call.

Should a calling subscriber clear prematurely, the release of relays SR and RL is delayed until they release, and tube V2 is then fired as on normal release.

*Register (Figs. 29–35)*

As has already been stated, the register which can be seized via a register-connector has the register-connector cathodes corresponding to those registers sequentially pulsed. This pulsing occurs at time positions P1 to P10, each pulse being a pulse of −80 volts (from −145 to −225 volts), applied to the cathode of the register connector tube such as RCT (Fig. 29) via resistor R100, back contact of RS1, windings of relays RSA and RS in series, back contact RG1 and inductor L21. The cathode is prevented from going negative with respect to −225 volts by the "catching" rectifier MR50. This potential on the cathode cannot unassisted fire a tube such as RCT.

From the description already given of the first link circuit, it will be remembered that when a first link circuit has been seized for a call and is awaiting the connection of a free register, the anodes of the register connector tubes connected to that first link circuit are marked by a positive potential of +80 volts. This potential is also unable to fire a tube unassisted.

However, when a tube such as RCT has its anode and its cathode simultaneously marked and pulse primed respectively, that tube fires, so that that first link circuit is connected to a free register. The tube such as RCT therefore conducts from earth in the first link, this rendering the marking therein ineffective (as already described) so that multiple seizure is prevented, and −145 volts in the register via rectifier MR51. Relay RS, which is included in this circuit, thereupon operates and at its change-over contact RS1 connects −225 volts to the cathode of RCT via relay RSA. The latter relay thereupon operates so that normal transmission conditions via the tube RCT are set up. The rise in cathode potential due to current flowing in the inductor L21 busies the register so that it cannot be seized by any other "calling" first link. At its contacts such as RSA1, relay RSA causes the application of operating potentials to those parts of the register which have switched supplies.

The pentode V1 (Fig. 29) and its associated component are an alternating current receiver circuit which is tuned to the frequency used to transmit signals from a first link to a register in the manner already described. The normal conditions of this receiving circuit are such that when the subscriber's line is looped, pentode V3 (Fig. 30) is cut off, and hence tube V8 (Fig. 30) fires via resistor R101, if not already fired. The combination of V8 conducting, biassing rectifier MR52, positively and tube V7 being quiescent causes tube V6 (Fig. 31) to be fired at its cathode to trigger electrode gap. The anode supply for the tube V6 consists of a dial tone waveform, and hence when a calling line is looped before dialling has commenced, the tube V6 in a register seized thereby passes this dial tone waveform to its cathode circuit. The dial tone signal is therefore fed via transformer TR5 (Fig. 29) to the right-hand anode of the register-connector tube RCT, and is transmitted therefrom via the first link to the calling subscriber's line.

Figure 33:
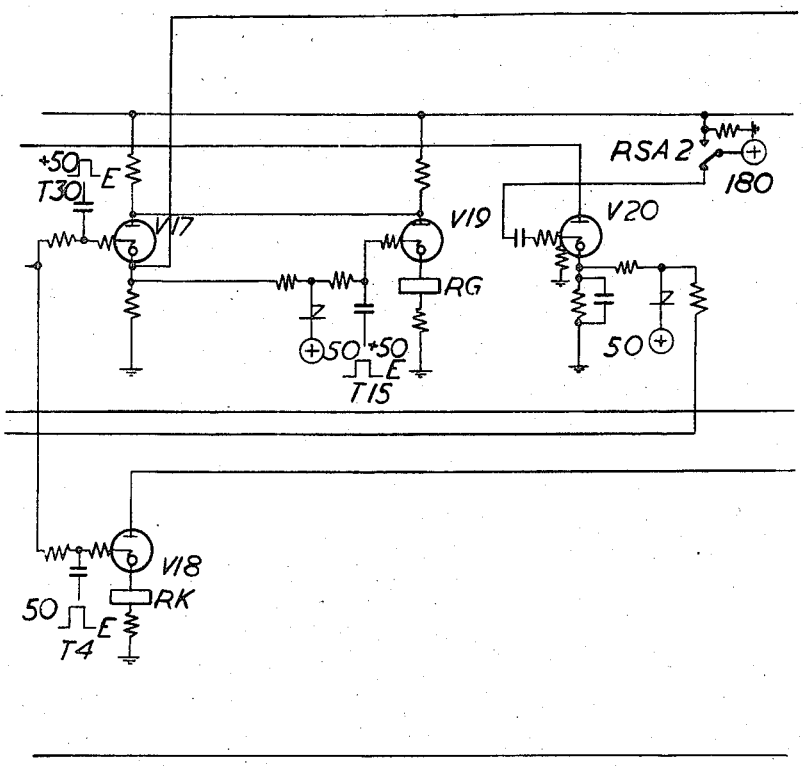

In the meantime, tube V4 (Fig. 31) fires because tube V3 is non-conducting for a period in excess of 150 ms. The anode potential of V3 is being applied to the trigger electrode of V4 via resistor R102 so that the capacitor connected to the trigger electrode of V4 charges. When it charges enough, which gives the delay of 150 ms., V4 fires. The positive potential so produced at its cathode is applied over an output lead to the trigger electrodes of tubes V11 to V19 (Figs. 32 and 33). Prior to this, tube V20 is fired, and so this positive potential causes tube V11 to fire as its trigger electrode is primed from the cathode output of V20. When V11 fires, it extinguishes V20 due to the common anode load resistor R103. Hence it will be seen that certain of the tubes V11 to V13 form a conventional "pulse-plus-bias" type of counter.

As already described, when the calling subscriber dials, impulses are transmitted as bursts of V. F. from the first link circuit. The first impulse causes tube V1 to pass A. C., which is applied to a metal rectifier MR52, which functions as a detector. In consequence of this, a negative-going potential is applied to the grid of the triode V2 (Fig. 30), which thereupon cuts off. The rise in its anode potential causes tube V3 to conduct, which in turn extinguishes the tube V4. V9 also fires V2 as a result of being cut off, and this via the coupling capacitor C100 extinguishes tube V8. Therefore the tube V6 via which dial tone is transmitted is rendered inoperative. Therefore dial tone is removed from the calling subscriber.

The tubes V21-31 (Fig. 31), V32-42, V43-53 and V54-64 (Figs. 34-35) constitute four "down point" non-cyclic counters, each having a rest condition and ten "operated" conditions. These are used to store the dialled digits, the system described herein being one in which four digit numbering is used. The initial state is with all the counters in their rest conditions, i. e. wtih tubes V21, V32, V43 and V54 all fired. This condition is set up by the application of a positive pulse to the trigger electrodes of these tubes via change-over contact RSA2 (Fig. 34) when relay RSA operates on seizure of the register. Each of the four counters is controlled by a different tube of V11 to 14 so that the digits are successively registered on the four counters.

Each dialled impulse causes, as already described, the firing of V9 when it starts and of V8 when it ends. Now when V9 fires, a positive pulse of about 50 volts is applied to the trigger electrodes of all tubes V22-64 except V32-V43 and V54, i. e. to all tubes of the counter except the "rest" tubes, via resistor R104 and a catching rectifier MR54 (Fig. 31). This pulse cannot unaided fire any of the tubes. Each of the tubes to which it is applied is coupled to its predecessor in the chain via a rectifier coincidence gate which is also controlled by the appropriate tube of V11 to V14. Thus, considering the gate controlling tube V22, we have rectifier MR55 which is biassed positively when tube V21 is discharging, and rectifier MR56 which is biassed positively when tube V11 is discharging. The pulse produced when V9 fires is applied to the triggers of all the counter-register tubes via respective capacitors such as C59 for V22. The first pulse, therefore, fires tube V22 because MR55 and MR56 are both biassed positively. Subsequent impulses of the first digit fire subsequent tubes of the first counter, and when each tube fires it extinguishes the preceding tube as a result of the common anode resistor R104. The result of the first impulse of the first digit is therefore to leave a tube of V22-V31 fired. Each subsequent impulse moves the discharging condition one step along the counter.

When at the end of the digit the no-tone condition which exists between impulses persists for more than 150 ms., indicating the inter-digital pause, tube V4 refires, and emits a pulse from its cathode circuit, which pulse is applied to the trigger electrodes of V11-V15, with the result that V12 fires since these tubes are a "pulse-plus-bias" chain. The output connection from the cathode of V12 renders effective the second counter V33-42, so that the second digit is stored in the second counter. The firing at V12 extinguishes V11 so that the first counter is uneffected by other digits.

When the second digit has been received, V13 fires and renders V44-53 effective to store the third digit, and when the third digit has been received, V14 fires to render V55-64 effective to store the fourth and last digit. At the end of the fourth digit, tube V15 is fired, and the register now has all the information which is necessary to set up the call. A positive potential is applied from the cathode of V15 over a lead $a$ to the call distributor (Figs. 36-38). This, as will be described later, selects for operation one register, and returns a positive potential to the selected register via its lead $b$, which positive potential fires V16 (Fig. 33) and this in its turn extinguishes V15 (Fig. 32).

Since V16 is now discharging, the next pulse T4 is effective to fire tube V18, as a result of which relay RK operates. This, at RK1 (Fig. 29), reduces the cathode's impedance of the register-connector tube RCT by short-circuiting the inductor L21, and at RK2 open circuits the "register" anode of RCT. This, as already described, increases the current flowing in the anode of RCT connected to the first link, so that relay RL therein operates, this causing the disconnection of the register from the first link.

On the next pulse P30, the combination of this pulse and the cathode output potential of tube V16 fires tube V17. This causes the extension of a positive potential to the called line marker gate of the called line, as will be described. The next P15 pulse after this fires V19, which extinguishes V17 and removes the marking condition.

Each counter tube of V22-V31, etc., which serves to store the dialled digit, has an output coincidence gate, and the gates for tubes V30 and V31 are shown in detail. These gates open to the coincidence of the appropriate counter tube being fired, of tube V17 being fired, and of a pulse applied to the gate input marked T. The pulses used for this are, respectively, T31-T42. Therefore each of the counters emits a pulse characteristic of the digit stored therein. For instance, if the first digit is 9, tube V30 is fired, biassing rectifier MR57 positively. Rectifier MR58 is biassed positively from tube V17, and when rectifier MR59 is biassed positively by a T pulse, in this case T41, a pulse is applied to an output lead via a decoupling rectifier MR60.

The output pulses from the various counters are applied via the respective decoupling rectifiers and output leads to cathode followers, there being one cathode follower per counter stage, for instance, CFM for the first counter stage V22-V31. The operation of the called line marker will be described later.

It will be noted that the "zero" tubes V32, V43 and V54 of the B, C and D counters each have an output gate controlled by T41. These tubes are brought on when the register is seized for use, and clearly a single digit call such as when the subscriber dials Q will leave these tubes conducting at the end of dialling. Therefore when the transfer occurs, T41 pulses will be passed on the B, C, and D digit outputs. These serve to recognise an O level call in the called line marker. The same would apply for other single digit calls or for other calls with less than four digits.

When, as described above, T15 fires V19, relay RG in its cathode circuit is operated, and open circuits the register-connector cathode at RG1, so the tube RCT is extinguished. Therefore relays RS, RSA and RK are all released, and the switched H. T. already referred to is removed. The release of RSA causes at RSA2, the firing of tube V20, and with RG released due to the extinguishment of V19 on the change-over of RSA2, the circuit has been released and can be seized for use in connection with another call.

Where the subscriber clears before the end of the dialling, tube V10 fires. To explain this action it is necessary to recall the operations in the first link circuit on premature release. The A relay in that circuit remains operated for a period after the release, and for this period, voice frequency is applied continuously to the register from the first link circuit. This is described fully in the preceding section dealing with the first link circuit.

The result of this continuous tone is that the tube V2 is maintained cut off for the duration of the operated period of relay A. Tube V3 is maintained conducting during this time, and this holds tube V4 cut off. After a period in excess of 150 ms., during which V2 is cut off, the tube V10 is caused to conduct via the delay circuit connected to its trigger-electrode. When V10 fires, its cathode output fires tube V15, causing the call distributor to function, the functioning in this case merely causing the clearing of the register.

The operations which occur if the subscriber does not complete the dialling but does not hang up are somewhat similar. In this case there will be a no-tone condition, and when this has existed for 30 secs., tube V5 fires via its delay circuit, and its output fires V15.

In either of these cases, when V15 fires it causes a "request to send" signal to be sent to the call distributor, and when the latter gives the register the "go-ahead," the register attempts to set an unobtainable call, and in due course the register clears. The forced release arrangements for the first link have already been described.

*Call distributor (Figs. 36–38)*

The call distributor is common to, and serves all registers in the exchange. Any register which is in a condition for setting up a call, i. e. in which the number of a wanted subscriber has been stored, applies a positive marking condition to the *a* lead from it to the call distributor. As can be seen from Figs. 36–38 relating to the call distributor there are a number of such leads reaching the call distributor each from a different register.

The inputs to the call distributor are scanned singly and successively between T10 and T25 and a calling register is selected. The scanner is a gas tube distributor consisting of a chain of gas tubes interconnected to form a chain such as that shown in British Patent 759,005, published January 30, 1957, and U. S. Patent 2,814,762, granted November 26, 1957. This is a chain of the type in which the tubes discharge singly and successively in response to negative going pulses applied in common to the anodes. The operation of this circuit will be briefly described, it being assumed that tube CV21b is discharging. If this is the case, the current flowing charges the capacitor C110 interconnecting the cathode circuits of CV21b and the next tube. The end of C110 remote from the cathode of tube CV21b is negative.

When a negative-going impulse occurs on the anode of all of the tubes, it reduces the potential thereof to such an extent that tube CV21b is extinguished. Capacitor C110 therefore commences to discharge, but is unable to discharge quickly because its discharge circuit includes a rectifier MR60 in the cathode circuit of the next tube in its high resistance state. The resistor shunting this rectifier is of a high value such as 4.7 megohms. Therefore when the anode potential of all of the tubes returns to its normal positive value, it finds that the next tube from CV21b has its cathode negative to the other tubes. Hence that tube fires. The counter steps along on successive pulses in a similar manner. The action of this circuit is more fully described in U. S. Patent 2,814,762, granted November 26, 1957.

The scanner formed by the counter which has just been described is driven by negative pulses which come ultimately from a multivibrator running at a frequency which is of the order of 10 kc/s. This multivibrator consists of tubes CV11—CV12 (Fig. 38) and the circuit components associated therewith.

It will be remembered that it was stated above that register scanning occurs between T10 and T25 of the controlling cycle. Prior to T10, tubes CV2 and CV6 are conducting, so the anode potential of CV6 is low. Hence the two diodes CV8—CV9 (Fig. 37) of which CV8 has its cathode connected to +50 volts and CV9 has its anode connected to +250 volts hold the potential of the grid of tube CV10 at +50 volts. Therefore the cathode of CV10 is also maintained in a constant potential of about +50 volts, and this, which forms the anode supply for the tubes CV21b—CVnb is insufficient to fire any tube.

At time position T10, a positive pulse is applied to the trigger electrode of tube CV3 (Fig. 38), which thereupon fires and extinguishes the discharging tube CV2. Also caused by the firing of CV3 is the firing of the gas diode CV4, whereafter triode CV5 conducts. The negative potential on its anode due to current flowing through the anode resistor R120 causes the grid of the triode CV6 to go negative, cutting CV6 off. The hard diode CV7 is now rendered conductive and the grid of tube CV10 follows anode of tube CV12 of the multivibrator, with the result that CV10, which is a cathode follower, passes pulses which are applied to the common anodes of the scanner tubes. At the same time as the pulse supply is initiated, a differentiated signal from the anode of CV12 is applied via a capacitor C111 to the trigger electrode of tube CV13 (Fig. 37). This, with the bias applied to CV30 from the cathode of CV10 fires CV13, and therefore a positive pulse is applied from the cathode of CV13 via the capacitor C112 to the trigger electrode of tube CV21b. Hence the trigger-cathode gap of this tube discharges, and when the anode potential of the tubes goes positive, the anode cathode gap of CV21b fires. The counting chain then steps sequentially in response to the pulses applied thereto. It will be noted that the cathode circuits of tubes CVNb and CV21b are linked so that the circuit is a closed ring counter.

Associated with each register there is a gate tube such as CV21a for the first register. The anode potential for the tubes such as CV21a is provided by a positive pulse extending from T8–T27. If this register is in the "calling" condition, a positive potential is applied to its gate tube in the call distributor via the lead *a*, as already described. Now when tube CV21b, the scanner tube corresponding to the first register fires, it produces a cathode output pulse which is applied via capacitor C113 to the trigger circuit of the associated gate tube CV21a. If the first register is in a "calling" condition at this time, the gate tube CV21a fires on a pulse-plus-bias basis, the marking potential from the register forming the bias. When the tube fires, it causes a positive potential to be sent over the lead *b* to the register, and this causes the register to transfer the number stored therein to the called line marker and also to be released.

The firing of any of the register gate tubes CV21a–CVNa causes a positive pulse to be fed via a decoupling rectifier such as MR60 and a capacitor C114 to the trigger electrode of tube CV1 (Fig. 37). This fires CV1, which, by virtue of the common anode load resistor, extinguishes tube CV3. CV5 is therefore cut off so that CV6 conducts heavily, and this switches off the supply of pulses to CV10 and hence to the scanner.

Therefore the scanner has found a "calling" register, and has given it to the "go ahead" signal. At the same time the scanner is stopped with the tube thereof, corresponding to the "calling" register discharging.

If a calling register is found during the scan, tube CV2 fires at time T25, which extinguishes tube CV1. This, however, has no effect on the circuit since the pulse supply has already been disabled. However, if no "calling" register is found during the scan, the firing of tube CV2 at T25 disables the pulse supply by extinguishing CV3. How this occurs has already been described. At T27 the anode potential of the register gate tubes is removed so that they are ready for the next scan. The resistors shunting the cathode rectifiers of the CV . . . b tubes have a high resistance and they allow the charge on any intertube capacitor to leak away between consecutive scans but not between pulses. Hence the scan always starts at V21b.

Thus it will be seen that during each cycle the call distributor scans all of the registers at least once, and sends a signal to the first "calling" register causing the latter to transfer the number in it to the called line marker.

Grading

At this stage it is convenient to consider the grading of the system. The non-numerical intermediate switching stages are arranged in three frames, and the arrangement is such that where there are $x$ groups of subscribers there are $x$ multi-switches in each of the A and C frames. Each A frame multi-switch has $y$ outlets and each C frame multi-switch has $y$ inlets. Therefore the B frame consists of $y$ multi-switches, each with one inlet from each of the $x$ A frame multi-switches and one outlet to each of the $x$ C frame multi-switches. In this case $x=50$ and $y=30$.

Each A frame multi-switch serves one group of 200 subscribers, as does each C frame multi-switch. This arrangement of the three frames has been found to lead to a highly economical arrangement in that a small number of crossing-points per connection is attained.

Each A frame multi-switch has 30 inlets, i. e. can be reached via 30 first links, which serve four sub-groups each of 50 subscribers. Each of these subscribers has an individual switch which can reach 10 of these first links. A similar arrangement is used for the final links which form the outlets from the C frame.

In both cases the links are graded as required by the traffic conditions.

Intermediate link circuits

The intermediate link circuit is used for the second links, each interconnecting an outlet from the A frame and an inlet to the B frame as shown in Figs. 13–15, and for the third links, each interconnecting an outlet from the B frame and an inlet to the C frame and shown in Figs. 16–18. Thus there are 1500 second links and 1500 third links. The connection of these links to the route selector differ, as will be described later.

A second link circuit is seized when the gas gap tubes in the A frame connected to the seized first link circuit have their cathode voltages lowered to −220 volts, and their anode potentials raised by a positive potential applied from the route selector over the back contact HX1 (Fig. 14). The route selector is so arranged, as will be described later, that only one pair of gas gap tubes will have both of these conditions coincide at a given time. These tubes therefore fire, and the relay HX (Fig. 14) operates in the anode circuit of the fired tubes. When HX operates it changes over its contacts HX1, removing the positive marking condition from the route selector and preparing a holding circuit for itself via its right hand winding.

Also changed over when HX operates is its contact HX2, which disconnects from the route selector the −220 volts potential previously applied thereto over HX2 back. This −220 volts potential is then applied over the front contact of HX2 to the cathodes of the tubes in the B frame to which the seized second link is connected.

Having described how a second link is seized for use, it is now desirable to describe how the release thereof is effected. Release is initiated by the removal of the cathode supply voltage of the A frame tubes as described above. This causes these tubes to extinguish, which would release relay HX if it were not for the holding circuit mentioned above. If relay HX was allowed to release during the period in which the route selector marks a second link, during the establishment of a connection the possibility exists that the marking could cause seizure of the second link which is in the process of being released. This seizure could cause the calling subscriber to be connected to the subscriber who was called by the call in the course of being released. To ensure that this cannot happen, a positive marking pulse, known as the release guard pulse, is applied to the hold winding of relay HX, which ensures that it cannot release during a marking period. This marking period extends from T36 to T14, so the release guard pulse opens this period.

When relay HX releases at the end of the release guard pulse, or before the beginning of that pulse, the route selector marking lead is connected to the anodes of the A frame tubes again over contact HX1, and the −220 volts is transferred from the cathodes of the B frame tubes to the connection to the route selector. Therefore the B frame tubes deionise, causing the release condition to be extended forward to a third link.

Since the third link circuit is substantially the same as the second link circuit, no description thereof is thought to be necessary except to remark that its positive marking condition for holding relay HY (serving the same functions as relay HX) in Fig. 17 extends from T0 to T20 of the timing cycle.

Static electrical co-ordinate multi-switch (Fig. 39)

Each of the multi-switches in the A, B and C frames consists of an assembly of tubes arranged in a manner similar to that shown in Fig. 39, which is a single multi-switch of the B frame.

The transformers TRA, TRB are the transformers of the second links reaching the multi-switch, one of these transformers appearing in Fig. 14. The transformer TRC, TRD, TRE are the transformers of the third links leaving the multi-switch, one of which appears in Fig. 17. The leads A, B, to the centre of the left hand windings of the transformers TRA, TRB are the leads over which the second links are marked from the appropriate HX1 contacts (Fig. 14). Leads C, D, E are the corresponding leads over which third links are marked from the appropriate HY1 contacts of Fig. 17.

In the normal condition, therefore, all tubes have their first anodes, the ones connected to inlets at earth potential. The cathodes of the first tubes, i. e. those connected to the uppermost wires of an inlet, are commoned together, as are the cathodes of the second tubes, i. e. those connected to the lowermost wires of an inlet. These two cathode sets are interconnected via two inductors and two resistors, for instance the two sets for the inlet including TRA are interconnected via LM1, RM1, RM2 and LM2. A marking connection MCA is connected to the centre-point of this interconnection, similar marking connections such as MCB being provided for the other inlets.

When an inlet to one of the B frame multi-switches is seized, i. e. when a second link is seized, it will be remembered that the relay HX operates. Therefore a contact HX1 applies −220 volts via the appropriate marking contact to the cathodes of all tubes for that inlet to the multi-switch. It will be assumed that the inlet via TRA is in use, so that the top two rows of tubes in Fig. 39 have their cathodes at −220 volts. The first anodes are already at earth, but this cannot fire the tubes.

It will be assumed that the third link to be used, i. e. the outlet to be seized, is that reached via transformer TRD. The marking leads from the transformers TRC, TRD, TRE extend to circuits such as that shown in the inset to Fig. 39 and in Fig. 17. The normal condition thus applied to the second anodes cannot cause firing as these anodes are earthed. However, when the route selector selects the third link reached via TRD, it applies a positive pulse over HY1 back and the left hand winding of relay HY to lead D. This fires the two tubes interconnecting TRA and TRD at their second anode-cathode gaps. The discharge then spreads to the first anode-cathode gaps of these tubes. Relay HY operates and disconnects the seized third link from the route selector. The connection has now been set up through the multi-switch.

It will be remembered that the tubes are tubes such as are described in U. S. Patent 2,775,722, granted Dec. 25, 1956, and that in such tubes the cathode current remains substantially constant. Hence when an increase in the current flowing in one anode-cathode gap occurs there is a corresponding decrease in the current in the other anode-cathode gap. Therefore a substantially noise-free anode-anode interconnection is, in effect, set up. This is used to convey speech and supervisory signals throughout the system.

Since supervisory signals are conveyed over the speech channel it will be seen that no third wire is needed, although if it were proposed to segregate the signals from the speech such a third wire could be provided.

The operation of the A and C frame multi-switches is essentially the same as that of the B frame multi-switches, but that of the terminal connectors is different in that in those switches the cathodes are commoned into sets each set corresponding to an outlet. Then the circuit tests for a free outlet by negative pulses on the cathode sets. The register connectors are similar to the terminal connectors except that they are single wire multi-switches.

*Final link circuit (Figs. 19–21)*

The operations involved in the seizure of a fired link circuit are reminiscent of those involved in the seizure of a first link circuit.

The cathodes of the tube pairs associated with the 10 final link circuits serving any group of subscribers' lines are scanned by a set of pulses ½ ms. duration, spaced apart by ½ ms., and starting at T5. In a group of subscribers includes no called subscribers whose line circuits have just been marked by the called line marker, then these scanning pulses produce no effect. Similarly, the pulses are ineffective on any final link which is in use since the rectifier-resistor combination such as MR20–R21 in Fig. 21 renders the pulses applied to busy final links ineffective, as has already been described.

Each of the scanning pulses is a pulse of −50 volts starting at −170 volts, so that it takes the tubes' cathodes down to −220 volts. If one of the lines served by a fired link has been called, the called line marker marks its line circuit. Therefore the pairs of tubes in the terminal connector via which the called line circuit can be reached are at +70 volts. When a pair of tubes' cathodes are pulsed at the same time as their anodes are at +70 volts, that pair of tubes is fired, so that a connection through the terminal connector has been effected.

When the tubes in the called line switch portion of the terminal collector have been fired, as has been described in the description already given of the regular line circuit, relay SZ (Fig. 21) operates in their cathode circuit. Due to the low resistance winding W1 of relay RR (Fig. 6) in the line circuit, unbalance conditions exist between the two anode cathode circuits of each of the fired tubes in the terminal connector, this current being lower (7 ma.–3.5 ma. per anode) in the final link. This lower value of current is insufficient to operate relay D (Fig. 20).

When relay SZ operates as mentioned in the preceding paragraph, its contact SZ1 (Fig. 20) changes over and applies a positive potential to the route selector; and this causes the marking of the appropriate third link circuit. This in due course causes the connection to be established through the C frame. The change-over of contact SZ2 (Fig. 19) allows −220 volts to be applied to the route selector, so that both a positive and a negative potential are applied thereto. It will be remembered from the description of the first link circuit that one of the operations which occurs after a first link has been seized is the connection of −220 volts therefrom to the route selector. Thus it will be seen that when an inlet to the A frame from a first link and an inlet to the C frame from a final link have both been seized, the route selector is "notified" by these markings, and is then effective, as described below, to cause those two inlets to be connected via the A, B and C frames. It should be noted that when considering the connection through the various frames, the inlets to the C frame which form the final links can be regarded as outlets from the C frame via which a final link is reached via first, second and third links "in series."

As a result of the operations of the route selector one of the third link circuits will be seized in the manner already described in detail for the second link circuits (as pointed out above, seizure of a third link occurs in substantially the same manner as does seizure of a second link) and its relay HY (Fig. 17) operates to mark via HY2 the cathodes of the tubes in the C frame via which the seized final link can be connected thereto. During the period T35–T42 of the timing cycle the "final link" anodes of the pairs of gas tubes in the C frame are raised in voltage by a positive pulse applied thereto via rectifier MR21 (Fig. 19), and winding W1 of relay HZ. One pair of tubes will have both their cathodes and their anodes "primed" and these tubes therefore fire to establish the connection through the C frame. Relay HZ in Fig. 19 therefore operates and its contact HZ1 changes over. This completes a circuit from negative battery via the ringing tone generator RTG, a winding of transformer TR5, contact FZ1 back, contact HZ1 front, and contact SZ2 front to earth. Ringing tone is therefore transmitted via TR5 and the called line switch portions of the terminal connector to the called subscriber. Also completed by the changeover of HZ1 is a circuit from a voice frequency generator VFG via a further winding of TR5, back contact D1, and front contacts HZ1 and SZ2 to earth. This voice frequency is transmitted via the communication path which has been established to the "calling" first link circuit, where it can be detected to give a condition when the called subscriber answers and when releases. Relay HA is also operated in this circuit, and at contact HA2 (Fig. 20) disconnects the positive marking condition from the route selector. Contact HA1 completes a holding circuit for relay HA via its left-hand winding. The change-over of contact HZ2 when relay HZ operated connects a resistor R22 and R23 in series between positive and negative terminals with the result that the lower of the two leads extending to the route selector has its voltage change from −220 volts to earth. Thus when the called subscriber's line is being rung, the markings from the final link circuit to the route selector are removed.

When the called subscriber answers, his L relay (Fig. 6) operates, and the change-over of its contact L2 causes balanced conditions to be set up in the "seized" pair of gas gap tubes in the terminal connector. A current of 20 ma. (10 ma. per anode) therefore flows through relay D (Fig. 20), which relay therefore operates. At contact D1 it open-circuits the circuit including the generator VFG and a winding of TR5, this disconnection giving a signal to the first link circuit that the called subscriber has answered. The change-over of D1 also operates relay FZ from earth over front contacts SZ2, HZ1 and D1, and this relay at FZ1 open-circuits the supply circuit for ringing tone. Thus a call has been completely established.

The final link circuit is released when the calling and called subscribers have both cleared. When the called subscriber clears, as described already under the line circuit, unbalance current conditions are set with the result that relay D in Fig. 20 releases. This opens a holding circuit previously completed by contact D2 for the winding W3 of relay HZ. When the calling subscriber releases, the release condition negotiates the switching stages from the calling end until the third link releases, as already described. When this happens the current flowing in winding W1 of relay HZ is cut off. Hence when both calling and called subscribers release, relay HZ releases.

During the period from T0 to T10 of the timing cycle a negative pulse is applied to the left-hand winding of relay RZ, and therefore when relay HZ releases, relay RZ operates during this period over HZ1 and SZ2 in series. At contact RZ1, the negative supply is disconnected from the cathodes of the terminal connector tubes connected to the final link circuit shown, with the result that the fired terminal connector tubes are extinguished and relay SZ releases. At SZ2 relays HA and RZ are released and the circuit has now been released, and is available for re-seizure.

It will have been noticed that in many cases the A and B wires extending to the anodes of the gas gap tubes are earthed via rectifiers such as MR22 in Fig. 20. These rectifiers are catching rectifiers and serve to prevent the anodes of these tubes from going positive to earth, which could otherwise cause spurious firing of the tubes.

*Called line marker (Figs. 22–24)*

This consists of four sets each of 10 gas tubes on which a called number is stored when it is transferred from the register, a set of tubes for energising a lead representing the thousands and hundreds digits (A and B digits) of the called number and a set of tubes for energising a lead representing the tens and units digits (C and D digits) of the called number. These leads, it will be remembered, control the marking of the line circuit of the called subscriber. Provision is also made for unobtainable numbers.

The tubes on which the called number is stored are arranged in four sets, the A set being typical. This, like all of the sets, is effective from T30–T17 of the timing cycle, this being effected by the application of a positive pulse spanning this period to the tube anodes. Each tube in each set has its trigger electrode controlled by a coincidence gate, the gates of the respective tubes being controlled by respective ones of eleven ½ ms. pulses at ½ ms. intervals starting from T31. From the description of the register it will be remembered that each digit is sent on the appropriate one of the leads A, B, C and D, which are the output from cathode followers CFM, CFH, CFD, and CFU respectively in Fig. 35 as one of the pulses T31–T40.

Considering, for example, the A digit storage tubes, and assuming that the A digit is 2, then the pulse transmitted from the register over the A lead occurs at T32. The coincidence gates of the A tubes in Figs. 22–23 are sequentially pulsed at T31–T40, and when the gate for tube 2 of the A digit store is pulsed, pulses will be present on both controlling inputs of that tube's gate. Therefore the tube fires. One tube in each of the four storage units will be fired in the same manner.

As already mentioned, for every A and B digit combination there is a tube, and each of these tubes is a gated cathode follower whose cathode output potential is usually negative. As an example, tube MV1, which is the tube for the A and B digit combination 62 will be considered. This tube has a grid gate formed by a rectifier MR30 connected to the cathode of storage tube A6 and a resistor R30 connected to the cathode of tube B2. When both tubes A6 and B2 have been fired, tube MV1 has its grid driven positive, so that its cathode goes positive in its turn, thus energising the output lead 62XX.

The output lead such as XX33 is energised under control of the appropriate combination of C and D tubes in a similar manner, and this combination of energised leads causes the marking of, and seizure of the called line circuit, as described with reference thereto.

The AB and CD lead combinations which correspond to unused numbers are connected to a coincidence gate network consisting of a gate for unused number. Three of these are shown in Fig. 24. When an unused number's combination is set upon the storage tubes, its AB—CD combination causes one of the gates such as MR35-R33 to give a positive output which, via the appropriate one of the decoupling rectifiers MR31, MR32., . . . causes the pentode MV3 to have its control grid g driven positive. This tube is common to a number of gating sets such as that shown in Fig. 24.

The current which MV3 passes as a result of the opening of one of these gates is modulated by alternating current from a generator ACG and this is applied to a rectifier circuit RC of well-known type. The output of this is connected to the control grid of tube MV4, and raises this to about +100 volts. Since MV4 is a cathode follower, its output voltage follows its grid voltage and this is applied to the anodes of the NU tubes in the first links. Hence a pair of NU tubes are fired in a seized first link circuit, and these connect NU tone to the caller.

At TIM of the timing cycle, by which time all operations by the called line marker have been completed, the pulse on the anodes of the A, B, C and D tubes ends, and the circuit reverts to rest. On the next T30 it is available for use with another call.

Figure 34:
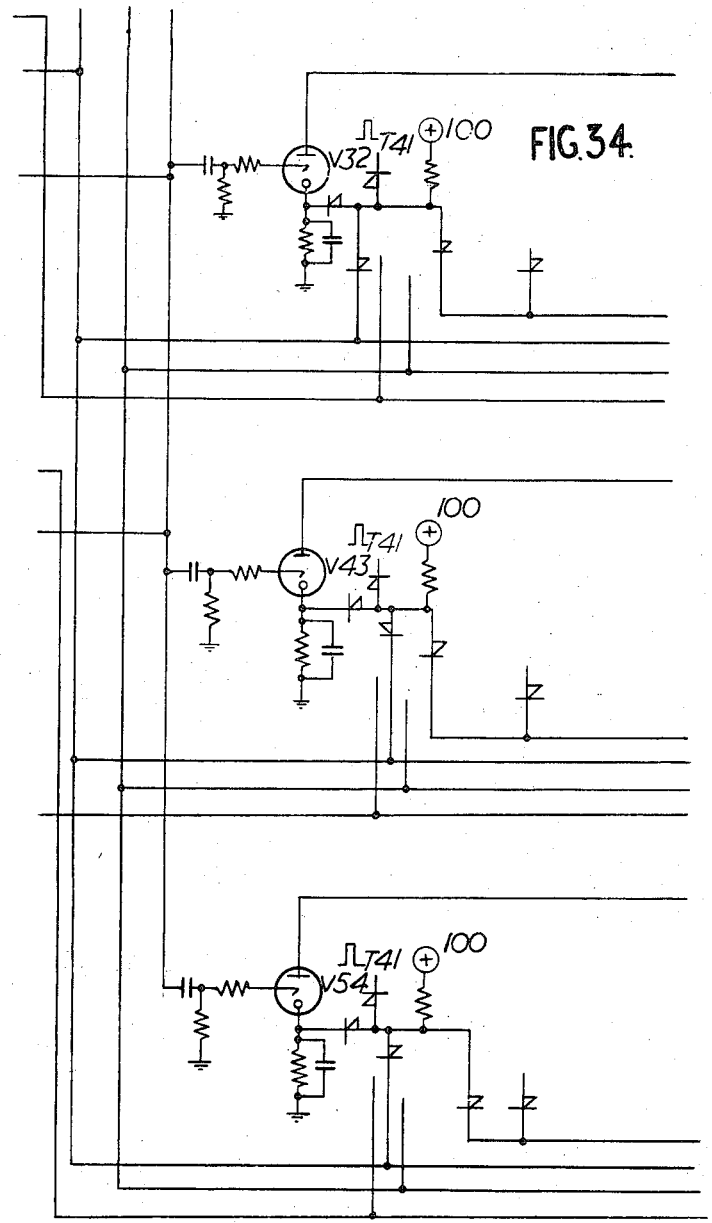
Figure 35:
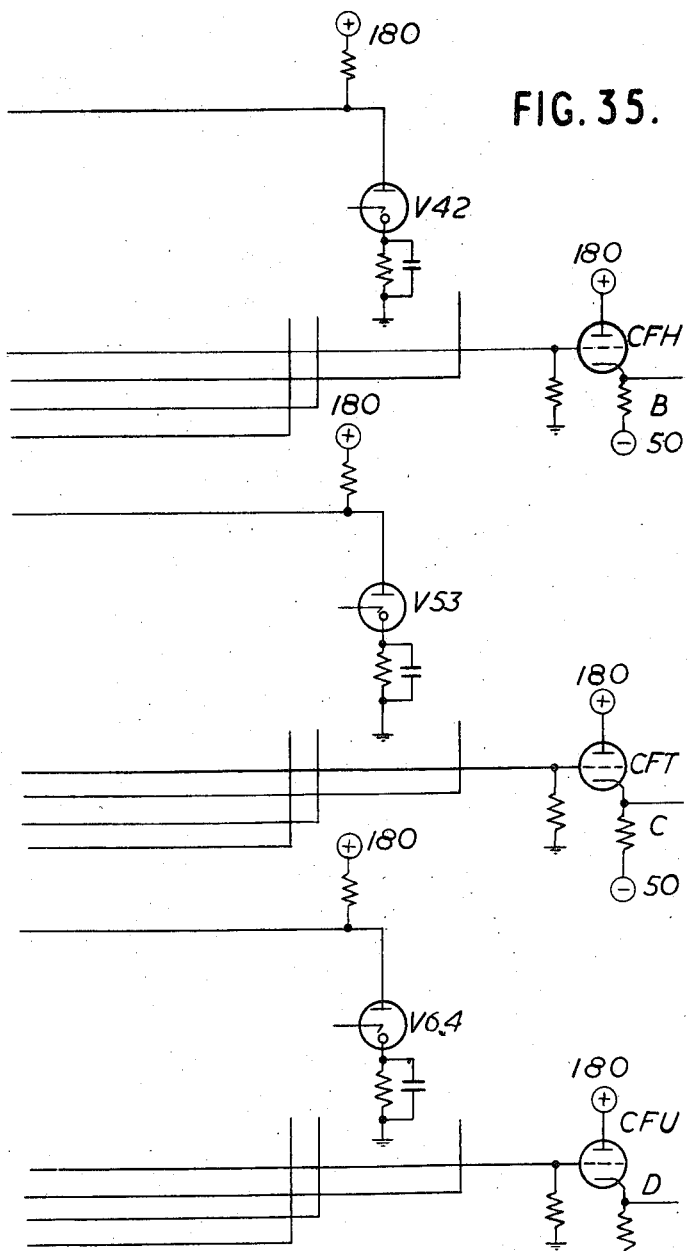

There is one further feature of the called line marker which has not as yet been mentioned. This involves the three additional tubes HB, HC and HD which are included in the B, C and D sets of storage tubes respectively, and which are each controlled by the pulse at time position T41. These tubes cooperate with the tubes V42, V53 and V64 in the register (Figs. 34–35). From the description previously given of the register it will be remembered that where the caller has dialled for a single-digit call such as an O level call, pulses occupying time position T41 are sent over the B, C and D outputs to the called line markers. These pulses cause the operation of the H tubes of the B, C and D tube sets in Fig. 23 since these three tubes are T41 controlled. The combination of tube O and the three H tubes operated thus characterises an O level call.

The H tubes can clearly be used in the same manner for other single digit calls, and the method could be extended to dealing with two-digit calls, when the H tubes of the C and D chains would cooperate with numerical tubes of the A and B chain. In fact, this method is applicable to special calls using any number of digits less than the full number of calls.

*P. B. X line circuit (Figs. 25–26) and P. B. X marker (Fig. 27)*

In this circuit, relays LL, KK and RQ serve the same purposes as relays L, K and RR respectively in a regular line circuit.

The circuit operation for a calling subscriber is the same as that for a regular line circuit, and so there is no need to describe it here.

In every final link circuit which has access to lines including lines belonging to a P. B. X group, there is a connection including a contact HZ2 (see Fig. 19 as well as Fig 27) over which a positive potential of 100 volts is applied to the control grid of a tube such as PV1 in the P. B. X marker as long as the final link circuit is free. It will be remembered from the description of the final link circuit that from the time that the circuit is seized until it is released, the relay HZ is operated, so that this potential is only applied to the P. B. X marker if the final link circuit is free. Each of these tubes PV1 is individual to one of the 200 groups of lines. Thus there are up to 200 tubes such as PV1 (one per group of 50 lines including P. B. X lines), and one of these tubes has its cathode at a positive potential only if the group of lines with which it is associated is accessible via at least one free final link circuit.

The marking network via which a P. B. X line circuit can be marked from the called line marker includes a rectifier MR40. The cathode output lead from PV1 is connected to the rectifiers such as MR40 of the marking networks of all P. B. X lines in the group of lines with which PV1 is associated. Thus the function of the tube PV1 is to "prime" the marking networks of all P. B. X lines in its own group of lines as long as there is at least one free final link circuit available to that group of lines. This function is important where the lines of a P. B. X group are not confined to the same group of 50 lines.

The AB and CD marking connection from the called line marker for the directory number of a P. B. X group are connected to the AB and CD connections of all lines of that P. B. X group. Hence a line in a wanted P. B. X group will only have its AB and CD connections and its connection such as MR40 marked if that line can be reached via a free final link circuit.

To return to the P. B. X marker circuit, a positive pulse of 50 volts extending from T2 to T5 of the timing cycle is applied to the control grids of valves such as PV4. These valves form part of the P. B. X marker circuit which is common to the whole exchange, and each of a number of valves PV4 is common to all $n$th choice lines. Thus there is a valve for all first choice lines, one for all second choice lines, and so on. The output lead of each PV4 tube is connected to control connections such as that including MR41 (Fig. 26) for the corresponding choices in the P. B. X group. This input to the P. B. X marker circuit is connected to the trigger electrode of a tube JB via MR41, contacts LL1 and KK1 back and a resistor R36. This potential can only reach the trigger electrode of JB if the AB and CD connections from the called line marker and the connection including MR40 are also marked with positive potential. It is insufficient alone to fire the gas-gap tubes of the terminal connector, but it is sufficient to cause the tube JB to fire. Therefore one or more JB tubes will be effectively primed, and one of these tubes fires. The anode potential of these tubes is present from T1 to T17. The resistor R37 is common to all of the JB tubes, and acts as a lock-out resistor for these tubes.

The tube PV2 (Fig. 27) serves to ensure that spurious breakdowns cannot occur between trigger electrode and cathode of any of the JB tubes as a consequence of the common resistor R37. The control grid of tube PV2, which serves all of the JB tubes in the exchange is connected to the left hand end of the lock-out resistor R37, and the cathode of PV2 is connected via rectifiers such as MR42 to the trigger electrodes of all tubes JB. Hence when a JB tube fires, the trigger electrodes of all of the other JB tubes are raised in potential to approximately the potential on the left hand end of R37. This condition is such as to prevent any firing of the trigger-cathode gaps of any of the other JB tubes.

The positive output potential from the individual resistor R38 of the fired JB tube is applied via a rectifier MR44 to the control grid of a valve PV3 in the P. B. X marker. Each of the tubes PV3 is common to a particularly numbered choice in all P. B. X groups, i. e. it is common to all $n$th choices. V3, whose screen grid potential is modulated by alternating current from a generator ACH then conducts, and alternating current is applied from its anode circuit to a rectifier circuit RD the output of which is applied to the control grid of tube PV4, which is also common to the $n$th choice tubes in all P. B. X groups. As a result of this, the cathode output potential rises to about 100 volts positive, so that the marking on the leads including MR41 for all $n$th choice P. B. X lines is raised to about +100 volts. Therefore, assuming that a line in the wanted P. B. X group is available for use, a line in the wanted P. B. X group has all of the inputs to its marking network raised to a potential which is sufficient to cause the firing of the terminal connector gas gap tubes. The R relay in the line circuit now operates, and the circuit functions thereafter in the manner described already for the called subscriber in the regular line circuit.

At T17 of the timing cycle, the anode potential of all JB tubes falls, and so the fired tube is extinguished. PV3 is therefore cut off, and the cathode of PV4 falls to about earth potential. The P. B. X marker circuit can now function in respect of another call. Should all lines of a wanted P. B. X be busy, the busy tone will be reverted to the caller in the manner already described.

Release of the line circuit occurs in the same manner for a P. B. X line circuit as it does in the case of a regular line circuit.

*Route selector (Figs. 28A–B)*

This has already been briefly described with reference to the simplified schematic of Figs. 4–5. From this description it will be remembered that the function of the route selector is to determine a free path between a marked inlet to an A frame, i. e. the seized first link, and a marked outlet from a C frame, i. e. the marked final link, and to establish a connection between those two points within a single time cycle. This the route selector does by determining all the free paths from the A frame inlet to a B frame, i. e. all the free second links accessible to the seized first links, and at the same time by determining all free paths from the C frame outlet to a B frame, i. e. all free third links accessible to the marked final links. Free routes through the A, B and C frames are each indicated by avoidance of free routes from the same B frame both to the A inlet and the B outlet to be interconnected. One of the available free routes is then selected on a lock-out basis. Hence the choice of a free route to be used is made in accordance with a predetermined order, which gives improved traffic-carrying capacity, but this order is not known because it depends on the characteristics of the tubes used in the lock-out circuits.

As has already been stated while describing the first link circuit, the fact that a first link circuit is in the calling condition and waiting to complete its connection is indicated by that first link circuit having its RL relay operated and its H relay unoperated. For convenience, certain portions of the various link circuits are shown in Figs. 28A–B, and it will be seen that in this case −220 volts is applied via lead 14 to the commoning point 15 of the leads such as 14 from the same A frame. Hence there are 50 multiplied points such as 15, each with its own resistor R41 connected to −100 volts. Hence all of the commoned points such as 15 are at −100 volts with the exception of a common point for an A frame to which is connected a calling first link. Such a commoned point is therefore at −220 volts.

The commoning symbol to the right of R41 indicates one output therefrom for each outlet from an A frame, i. e. from each second link accessible via that A frame. Hence there are 30 leads leaving 15 to the right. Each of these leads extends to a coincidence gate corresponding to the AG gates in Figs. 4–5. The AG gate for the second link whose lead from 15 is shown in full includes resistor R42, via which the "calling" potential of −220 volts just mentioned reaches the gate, and a rectifier MR50, via which −220 volts reaches the gate when the second link to which it applies is free. This potential is applied thereto over the back contact HX2 of relay HX, which is released when its second link circuit is free.

From the preceding description it will be remembered that there are 1500 of the AG gates such as R42–MR50, and −220 volts will occur at the common point of each gate which corresponds to a free second link which is accessible from the calling first link. Each of the free second links, of course has access to a particular group of the B frame, and has access therethrough to 50 third links each extending to a different C frame.

Each B frame is accessible via any one of 50 second links each extending from a different A frame, and the gates such as R42–MR50 for all second links extending to the same B frame are commoned to the control grid of a tube such as SV1 common thereto. There are therefore 30 tubes such as SV1, each with its control grid connected via a resistor such as R43 to −100 volts and also connected via respective decoupling rectifiers such as MR51 to the gates for the second links via which the appropriate B frame is reached.

Hence a marked A frame inlet (calling first link) which has free access to a B frame group causes the control grid of the tube SV1 for that B frame group to fall to about −200 volts. In the normal state, the SV1 tubes conduct, and their anodes are at −100 volts, but when one of these tubes has −200 volts put on its grid, it cuts off and its anode potential rises to +100 volts. Each tube SV1 and its circuiting corresponds to a combination of an MAG gate plus its control device 20 (Fig. 4).

Thus one or more free routes from the A frame inlet to a B frame have been established, and one or more routes from the C frame outlet to a B frame are established in a similar manner.

When a final link circuit has been marked but not connected, it will be remembered that it has its relay SZ operated and its relay HZ unoperated. Therefore −220 volts is applied from that final link circuit over its lead such as 23 to the control grid of a pentode SV2. The connections each include a decoupling rectifier such as MR52. There is one tube such as SV2 for each C frame group, so that each tube SV2 corresponds to the control device such as 17 shown in Fig. 5.

The cathode output from the tube SV2 for a C frame group to which is connected a marked final link circuit therefore goes to about −220 volts. It will be seen that each C frame group can be reached over 30 different third links. Therefore the output from tube SV2 for each C frame group is connected to 30 gates, one per third link via which that group is reachable. A typical one of these gates is shown. It has a resistor R44 via which −220 volts reaches it from the associated SV2 tube, and a rectifier MR53 via which −220 volts reaches it if the third link is free. These 1500 gates such as R44–MR53 corresponds to the CG gates in Fig. 5.

For each B frame there is a tube such as SV3, whose control grid is connected via a resistor R45 to −100 volts, and which thus conducts and normally holds its anode at about −100 volts. The control grid of the tube SV3 for a B frame is connected to the CG gates for all third links via which its B frame can reach a C frame. That is, there are 50 gates commoned to the grid of SV3, each via its own decoupling rectifier such as MR54.

From the above it will be seen that each B frame has a tube SV1 and a tube SV3, and that one or more SV1 tubes and one or more SV3 tubes will be cut off. Thus there will be one or more B frames each with both its SV1 tube and its SV3 tube cut off. It is now necessary to select a single free route through the system.

The anode outputs of the pair of tubes for each B frames are connected to rectifiers MR55 and MR56 of a coincidence gate. The other control connection of the gate is connected via a rectifier MR57 to an input to which is applied a pulse commencing at T23. Each of the gates corresponds to one of the gates G1, G2, . . . G50 in Figs. 5–4. If a free route exists, one of these gates will have all of its controls energised when the pulse of +100 volts starts at T23, and will therefore give an output.

Each B frame also has associated with it a circuit including tubes Q, SV5 and SV6, which corresponds to one of the circuits 21A in Figs. 5–4. The anode supply for tube Q is provided by a 220 volt positive pulse spanning T19–T30. For each B frame which is included in a free route, therefore, a potential of +100 volts is applied to to the associated tube Q. Hence the Q tubes corresponding to one or more usable routes receive effective firing conditions. All of these tubes Q share a common lockout resistor R47, and so one only of these tubes fires. SV4 disables the trigger electrode inputs of all unfired Q tubes, functioning in a manner similar to the way in which PV2 in Fig. 27 functions. SV4 is common to all B frame circuits 21A.

The output from the fired tube Q is taken from across its individual cathode resistor to a pentode SV5, also individual to the B frame. This tube, whose screen supply circuit includes an alternating current generator ACJ now passes alternating current, which is applied to the control grid of tube SV6 via a rectifying circuit RE. SV6 is a cathode follower, and as a result of the above action its cathode voltage rises to about +130 volts. This provides the marking voltage to the second link to be used, where this voltage causes the operations already described under the heading of the Second Link Circuit.

The marked final link circuit, in which relay HA is unoperated and relay SZ operated also causes a condition to be applied therefrom such that the control grid of a pentode SV7 common to a group of final link circuits, and therefore its cathode, goes to a positive potential of about +130 volts wherever any of the final link circuits of the group to which SV7 is common has been marked, but not connected. Thus each of these tubes SV7 corresponds to a C frame group, and its cathode output is connected to supply the marking potential of +130 volts to all third links via which that C frame is reached.

Therefore one second link extending to a B frame to be used is marked, and a number of third links including one extending to the same B frame are marked. Therefore the appropriate pairs of tubes in the A, B and C frames are fired, and the connection through these frames is therefore established. The various relays H, HX, etc. operate, and the input connections to the route selector for the selected route are removed.

The operations in the various link circuits and frames have already been described, and from an inspection of the timing of the various operations it will be seen that precautions are taken to remove the conditions to the route selector for that connection.

*Timing*

From the preceding description it will have been noted that operations occur in three portions, during the first of which the calling subscribers' line is marked and his individual switch of the terminal connector seizes a free first link and also a free register. The caller then dials the wanted number, which is stored in the register until the call distributor gives the "go ahead" signal.

When the call distributor gives the "go ahead" signal the second portion of the operations occurs. During this the wanted number is transferred to the called line marker and the register is then released. Then the called line is marked from the called line marker and the called subscriber's individual switch of the terminal connector seizes a free outlet therefrom. The terminal connector outlets for incoming calls and for outgoing calls are tested at different mutually exclusive times. Hence no collision of calls can occur.

Thus during the first two portions an outlet from the calling subscriber's individual switch, and hence an inlet to the A frame has been seized. An outlet from the called subscriber's individual switch, and hence an outlet from the C frame, have also been seized. During the third portion the route selector sets up one single path between the seized inlet and outlet, and since only one connection can be set up at once by the route selector there is no possibility of a false connection. The establishment of the path through the route selector occurs under control of successive portions of the controlling time cycle.

There is no chance of the route selector trying to set up two paths since, as already described, only one register can work at once and only one calling line marker can work at once. Therefore when the route selector operates there is only one connection which it can establish.

No detailed time chart is given, but it is felt that when the above-mentioned separation into three portions is borne in mind the timing will be clear.

Additional circuit feature

It will be noted that in certain portions of the circuits there appear resistors shunted by rectifiers. To describe the purpose of this, reference is directed to the circuits illustrating the regular line circuit (Figs. 6–8).

The outlets from the subscribers' individual switches are, as will be remembered, tested by positive pulses applied to the anodes of the tubes associated with the respective outlets. It will also be remembered that the test relays RR and K are included in this circuit, and that one of these relays operates in the pulse supply circuit. Both when the line circuit is functioning for an incoming call and for an outgoing call, the supply circuit is to contact L1 and in both cases it includes a resistor shunted by a rectifier.

The rectifier is biassed to its high resistance state by the pulse, and so passes to the relay and the outlet via the resistor. However, between pulses the rectifier is in its low resistance state that it acts as a current drain for any voltage present in the circuit wiring associated with the test relay. This measure is intended to eliminate the possibility that pick up between adjacent pulse supply conductors could cause spurious firing.

The use of rectifier as a catching rectifier already mentioned, together with the use of a pulse whose voltage is in excess of that necessary to fire a free outlet from a "primed" switch and to operate the test relay associated therewith minimises the adverse effect of wiring capacitance. It will be appreciated that the effect of wiring capacitance is to increase the rise time of a pulse, which reduces its leading edge slope. Thus it reduces its effective width. By using a greater voltage then necessary the leading edge slope is increased because the wiring capacitances are charging towards a higher voltage. The catching diode serves to reduce the voltage to the desired level.

The combined effect of the two mentioned above is that the risks of spurious firings of the gaps of the switches are considerably reduced, and may even be eliminated. Further, the risk that a switch which should fire and operate a test relay will not do so is also considerably reduced, and may even be eliminated.

What we claim is:

1. An automatic telecommunication exchange comprising an odd number of stages of co-ordinate multi-switches, a set of inlets to each of said multi-switches and a set of outlets from each of said multi-switches, means for connecting the outlets of each multi-switch of any stage other than the last respectively to each of a corresponding number of different multi-switches of the next stage, means for connecting the inlets of each multi-switch of a stage other than the first respectively to a corresponding number of different multi-switches of the preceding stages, whereby the number of multi-switches in said stages and the number of the inlets and outlets thereof form a symmetrical arrangement about the central stage of multi-switches, test equipment common to said stages of multi-switches, means for operating said test equipment to test possible paths between an inlet to a multi-switch of the first stage and an outlet from a multi-switch of the last stage to which said inlet is to be connected, and means responsive to said test equipment finding a free path between an inlet and an outlet to be connected for setting up that free path via said stages of multi-switches.

2. An automatic telecommunication exchange, as claimed in claim 1, and in which the common test equipment is arranged to find a free path in a single test operation between an inlet and an outlet to be connected together when one or more free paths exist therebetween.

3. An automatic telecommunication exchange comprising three stages of co-ordinate multi-switches, a set of inlets to said multi-switches and a set of outlets from said multi-switches, the first of said stages of multi-switches comprising $x$ multi-switches each of which has inlets and to said inlets of each of which is connected one of $x$ groups of said first-mentioned inlets and each of which has $y$ outlets, the second of said stages of multi-switches comprising $y$ multi-switches each of which has $x$ inlets, one from each of the multi-switches of the first stage, and $x$ outlets, the third of said stages of multi-switches comprising $x$ multi-switches each of which has outlets which give access to one of $x$ groups of said first-mentioned outlets and each of which has $y$ inlets, one from each of the multi-switches of the second stage, the arrangement being such that the $n$th multi-switch of the second stage interconnects the $n$th outlet from a multi-switch of the first stage and the $n$th inlet to a multi-switch of the third stage, whereby the arrangement of said first and third stages of multi-switches is symmetrical about said second stage, test equipment common to said stages of multi-switches, means for operating said test equipment to test possible paths between an inlet to a multi-switch of the first stage and an outlet from a multi-switch of the third stage to which it is to be connected, and means responsive to said test equipment finding a free path between an inlet and an outlet to be connected for establishing said free path, said test equipment being arranged to find a free path in a single test operation between an inlet and an outlet to be connected together when one or more free paths exist therebetween.

4. An automatic telecommunication exchange, as claimed in claim 1, further comprising subscribers' individual switches for outgoing calls each of which is arranged to extend connections from a calling subscriber's line to a free inlet to the first stage of multi-switches, subscribers' individual switches for incoming calls each of which is arranged to connect a called subscriber's line to a free outlet from the last stage of said multi-switches, registers accessible via the subscribers' individual switches for outgoing calls, and marking means for marking called subscribers' lines, one at a time, under control of said registers in order to initiate the operation of a called subscriber's individual switch for incoming calls to interconnect that called subscriber's line and a free outlet from said last stage of said multi-switches.

5. Automatic telecommunication exchange, as claimed in claim 1, further comprising means for maintaining a path set up via the stages of multi-switches in respect of one connection for a predetermined period.

6. Automatic telecommunication exchange, as claimed in claim 4, in which the means for setting up a path through the switching stages establishes said path within a specified time period.

7. Automatic telecommunication exchange, as claimed in claim 6, further comprising means for releasing a connection only during a predetermined portion of a time cycle including the specified time period within which the path for said connection is set up, and in which none of the operations involved in the establishment of a connection occur during said predetermined portion of the time cycle.

8. Automatic telecommunication exchange, as claimed in claim 6, in which the operations of a register in establishing a connection can only occur during a predetermined portion of a time cycle which includes the time period within which the path through the switching stages is established.

9. Automatic telecommunication exchange, as claimed in claim 4, further comprising a calling line marker common to a plurality of lines, means responsive to the initiation of a call by a subscriber for causing the operation of said calling line marker, means responsive to the operation of said calling line marker for seizing the calling subscriber's individual switch for outgoing calls, means for testing the outlets therefrom singly and successively in search of a free outlet, and means responsive to said testing means for operating said calling subscriber's individual switch to interconnect the calling line and that outlet when a free outlet is found.

10. Automatic telecommunication exchange, as claimed in claim 9, further comprising a line relay for each subscriber's line, means responsive to the closure of a subscriber's loop when that subscriber initiates a call for operating that subscriber's line relay, means responsive to the operation of the line relay of one of a plurality of subscribers for causing the operation of the calling line marker common to that plurality, means operated by said calling line marker for thereupon applying a marking potential to the subscriber's line to which it is common, which marking potential reaches the calling subscriber's switch via a contact of that calling subscriber's line relay to cause seizure of the switch.

11. Automatic telecommunication exchange, as claimed in claim 9, in which each of the plurality of lines served by a calling line marker is included in a different one of a corresponding plurality of numerical groups of subscribers' lines, whereby in response to the seizure of a calling line marker, no more than one of said lines within the same numerical group can be marked as being in the calling condition.

12. Automatic telecommunication exchange, as claimed in claim 9, further comprising a register-connector switch associated with each outlet from a subscriber's individual switch for outgoing calls and having access to a number of registers, means responsive to seizure of one of said outlets to cause outlets from the register-connector switch associated with said seized outlet to be tested singly and successively in search of an outlet giving access to a free register, means for causing the seized register connector to interconnect the seized outlet from said individual switch and the seized outlet to the free register, whereby that register is seized, means responsive to the seizure of a free register to send dialling tone to the calling subscriber, whereafter the calling subscriber may dial the wanted number, and storage means in said register for storing the dialled digits identifying the called subscriber.

13. Automatic telecommunication exchange, as claimed in claim 12, further comprising a call distributor common to all of said registers, static electrical scanning means in said call distributor for scanning said registers singly and successively in search of a register containing a wanted subscriber's number, means responsive to the detection by said scanning means of a "calling" register to send a "go ahead" signal thereto, and means in the register responsive to a "go ahead" signal to cause said wanted subscriber's number to be transferred to and stored in said marking means and to cause the release of the register, whereby said registers are operable one at a time in cooperation with said marking means.

14. Automatic telecommunication exchange, as claimed in claim 13, further comprising means in said marking means responsive to the wanted number being stored therein for causing the seizure of the called line's individual switch, means for thereafter testing the outlets therefrom for incoming calls singly and successively in search of a free outlet, and means responsive to the finding of a free outlet by said testing means for causing the called subscriber's individual switch to interconnect the called line and that free outlet.

15. Automatic telecommunication exchange, as claimed in claim 14, in which the marking means, which is common to all of the registers, comprises storage means for all of the digits of a wanted subscriber's number, a series of output connections each of which characterises a different combination of thousands and hundreds digits, means under control of said storage means for energising the appropriate one of said output connections, a second series of output connections each of which characterises a different combination of tens and units digits, means under control of said storage means for energising the appropriate one of said second series of output connections, and a gate per line having as its control connections the pair of output connections individual thereto, which gate delivers an output to initiate the operation of the called subscriber's individual switch for incoming calls when both of its control connections are simultaneously energised.

16. Automatic telecommunication exchange, as claimed in claim 15, further comprising a control device associated with each group of subscribers' lines including at least one P. B. X line for marking the P. B. X line circuits of that group if the individual switches for outgoing calls associated therewith have access to at least one free outlet to the intermediate switching stages, means including connections from the pair of output connections from the marking means characterising the directory number of a P. B. X subscriber for marking all lines of that P. B. X group over said connections when that pair of output connections are simultaneously energised, further control devices for respectively marking all P. B. X group $n$th choice lines, a gate tube per P. B. X line circuit adapted to fire only when the line circuit is marked by the connections from the appropriate pair of output connections from said marking means and when the line circuit is marked by the control device for that line's group of lines and by the appropriate $n$th choice control device, lock-out means for ensuring that only one of the gates can operate, and means responsive to the operation of a P. B. X line circuit's gate to initiate the operation of that line's individual switch for outgoing calls.

17. Automatic telecommunication exchange, as claimed in claim 15, further comprising an operator's circuit, a pair of output connections individual to said circuit, and means responsive to a special called number, such as an operator's number, with less than the normal number of digits, for automatically energizing said pair of output connections.

18. Automatic telecommunication exchange, as claimed in claim 15, further comprising an operator's circuit means responsive to receipt of a special called number, such as an operator's number, which has less than the normal number of digits, or in response to each of the storage means in the marking means, which corresponds to a digital place of a called special number which includes no digits, assuming a special condition, for energizing a pair of output connections individual to said operator's circuit, said energization being performed under the control of one or more of said storage means in said special condition.

19. Automatic telecommunication exchange, as claimed in claim 13, in which the transferring means transfers each digit of the called number from a register to the marking means as a single impulse which by its position in a repetitive cycle of time positions identifies that digit's numerical value, and comprising means for applying each said impulse to the appropriate one of the digit storage means in said marking means, and means for thereupon setting said storage means to its condition appropriate thereto.

20. Automatic telecommunication exchange, as claimed in claim 19, further comprising means responsive to the receipt of each special number for treating a digital place having no digit as if it were occupied by a digit having an eleventh value and means for transferring such value as an impulse occupying an eleventh position in the cycle.

21. Automatic telecommunication exchange, as claimed in claim 4, further comprising a source of busy tone, associated with the outlets for outgoing calls from the calling subscriber's individual switch, means in the marking means responsive to the wanted subscriber's line being busy, for applying busy tone from said source to the calling subscriber's line, associated with the outlets for outgoing calls from whereby busying can be effected without affecting the intermediate switching stages.

22. Automatic telecommunication exchange, as claimed in claim 4, further comprising means in the marking means for determining whether or not a wanted number is an unobtainable number, and means responsive to said determining means determining that a number is unobtainable for causing a number-unobtainable signal to be sent to the calling subscriber without affecting the intermediate switching stages or the subscribers' switches for incoming calls.

23. Automatic telecommunication exchange, as claimed in claim 4, in which each individual switch comprises two groups of gaseous discharge devices each of which has a first and a second anode and a single cathode, there being one discharge device in each group for each outlet from the switch, a first lead in each subscriber's line connected in multiple to the first anodes of the discharge devices of the first of said groups and a second lead connected in multiple to the first anodes of the discharge devices of the second of said groups, a first lead in each outlet from the switch connected to the second anode of the respective discharge device of the first of said groups and a second lead connected to the second anode of the respective discharge device of the second of said groups, means for applying D. C. potentials normally to the cathodes and second anodes of said discharge devices which are unable to initiate a discharge in said device but are able to maintain a discharge therein, means for connecting the cathodes of the pair of discharge devices for each said outlet together and to a marking connection, means for applying negative potential pulses to said marking connections singly and successively, so that the outlets are tested singly and successively, said pulses being unable to initiate any discharge with said above-mentioned D. C. potentials, means for disabling the pulses associated with an outlet when said outlet is busy, means for applying a further D. C. potential to said first anodes when a switch is seized for a call involving the subscriber associated therewith, and means responsive to the combination of said further D. C. potential and a negative pulse corresponding to a free outlet for firing the first anode-cathode gaps of the devices connected to that free outlet, and means for causing the discharge to spread to the second anode-cathode gaps of the same discharge device and for maintaining the discharges in the absence of said negative potential pulses, whereby a communication connection is established between said subscriber's line and a free outlet.

24. An automatic telecommunication exchange, as claimed in claim 23, in which the individual switches for outgoing calls for a number of subscribers are assembled into a co-ordinate multi-switch, each of said individual switches having access to any one of the same set of outlets to the switching stages.

25. An automatic telecommunication exchange, as claimed in claim 24, in which the individual switches for incoming calls for a number of subscribers are assembled into a co-ordinate multi-switch assembly, each of said individual switches having access to any one of the same set of outlets to the intermediate switching stages.

26. An automatic telecommunication exchange, as claimed in claim 23, in which the test equipment includes means for testing the outlets from a subscriber's switch for outgoing calls and the outlets from a subscriber's switch for incoming calls at different mutually exclusive periods, whereby collision between incoming and outgoing calls is avoided.

27. An automatic telecommunication exchange, as claimed in claim 24, in which a single one of the individual switches is provided for each subscriber's line adapted to serve via a number of its outlets for use with outgoing calls and via a further number of its outlets for use with incoming calls, and in which the test equipment includes means for testing the outlets for use with outgoing calls and the outlets for use with incoming calls at different mutually exclusive times, whereby collision between incoming and outgoing calls is avoided.

28. An automatic telecommunication exchange, as claimed in claim 27, and in which said switches for a number of subscribers are assembled into a co-ordinate multi-switch assembly, each of said switches having access to any one of the same set of outlets for outgoing calls and to any one of the same set of outlets for incoming calls.

29. Automatic telecommunication exchange, as claimed in claim 23, further comprising means for transmitting signals, such as dialling pulses, dialling tone, ringing signals, busy tone and number unobtainable tone, through the subscribers' individual switches by a direct modulation of the direct current flowing therein, and means for transmitting speech therethrough by a direct modulation of the direct current flowing therein.

30. An automatic telecommunication exchange, as claimed in claim 1, in which the switching stages comprise three sets of coordinate multi-switches, the first of said sets of multi-switches comprising $x$ multi-switches each of which serves one of $x$ groups of subscribers and has a number of inlets determined by traffic requirements and $y$ outlets, the second of said sets of multi-switches comprising $y$ multi-switches each of which has $x$ inlets, one from each of the multi-switches of the first set, and $x$ outlets, the third and last of said sets of multi-switches comprising $x$ multi-switches each of which serves one of said $x$ groups of switches and has $y$ inlets, one from each of the multi-switches of the second set, and a number of outlets determined by traffic requirements, and in which the values of $x$ and $y$ are also determined in accordance with traffic requirements.

31. An automatic telecommunication exchange, as claimed in claim 1, in which for a 10,000 line exchange there are 50 groups of subscribers' lines, each consisting of 200 lines, the switching stages combining three sets of coordinate multi-switches, the first of said sets of multi-switches comprising 50 multi-switches each of which serves one group of subscribers and has 30 inlets and 30 outlets, the second of said sets of multi-switches comprising 30 multi-switches each of which has 50 inlets, one from each of the multi-switches of the first set, and 50 outlets, and the third and last of said sets of multi-switches comprising 50 multi-switches each of which serves one group of subscribers and has 30 inlets, one from each of the multi-switches of the second set, and 30 outlets.

32. An automatic telecommunication exchange, as claimed in claim 30, and in which each coordinate multi-switch has a number of inlets and a number of outlets, each inlet having access to every one of said outlets, said exchange further comprising a first and a second cold cathode gaseous discharge device at each crossing point between an inlet and an outlet each of said devices having two anodes and a cathode, each said inlet having a first lead connected in multiple to the first anodes of the first gaseous discharge devices at all crossing points involving that inlet and a second lead connected in multiple to the first anodes of the second gaseous discharge devices at all crossing points involving that inlet, the cathodes of all first gaseous discharge devices for one inlet being commoned together and the cathodes of all second gaseous discharge devices for one inlet being commoned together, there being a single interconnection between the two commoned cathode sets for the same inlet, means for applying a marking connection, to said two commoned sets in phantom, means for applying a negative test potential to the marking connection to the cathodes of the gaseous discharge devices for the seized inlet and a positive potential to the first anodes of the gaseous discharge devices for the seized inlet when an inlet to multi-switch is seized, the potentials applied to said discharge devices on seizure being insufficient initiate discharges therein but sufficient to maintain discharges therein, each said outlet having a first lead connected in multiple to the second anodes of the first gaseous discharge devices at all crossing points involving that outlet and a second lead connected in multiple to the second anodes of the second gaseous discharge devices at all crossing points involving that outlet, an inductive coupling interconnecting the two leads of an outlet a test lead connected in phantom to the center point thereof, means for applying a positive test potential over said test lead to the second anodes of the gaseous discharge devices for the outlet to be used after an inlet to the multi-switch has been seized, said positive test potential with the negative potential applied to the cathodes of the discharge devices for the seized inlet being sufficient to fire the second anode-cathode gaps of the discharge devices at the crossing point between said seized inlet and said outlet to be used, whereafter discharge occurs in the first anode-cathode gaps of the same gaseous discharge devices, whereby a communication connection has been established between said seized inlet and said outlet and a number of simultaneous connections can exist through the same multi-switch.

33. Automatic telecommunication exchange, as claimed in claim 30, and in which said control equipment independent of said registers comprises a first set of gates each of which corresponds to a different outlet from a multi-switch of the first set of multi-switches, means responsive to the seizure of an inlet to a multi-switch of the first set to cause the gates corresponding to free outlets from the seized multi-switch to be opened, each gate which is so opened corresponding to an outlet to a different multi-switch of the second set, a second set of gates each of which corresponds to a different inlet to a multi-switch of the third set of multi-switches, means responsive to the seizure of an outlet from a multi-switch of the third set to cause the gates of said second set of gates corresponding to free inlets to said multi-switch to be opened, each gate which is so opened corresponding to an inlet from a different multi-switch of the second set, whereby one or more pairs of gates each of which pairs corresponds to a different multi-switch of the second set are opened, a control device individual to each multi-switch of the second set and operable when the pair of gates corresponding to the same multi-switch are both opened, each operable control device corresponding to a usable path through said sets of multi-switches, and means for ensuring that one only of said control devices operates, the operated control device causing the establishment of the connection through said sets of multi-switches.

34. Automatic telecommunication exchange, as claimed in claim 33, and in which said means for ensuring that one only of the control devices operates is so arranged that said devices are selected for operation in a predetermined but not necessarily known order.

35. An automatic telecommunication exchange, as claimed in claim 33, further comprising link circuits, means in each control device responsive to the operation of a control device corresponding to a multi-switch of the second set and to a usable path through said sets of multi-switches for marking one of said link circuits interconnecting an outlet from the multi-switch of the first set including the seized inlet to the sets of multi-switches and an inlet to that multi-switch of the second set, whereafter the connection is established through said first multi-switch; means for then applying marking conditions to said multi-switch of the second set from said seized link circuit and to the outlet therefrom to the seized multi-switch of the third set, whereafter the connection is established through said second set multi-switch; and means for then applying marking conditions to a link circuit interconnecting an outlet from said seized second set multi-switch and an inlet to the seized third set multi-switch, which causes the establishment of the connection through said seized third set multi-switch.

References Cited in the file of this patent

UNITED STATES PATENTS

| | | |
|---|---|---|
| 2,585,904 | Busch | Feb. 19, 1952 |
| 2,735,893 | Le Gourrierec | Feb. 21, 1956 |